(12) United States Patent
Le et al.

(10) Patent No.: US 12,446,657 B2
(45) Date of Patent: Oct. 21, 2025

(54) SHOE AND SOLE

(71) Applicant: adidas AG, Herzogenaurach (DE)

(72) Inventors: Tru Huu Minh Le, Herzogenaurach (DE); Angus Wardlaw, Herzogenaurach (DE); Dirk Meythaler, Herzogenaurach (DE); Stuart David Reinhardt, Herzogenaurach (DE); Darren Michael Wood, Gresham, OR (US); Charles Griffin Wilson, III, Portland, OR (US); Juergen Weidl, Herzogenaurach (DE); Stanislav Goussev, Herzogenaurach (DE); Carl Arnese, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/608,570

(22) Filed: Mar. 18, 2024

(65) Prior Publication Data
US 2024/0215682 A1    Jul. 4, 2024

Related U.S. Application Data

(60) Division of application No. 16/918,905, filed on Jul. 1, 2020, now Pat. No. 11,957,206, which is a (Continued)

(51) Int. Cl.
*A43B 13/18*    (2006.01)
*A43B 7/1425*    (2022.01)
(Continued)

(52) U.S. Cl.
CPC .......... *A43B 13/188* (2013.01); *A43B 7/1425* (2013.01); *A43B 7/1435* (2013.01);
(Continued)

(58) Field of Classification Search
None
See application file for complete search history.

(56) References Cited

U.S. PATENT DOCUMENTS

| 2,131,756 | A | 10/1938 | Roberts |
| 3,754,746 | A | 8/1973 | Thiele |
| (Continued) | | | |

FOREIGN PATENT DOCUMENTS

| CN | 1036128 A | 10/1989 |
| CN | 2511160 Y | 9/2002 |
| (Continued) | | |

OTHER PUBLICATIONS

U.S. Appl. No. 15/078,043, Advisory Action, May 18, 2020, 2 pages.
(Continued)

*Primary Examiner* — Jila M Mohandesi
(74) *Attorney, Agent, or Firm* — Kilpatrick Townsend & Stockton LLP

(57) ABSTRACT

Described are soles for a shoe, in particular for a sports shoe, with a midsole. The midsole includes a first sole region, which includes particle foam. The midsole further includes a deformation region within the midsole, wherein the deformation region has a volume greater than that of a single expanded particle and is positioned so that it allows a sideward deformation of the material of the first sole region under a pressure load on the sole.

20 Claims, 45 Drawing Sheets

Related U.S. Application Data continuation of application No. 15/078,043, filed on Mar. 23, 2016, now abandoned.

(60) Provisional application No. 62/137,139, filed on Mar. 23, 2015.

(51) Int. Cl.
    *A43B 7/1435* (2022.01)
    *A43B 7/144* (2022.01)
    *A43B 7/1445* (2022.01)
    *A43B 7/148* (2022.01)
    *A43B 13/12* (2006.01)

(52) U.S. Cl.
    CPC ............ *A43B 7/144* (2013.01); *A43B 7/1445* (2013.01); *A43B 7/148* (2013.01); *A43B 13/125* (2013.01); *A43B 13/127* (2013.01); *A43B 13/187* (2013.01)

(56) References Cited

U.S. PATENT DOCUMENTS

| | | |
|---|---|---|
| 3,834,046 A | 9/1974 | Fowler |
| 3,864,181 A * | 2/1975 | Wolinski .................. C08J 9/04 277/944 |
| 4,237,627 A | 12/1980 | Turner |
| 4,364,189 A | 12/1982 | Bates |
| 4,481,727 A | 11/1984 | Stubblefield et al. |
| 4,624,062 A | 11/1986 | Autry |
| 4,642,911 A | 2/1987 | Talarico et al. |
| 4,658,515 A | 4/1987 | Oatman |
| 4,667,423 A | 5/1987 | Autry et al. |
| 4,694,591 A | 9/1987 | Banich et al. |
| 4,704,239 A * | 11/1987 | Yoshimura .............. C08J 9/122 264/DIG. 13 |
| D296,262 S | 6/1988 | Brown et al. |
| 4,754,561 A | 7/1988 | Dufour |
| 4,798,010 A | 1/1989 | Sugiyama |
| D302,898 S | 8/1989 | Greenberg |
| RE33,066 E | 9/1989 | Stubblefield |
| 4,864,739 A | 9/1989 | Maestri |
| 4,922,631 A | 5/1990 | Anderie |
| 4,970,807 A | 11/1990 | Anderie et al. |
| 4,980,445 A | 12/1990 | Van Der wal et al. |
| 5,025,573 A | 6/1991 | Giese et al. |
| 5,150,490 A | 9/1992 | Busch et al. |
| 5,308,420 A | 5/1994 | Yang et al. |
| 5,353,526 A * | 10/1994 | Foley .................. A43B 23/16 36/35 R |
| 5,528,842 A | 6/1996 | Ricci et al. |
| 5,549,743 A | 8/1996 | Pearce |
| 5,619,809 A | 4/1997 | Sessa |
| 5,716,723 A | 2/1998 | Van et al. |
| 5,932,336 A | 8/1999 | Petrovic et al. |
| 5,996,252 A | 12/1999 | Cougar |
| 6,041,521 A | 3/2000 | Wong |
| 6,108,943 A | 8/2000 | Hudson |
| 6,199,302 B1 | 3/2001 | Kayano |
| 6,266,896 B1 | 7/2001 | Liu |
| 6,543,158 B2 | 4/2003 | Dieckhaus |
| 6,564,476 B1 | 5/2003 | Hernandez |
| D490,230 S | 5/2004 | Mervar |
| 6,782,640 B2 | 8/2004 | Westin |
| 6,849,667 B2 | 2/2005 | Haseyama et al. |
| 6,874,257 B2 | 4/2005 | Erickson |
| 6,968,637 B1 | 11/2005 | Johnson |
| D517,302 S | 3/2006 | Ardissono |
| 7,073,277 B2 | 7/2006 | Erb et al. |
| 7,141,131 B2 * | 11/2006 | Foxen .................. A43B 13/20 156/196 |
| 7,143,529 B2 | 12/2006 | Robinson et al. |
| 7,254,906 B2 | 8/2007 | Morris et al. |
| 7,421,805 B2 | 9/2008 | Geer |
| 7,556,846 B2 * | 7/2009 | Dojan .................. A43B 21/28 36/141 |
| 7,712,229 B2 * | 5/2010 | Yang .................. A43B 13/181 36/29 |
| 7,797,856 B2 | 9/2010 | Andrews et al. |
| 8,186,081 B2 | 5/2012 | Wilson, III |
| 8,205,357 B2 | 6/2012 | Keating et al. |
| D709,680 S | 7/2014 | Herath |
| D740,003 S | 10/2015 | Herath |
| D740,004 S | 10/2015 | Hoellmueller et al. |
| 9,167,868 B1 | 10/2015 | Koo |
| 9,167,869 B2 | 10/2015 | Koo |
| 9,212,270 B2 | 12/2015 | Künkel et al. |
| D758,056 S | 6/2016 | Herath et al. |
| 9,402,439 B2 | 8/2016 | Cross et al. |
| 9,516,918 B2 | 12/2016 | Meschter et al. |
| D776,410 S | 1/2017 | Herath et al. |
| 9,554,620 B2 | 1/2017 | Cross et al. |
| D783,264 S | 4/2017 | Hoellmueller et al. |
| 9,610,746 B2 | 4/2017 | Wardlaw et al. |
| 9,781,970 B2 | 10/2017 | Wardlaw et al. |
| 9,781,974 B2 | 10/2017 | Reinhardt |
| 9,788,598 B2 | 10/2017 | Reinhardt |
| 9,788,606 B2 | 10/2017 | Reinhardt |
| 9,795,186 B2 | 10/2017 | Reinhardt et al. |
| 9,820,528 B2 | 11/2017 | Reinhardt et al. |
| 9,849,645 B2 | 12/2017 | Wardlaw et al. |
| 9,930,928 B2 | 4/2018 | Whiteman et al. |
| 9,968,157 B2 | 5/2018 | Wardlaw et al. |
| 10,039,342 B2 | 8/2018 | Reinhardt et al. |
| D828,686 S | 9/2018 | Hoellmueller et al. |
| D828,991 S | 9/2018 | Herath |
| D840,136 S | 2/2019 | Herath et al. |
| D840,137 S | 2/2019 | Herath et al. |
| 10,259,183 B2 | 4/2019 | Wardlaw et al. |
| D851,889 S | 6/2019 | Dobson et al. |
| D852,475 S | 7/2019 | Hoellmueller |
| D853,691 S | 7/2019 | Coonrod et al. |
| D853,699 S | 7/2019 | Coonrod et al. |
| D855,297 S | 8/2019 | Motoki |
| D873,543 S | 1/2020 | Coonrod et al. |
| D875,359 S | 2/2020 | Dobson et al. |
| D882,927 S | 5/2020 | Bruns et al. |
| D882,928 S | 5/2020 | Bruns et al. |
| D889,810 S | 7/2020 | Hoellmueller et al. |
| D891,051 S | 7/2020 | Smith et al. |
| 10,709,203 B2 * | 7/2020 | Granger .................. A43B 7/1485 |
| 10,952,496 B2 * | 3/2021 | Glancy .................. A43B 13/14 |
| 12,193,538 B2 | 1/2025 | Smith et al. |
| 2002/0007568 A1 | 1/2002 | Kellerman et al. |
| 2002/0162247 A1 | 11/2002 | Hokkirigawa et al. |
| 2002/0166262 A1 | 11/2002 | Hernandez |
| 2003/0158275 A1 | 8/2003 | McClelland et al. |
| 2003/0172548 A1 | 9/2003 | Fuerst |
| 2004/0138318 A1 | 7/2004 | McClelland et al. |
| 2005/0008406 A1 | 1/2005 | Nishizaki |
| 2005/0081406 A1 | 4/2005 | Hoffer et al. |
| 2005/0268490 A1 * | 12/2005 | Foxen .................. A43B 7/1445 36/28 |
| 2006/0010717 A1 | 1/2006 | Finkelstein et al. |
| 2006/0021251 A1 | 2/2006 | Swigart |
| 2006/0026863 A1 | 2/2006 | Liu |
| 2006/0042120 A1 | 3/2006 | Sokolowski et al. |
| 2006/0083912 A1 | 4/2006 | Park et al. |
| 2006/0125134 A1 | 6/2006 | Lin et al. |
| 2006/0134351 A1 | 6/2006 | Greene et al. |
| 2006/0156579 A1 | 7/2006 | Hoffer et al. |
| 2006/0218819 A1 | 10/2006 | Wu |
| 2006/0277792 A1 | 12/2006 | Schoenborn |
| 2006/0283046 A1 | 12/2006 | Mason |
| 2007/0199213 A1 | 8/2007 | Campbell et al. |
| 2007/0220778 A1 | 9/2007 | Fusco et al. |
| 2008/0052965 A1 | 3/2008 | Sato et al. |
| 2008/0060221 A1 | 3/2008 | Hottinger et al. |
| 2008/0244932 A1 | 10/2008 | Nau et al. |
| 2009/0061146 A1 | 3/2009 | Segato |
| 2009/0113758 A1 | 5/2009 | Nishiwaki et al. |
| 2009/0145004 A1 | 6/2009 | Jones |
| 2009/0217550 A1 | 9/2009 | Koo |

(56) References Cited

U.S. PATENT DOCUMENTS

| | | |
|---|---|---|
| 2009/0277047 A1 | 11/2009 | Polegato |
| 2009/0293309 A1 | 12/2009 | Keating et al. |
| 2009/0320330 A1 | 12/2009 | Borel et al. |
| 2010/0043255 A1 | 2/2010 | Trevino |
| 2010/0122472 A1 | 5/2010 | Wilson, III et al. |
| 2010/0154257 A1 | 6/2010 | Bosomworth et al. |
| 2010/0218397 A1 | 9/2010 | Nishiwaki et al. |
| 2010/0229426 A1 | 9/2010 | Brown |
| 2010/0287788 A1 | 11/2010 | Spanks et al. |
| 2010/0293811 A1 | 11/2010 | Truelsen |
| 2011/0047720 A1 | 3/2011 | Maranan et al. |
| 2011/0099845 A1 | 5/2011 | Miller |
| 2011/0146110 A1 | 6/2011 | Geer |
| 2011/0232135 A1 | 9/2011 | Dean et al. |
| 2011/0247237 A1 | 10/2011 | Jara et al. |
| 2011/0252668 A1 | 10/2011 | Chen |
| 2011/0283560 A1* | 11/2011 | Portzline .............. A43B 13/186 36/31 |
| 2012/0059075 A1 | 3/2012 | Prissok et al. |
| 2012/0073160 A1 | 3/2012 | Marvin et al. |
| 2012/0124861 A1 | 5/2012 | Losani |
| 2012/0174432 A1 | 7/2012 | Peyton |
| 2012/0177777 A1 | 7/2012 | Brown et al. |
| 2012/0204449 A1 | 8/2012 | Stockbridge et al. |
| 2012/0233877 A1 | 9/2012 | Swigart |
| 2012/0304491 A1 | 12/2012 | Kimura et al. |
| 2013/0019505 A1 | 1/2013 | Borel et al. |
| 2013/0150468 A1 | 6/2013 | Füssi et al. |
| 2013/0219752 A1 | 8/2013 | Dombrow et al. |
| 2013/0255103 A1 | 10/2013 | Dua et al. |
| 2013/0266792 A1 | 10/2013 | Nohara et al. |
| 2014/0017450 A1 | 1/2014 | Baghdadi et al. |
| 2014/0075778 A1* | 3/2014 | Bruce .................. A43B 7/1445 36/29 |
| 2014/0223777 A1 | 8/2014 | Whiteman |
| 2014/0227505 A1 | 8/2014 | Schiller et al. |
| 2014/0325871 A1 | 11/2014 | Price et al. |
| 2015/0082668 A1 | 3/2015 | Nakaya et al. |
| 2015/0089841 A1 | 4/2015 | Smaldone et al. |
| 2015/0166270 A1 | 6/2015 | Buscher et al. |
| 2015/0174808 A1 | 6/2015 | Rudolph et al. |
| 2015/0197617 A1 | 7/2015 | Prissok et al. |
| 2015/0237823 A1 | 8/2015 | Schmitt et al. |
| 2015/0313310 A1 | 11/2015 | Okamoto et al. |
| 2015/0344661 A1 | 12/2015 | Spies et al. |
| 2016/0037859 A1 | 2/2016 | Smith et al. |
| 2016/0046751 A1 | 2/2016 | Spies et al. |
| 2016/0121524 A1 | 5/2016 | Däschlein et al. |
| 2016/0227876 A1 | 8/2016 | Le et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2016/0346627 A1 | 12/2016 | Le et al. |
| 2017/0173910 A1 | 6/2017 | Wardlaw et al. |
| 2017/0253710 A1 | 9/2017 | Smith et al. |
| 2017/0259474 A1 | 9/2017 | Holmes et al. |
| 2017/0340067 A1 | 11/2017 | Dyckmans et al. |
| 2017/0341325 A1 | 11/2017 | Le et al. |
| 2017/0341326 A1 | 11/2017 | Holmes et al. |
| 2017/0341327 A1 | 11/2017 | Le et al. |
| 2018/0000197 A1 | 1/2018 | Wardlaw et al. |
| 2018/0035755 A1 | 2/2018 | Reinhardt et al. |
| 2018/0093437 A1 | 4/2018 | Wardlaw et al. |
| 2018/0154598 A1 | 6/2018 | Kurtz et al. |
| 2018/0206591 A1 | 7/2018 | Whiteman et al. |
| 2018/0235310 A1 | 8/2018 | Wardlaw et al. |
| 2018/0290349 A1 | 10/2018 | Kirupananthan et al. |
| 2018/0303198 A1 | 10/2018 | Reinhardt et al. |
| 2019/0021435 A1 | 1/2019 | Kormann et al. |
| 2019/0291371 A1 | 9/2019 | Wardlaw et al. |
| 2020/0060383 A1 | 2/2020 | Le et al. |
| 2020/0113280 A1 | 4/2020 | Wardlaw et al. |
| 2020/0221820 A1 | 7/2020 | Le et al. |
| 2020/0230905 A1 | 7/2020 | Le et al. |
| 2020/0253328 A1 | 8/2020 | Reinhardt et al. |

FOREIGN PATENT DOCUMENTS

| | | |
|---|---|---|
| CN | 1451332 A | 10/2003 |
| CN | 2722676 Y | 9/2005 |
| CN | 2796454 Y | 7/2006 |
| CN | 2888936 Y | 4/2007 |
| CN | 101003679 A | 7/2007 |
| CN | 101107113 | 1/2008 |
| CN | 101190049 | 6/2008 |
| CN | 201223028 | 4/2009 |
| CN | 101484035 A | 7/2009 |
| CN | 201341504 Y | 11/2009 |
| CN | 101611950 | 12/2009 |
| CN | 202233324 U | 5/2012 |
| CN | 202635746 U | 1/2013 |
| CN | 102917612 A | 2/2013 |
| CN | 102970891 A | 3/2013 |
| CN | 203182138 U | 9/2013 |
| CN | 103371564 | 10/2013 |
| CN | 203262404 U | 11/2013 |
| CN | 203618871 U | 6/2014 |
| CN | 203692653 | 7/2014 |
| CN | 103976506 A | 8/2014 |
| CN | 104106876 A | 10/2014 |
| CN | 104320985 A | 1/2015 |
| CN | 104640468 | 5/2015 |
| DE | 29718491 | 2/1998 |
| DE | 19950121 | 11/2000 |
| DE | 102004063803 | 7/2006 |
| DE | 102009004386 | 7/2010 |
| DE | 202010015777 | 1/2011 |
| DE | 102010052783 A1 | 5/2012 |
| DE | 102012206094 A1 | 10/2013 |
| DE | 102013202291 | 8/2014 |
| DE | 102013202353 | 8/2014 |
| EP | 0165353 | 12/1985 |
| EP | 0752216 A2 | 1/1997 |
| EP | 0958752 A1 | 11/1999 |
| EP | 1424105 | 6/2004 |
| EP | 1402796 | 1/2006 |
| EP | 1872924 | 1/2008 |
| EP | 2110037 A1 | 10/2009 |
| EP | 2250917 A1 | 11/2010 |
| EP | 2316293 | 5/2011 |
| EP | 2342986 A1 | 7/2011 |
| EP | 2446768 A2 | 5/2012 |
| EP | 2204102 B1 | 8/2013 |
| EP | 2540184 B1 | 7/2014 |
| EP | 2792261 A1 | 10/2014 |
| EP | 2848144 A1 | 3/2015 |
| EP | 2939558 A1 | 11/2015 |
| EP | 3067100 | 9/2016 |
| ES | 1073997 | 6/2011 |
| GB | 2425242 A | 10/2006 |
| JP | 57501062 A | 6/1982 |
| JP | S63-159501 | 10/1988 |
| JP | 01274705 A | 11/1989 |
| JP | H03-170102 A | 7/1991 |
| JP | 04502780 | 5/1992 |
| JP | 6046483 U | 6/1994 |
| JP | 10152575 | 6/1998 |
| JP | 2913603 B1 | 6/1999 |
| JP | 2000-197503 A | 7/2000 |
| JP | 2002238609 | 8/2002 |
| JP | 2002-325602 A | 11/2002 |
| JP | 2005095388 | 4/2005 |
| JP | 2005-218543 A | 8/2005 |
| JP | 2007516109 | 6/2007 |
| JP | 2008-509734 A | 4/2008 |
| JP | 2008073548 | 4/2008 |
| JP | 2008-532618 | 8/2008 |
| JP | 2008543401 | 12/2008 |
| JP | 2009-142705 A | 7/2009 |
| JP | 2009527326 | 7/2009 |
| JP | 2009-535157 A | 10/2009 |

(56) References Cited

FOREIGN PATENT DOCUMENTS

| | | | |
|---|---|---|---|
| JP | 2010-017364 A | 1/2010 | |
| JP | 2011-177403 | 9/2011 | |
| JP | 2011-234901 A | 11/2011 | |
| JP | 2012-528661 A | 11/2012 | |
| JP | 2012-249744 A | 12/2012 | |
| JP | 6247107 B2 | 11/2017 | |
| JP | 6679363 B2 | 3/2020 | |
| WO | 1994020568 A1 | 9/1994 | |
| WO | 2001/001806 A1 | 1/2001 | |
| WO | 2002/008322 | 1/2002 | |
| WO | 2005023920 | 3/2005 | |
| WO | 2005026243 A1 | 3/2005 | |
| WO | 2005038706 | 4/2005 | |
| WO | 2005/066250 A1 | 7/2005 | |
| WO | 2006027671 | 3/2006 | |
| WO | 2006/034807 A1 | 4/2006 | |
| WO | 2006038357 | 4/2006 | |
| WO | 2006090221 | 8/2006 | |
| WO | 2007/082838 A1 | 7/2007 | |
| WO | 2007100451 | 9/2007 | |
| WO | 2008047538 A1 | 4/2008 | |
| WO | 2008/058147 A2 | 5/2008 | |
| WO | 2008/087078 A1 | 7/2008 | |
| WO | 2009039555 | 4/2009 | |
| WO | 20091 46368 | 12/2009 | |
| WO | 2010/037028 A | 4/2010 | |
| WO | 2010038266 | 4/2010 | |
| WO | 2010/136398 A1 | 12/2010 | |
| WO | 2011134996 A1 | 11/2011 | |
| WO | 2012/065926 A1 | 5/2012 | |
| WO | 2013168256 | 11/2013 | |
| WO | 2014/046940 A1 | 3/2014 | |
| WO | 2014/119774 A1 | 8/2014 | |
| WO | 2015052265 A1 | 4/2015 | |
| WO | 2015052267 A1 | 4/2015 | |
| WO | 2015075546 A1 | 5/2015 | |

OTHER PUBLICATIONS

U.S. Appl. No. 15/078,043, Final Office Action, Feb. 10, 2020, 13 pages.
U.S. Appl. No. 15/078,043, Final Office Action, Jan. 15, 2019, 14 pages.
U.S. Appl. No. 15/078,043, Non-Final Office Action, Apr. 29, 2019, 14 pages.
U.S. Appl. No. 15/078,043, Non-Final Office Action, Jul. 17, 2018, 15 pages.
U.S. Appl. No. 15/078,043, Restriction Requirement, Apr. 11, 2018, 8 pages.
U.S. Appl. No. 16/908,945, filed Jun. 23, 2020, Unpublished.
U.S. Appl. No. 16/918,014, filed Jul. 1, 2020, Unpublished.
U.S. Appl. No. 16/918,241, filed Jul. 1, 2020, Unpublished.
U.S. Appl. No. 17/004,430, filed Aug. 27, 2020, Unpublished.
U.S. Appl. No. 29/643,233, filed Apr. 5, 2018, Unpublished.
U.S. Appl. No. 29/730,512, filed Apr. 6, 2020, Unpublished.
U.S. Appl. No. 29/697,489, filed Jul. 9, 2019, Unpublished.
U.S. Appl. No. 29/719,889, filed Jan. 8, 2020, Unpublished.
U.S. Appl. No. 29/706,274, filed Sep. 19, 2019, Unpublished.
U.S. Appl. No. 29/721,029, filed Jan. 17, 2020, Unpublished.
Office Action, European Patent Application No. 20212451.7, Jul. 12, 2023, 8 pages.
Office Action, Japanese Patent Application No. 2020-048132, Oct. 25, 2022, 12 pages.
Office Action, Chinese Application No. 201911105923.2, Jan. 19, 2023, 7 pages.
Office Action, Chinese Patent Application No. 201911105923.2, Oct. 24, 2022, 9 pages.
Decision of Rejection, Chinese Patent Application No. 201911105923. 2, May 7, 2022, 22 pages.
Summons to Attend Oral Proceedings Pursuant to Rule 115(1) EPC, European Patent Application No. 16161915.0, Jun. 27, 2022, 20 pages.
Decision of Rejection, Japanese Patent Application No. 2020-048132, Oct. 26, 2021, 6 pages.
Office Action, Chinese Patent Application No. 201911105923.2, Dec. 2, 2021, 26 pages.
Office Action, Japanese Patent Application No. 2020-048132, Jun. 8, 2021, 10 pages.
Office Action, Chinese Patent Application No. 201911105923.2, Jul. 21, 2021, 9 pages.
European Extended Search Report, European Patent Application No. 20212451.7, Mar. 12, 2021, 8 pages.
Office Action, Chinese Patent Application No. 201911106601.X, Feb. 24, 2021, 13 pages.
Office Action, Chinese Patent Application No. 201911105923.2, Mar. 2, 2021, 28 pages.
"https://www.britannica.com/print/article/463684", Aug. 17, 2016, 15 pgs.
U.S. Appl. No. 62/137,139, Unpublished, filed Mar. 23, 2015.
"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.
"http://www.dow.com/polyethylene/na/en/fab/foaming.htm", Dec. 7, 2011, 1 page.
NAUTA, "Stabilisation of Low Density, Closed Cell Polyethylene Foam", University of Twente, Netherlands, 2000, 148 pages.
European Search Report, European Patent Application No. 16161915. 0, Dec. 9, 2016, 7 pages.
Third Party Submission, U.S. Appl. No. 14/981,168, Nov. 14, 2016, 44 pages.
AZO Materials, ""BASF Develops Expanded Thermoplastic Polyurethane", available http://www.azom.com/news.aspxNewsID= 37360", Jul. 2, 2013, 4 pages.
Office Action, Chinese Patent Application No. 201610169608.6, mailed May 10, 2017.
European Search Report, European Patent Application No. 16161915. 0, mailed Dec. 9, 2016.
Office Action, Japanese Patent Application No. 2016-057607, Sep. 4, 2018, 11 pages.
U.S. Appl. No. 29/664,097, filed Sep. 21, 2018, Unpublished.
U.S. Appl. No. 29/663,029, filed Sep. 11, 2018, Unpublished.
U.S. Appl. No. 29/679,962, filed Feb. 12, 2019, Unpublished.
Office Action, Japanese Patent Application No. 2016-057607, Apr. 23, 2019, 6 pages.
Notification to Grant, Chinese Patent Application No. 201610169608, Sep. 3, 2019, 3 pages.
Office Action, Chinese Patent Application No. 201610169608, Jan. 19, 2018, 11 pages.
Office Action, Chinese Patent Application No. 201610169608, Aug. 24, 2018, 14 pages.
Office Action, Chinese Patent Application No. 201610169608, Feb. 19, 2019, 14 pages.
Office Action, Japanese Patent Application No. 2016-057607, Sep. 17, 2019, 6 pages.
Office Action, European Patent Application No. 16161915.0, May 20, 2019, 5 pages.
U.S. Appl. No. 29/691,166, filed May 14, 2019, Unpublished.
U.S. Appl. No. 29/691,854, filed May 20, 2019, Unpublished.
U.S. Appl. No. 29/693,455, filed Jun. 3, 2019, Unpublished.
U.S. Appl. No. 16/918,905, Non-Final Office Action, May 9, 2022, 12 pages.
U.S. Appl. No. 16/918,905, Final Office Action, Nov. 30, 2022, 15 pages.
U.S. Appl. No. 16/918,905, Non-Final Office Action, Mar. 20, 2023, 12 pages.
U.S. Appl. No. 16/918,905, Final Office Action, Aug. 10, 2023, 8 pages.
U.S. Appl. No. 16/918,905, Notice of Allowance, Dec. 20, 2023, 11 pages.

* cited by examiner

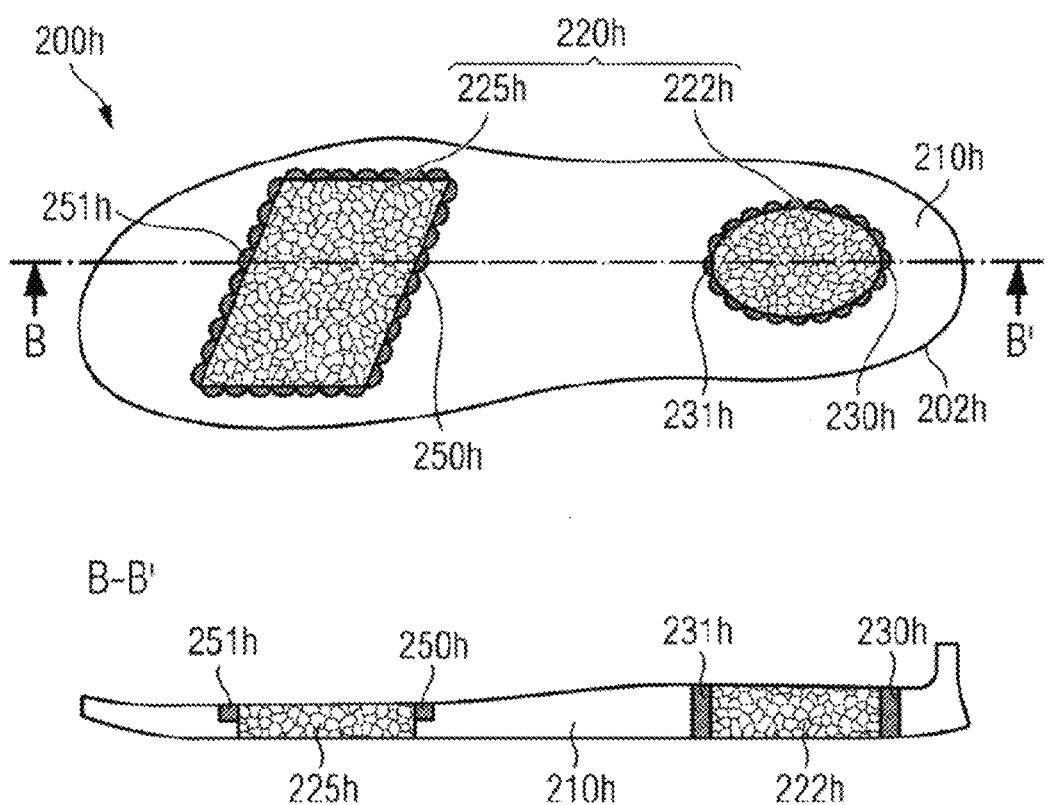

FIG 3
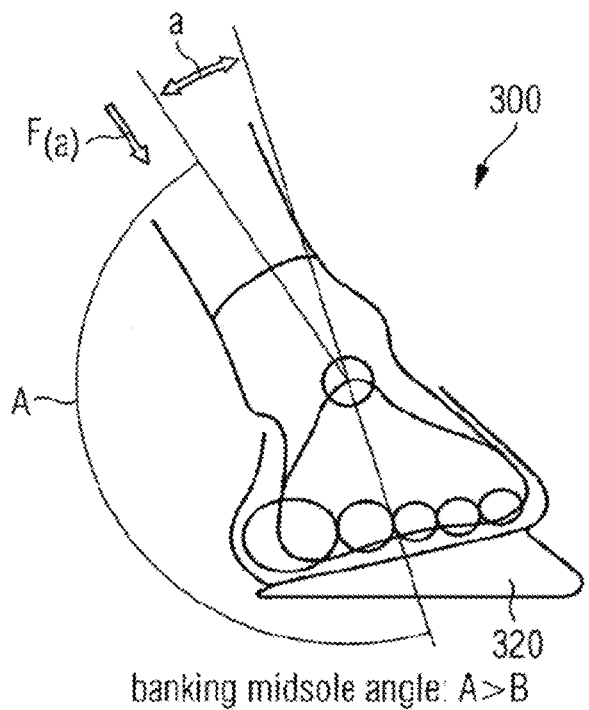
banking midsole angle: A>B
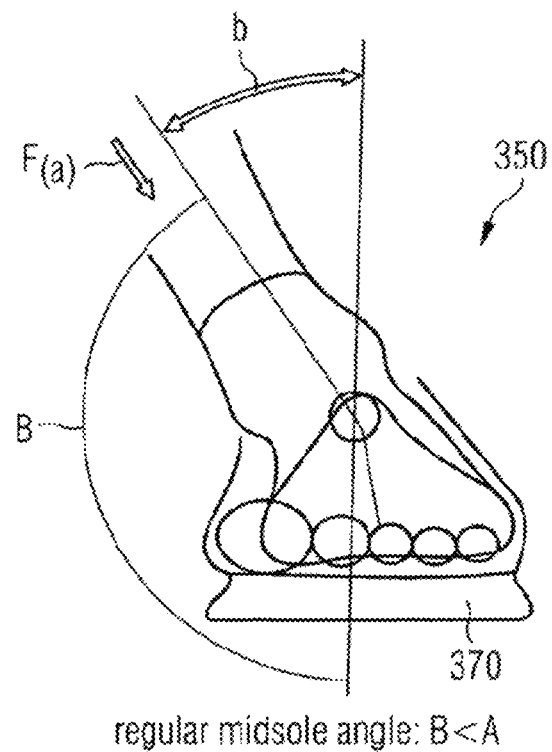
regular midsole angle: B<A

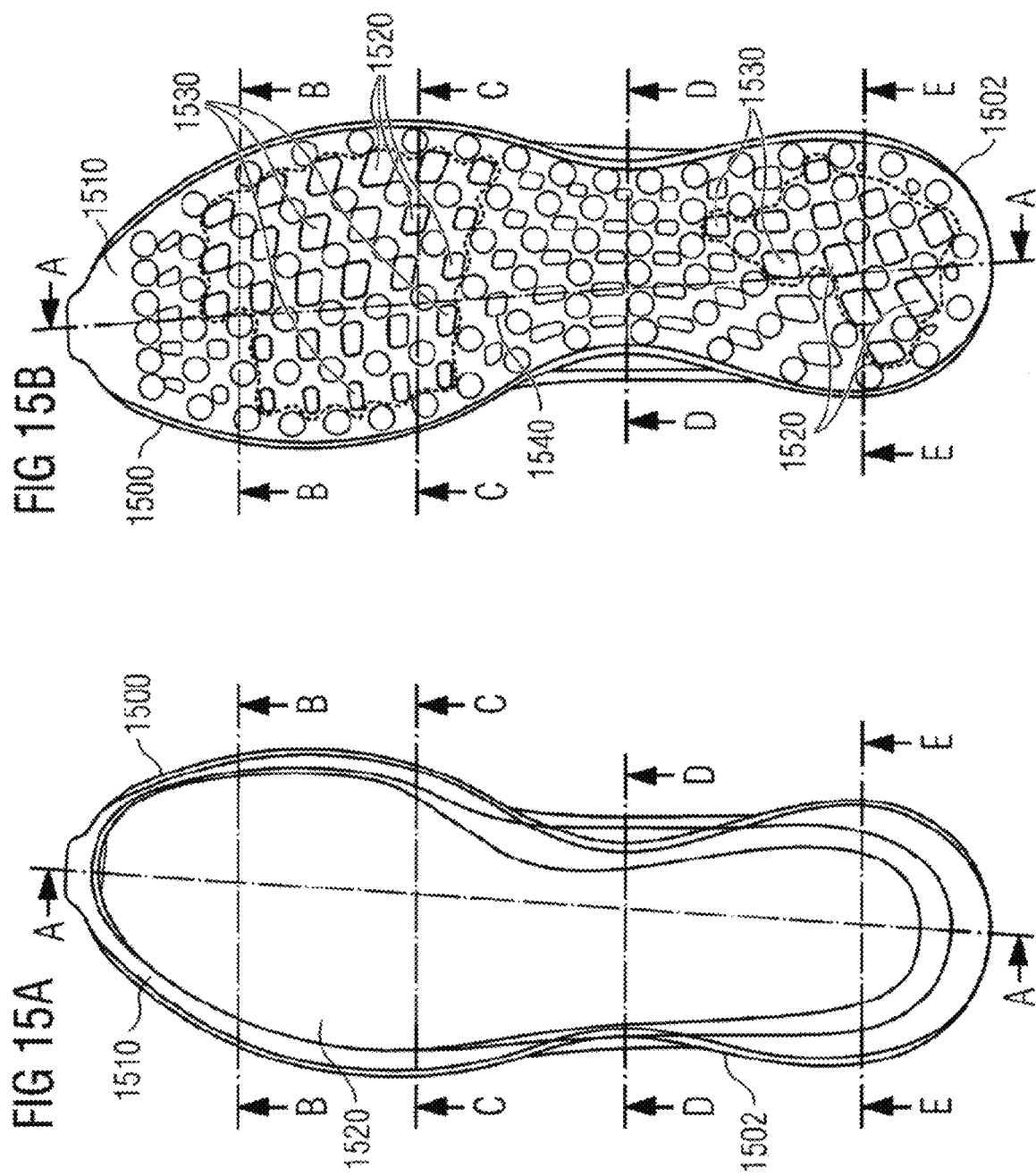

FIG 15H
FIG 15I
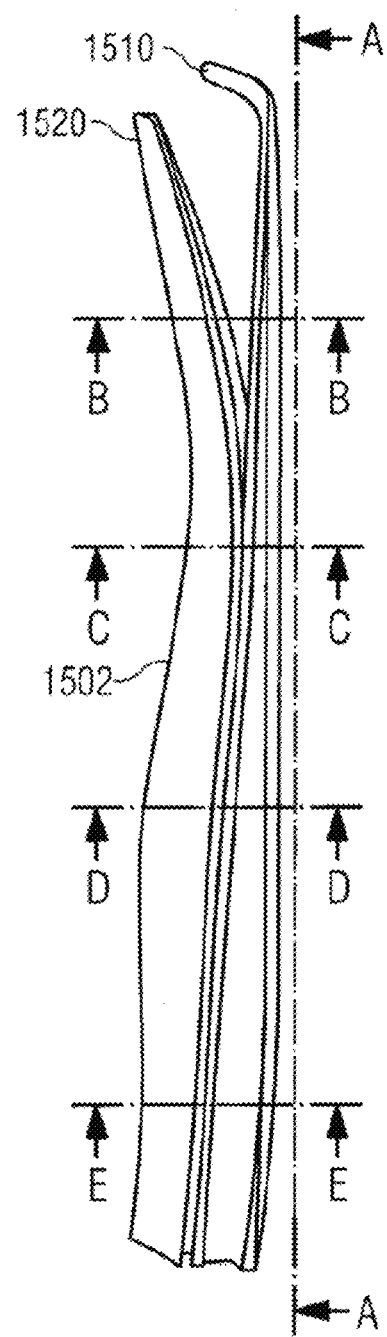
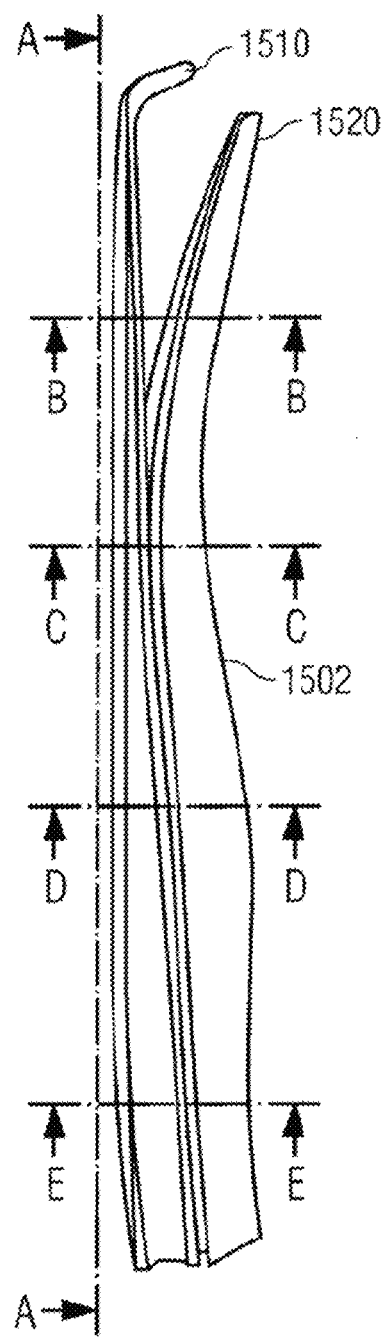

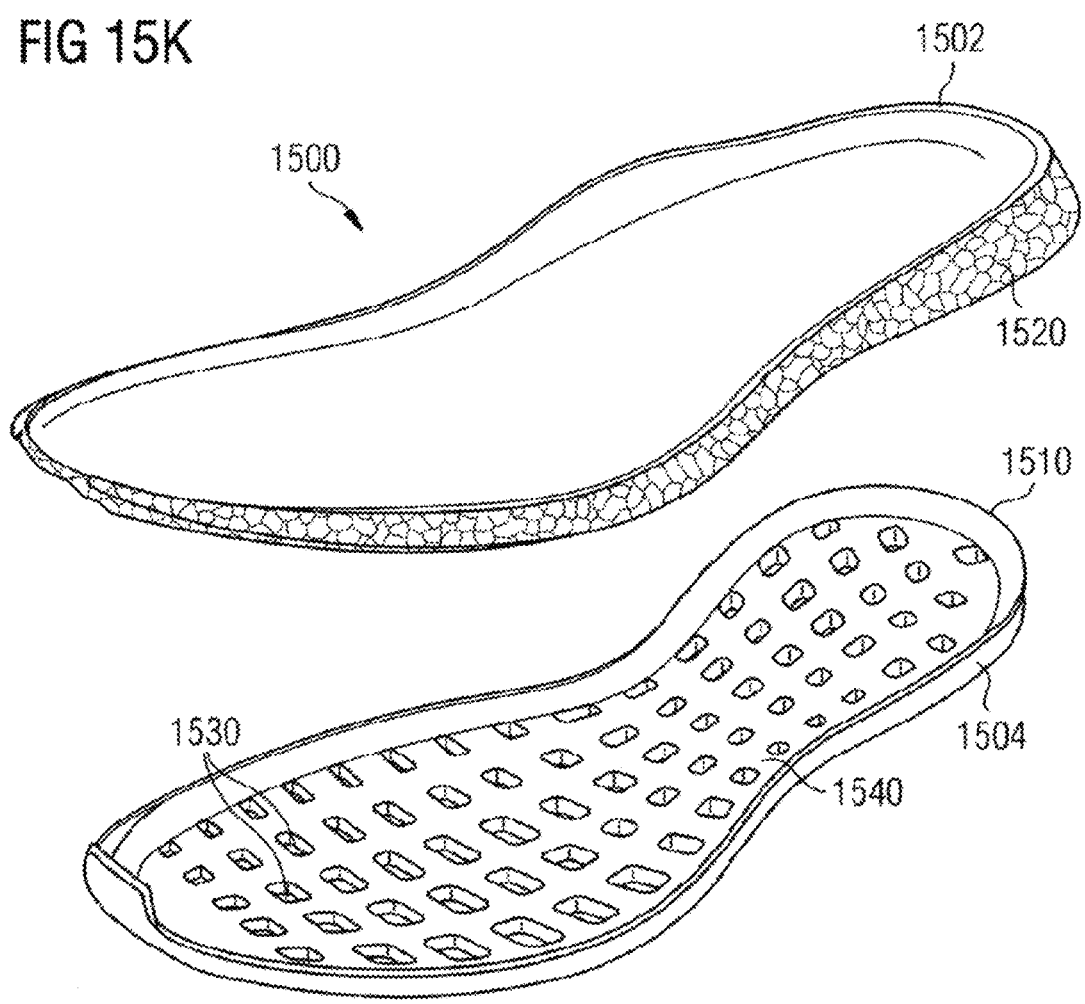

SHOE AND SOLE

CROSS-REFERENCE TO RELATED APPLICATIONS

The present application is a divisional of U.S. application Ser. No. 16/918,905, titled "SOLE AND SHOE," filed Jul. 1, 2020 ("the '905 application"), which is a continuation of U.S. application Ser. No. 15/078,043, titled "SOLE AND SHOE," filed Mar. 23, 2016 ("the '043 application"), which claims the benefit of U.S. Provisional Application No. 62/137,139, titled "SOLE AND SHOE," filed on Mar. 23, 2015, the entirety of which are incorporated herein by reference.

FIELD OF THE INVENTION

The present invention relates to a sole for a shoe, in particular for a sports shoe, as well as a shoe with such a sole.

BACKGROUND

By means of soles, shoes are provided with a variety of different properties which may, depending on the specific type of shoe, be realized to different extents. A shoe sole may, for example, protect the shoe from excessive abrasion by means of its increased abrasion resistance. Moreover, shoe soles usually serve protective purposes, for example, to protect a wearer's foot from injuries caused by sharp or pointed objects on which the wearer may tread.

To further prevent injuries or an overstraining of the musculoskeletal system of the wearer, a sole may also provide improved stability to the wearer's foot and a cushioning of forces acting upon impact with the ground. The sole may also provide increased grip of the shoe on the ground to facilitate quick movements and changes of direction. In particular for lateral sports like for example tennis or basketball, the stability, grip and cushioning requirements are concurrently all strongly pronounced.

Various sole constructions known in the prior art achieve stabilization of the foot and good grip of the shoe on the ground. For example, stabilizing elements like a pronation or supination support in the midfoot or heel region are generally known. Also known are different materials for the construction of soles, including but not limited to ethylene-vinyl-acetate ("EVA"), thermoplastic polyurethane ("TPU"), rubber, polypropylene ("PP"), polyamide ("PA"), polyether-block-amide ("PEBA"), polystyrene ("PS"), and other similar materials.

However, the requirements of stability and grip often compete against the requirements for good cushioning of the foot, so that the sole constructions known from prior art have the disadvantage that emphasis is usually put either on stability/grip requirements or on cushioning requirements.

Moreover, in particular for sports shoes, it is of importance that the cushioning and stabilization of the foot is not achieved at the expense of an athlete's performance. That is, care must be taken that as little energy as possible is dissipated within the sole of the shoe and as much energy as possible is returned to the athlete. However, the high weight of some of the materials used in the prior art to improve the performance might be a concern.

It is therefore an objective of the present invention to provide soles for shoes that concurrently satisfy high stability and cushioning requirements. It is furthermore an objective of the present invention to facilitate the return of energy exerted by a wearer during his movements back to the wearer.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The term "particle foam" is used herein to refer to foamed polymers in particulate form. Particle foam includes materials which have been expanded. For example, those skilled in the art may refer to particle foam as "beads", "bead foam", "foamed pellets", and/or other terms known in art.

The term "particle foam components" is used herein to refer to components made from particle foams. Particle foam components may include particle foams of one or more expanded materials. In some embodiments, particles of particle foam within the component made from particle foam may be randomly arranged, arranged, and/or any combinations thereof.

The term "expanded material" is used herein to refer to material that this been foamed to form a particle foam.

The term "deformation" is used herein to refer to the movement of material under a load.

Certain embodiments of the present invention include a sole with a midsole. The midsole may include a first sole region comprising particle foam, and a deformation region positioned proximate the first sole region, wherein the deformation region comprises a volume greater than that of a single expanded particle in the particle foam and is configured to allow deformation of the particle foam of the first sole region under a pressure load on the sole.

In some embodiments, the deformation is sideward in direction. The deformation region may be at least partially provided as an empty space.

In some embodiments, the midsole further comprises a control element that limits the deformation of the particle foam of the first sole region. The control element may comprise at least a part of the deformation region. The control element may also comprise a groove. In certain embodiments, the control element at least partially bounds the first sole region on its sides. In further embodiments, the control element may be free from particles of the particle foam.

According to some embodiments, the deformation region comprises a material that yields to the deformation of the material of the first sole region. The yielding material may have a deformation stiffness that is 5%-40% greater than the deformation stiffness of the first sole region. For example, the deformation material may be a very soft material, such as a gel-like material.

Certain embodiments comprise a shoe with a sole according to the above embodiments.

In some embodiments, the sole further comprises a second sole region comprising particle foam and providing an increasing deformation stiffness along at least one predetermined direction.

The increase in deformation stiffness may be at least partially due to an increase in density of the particle foam of the second sole region along the at least one predetermined direction. In some embodiments, the at least one predetermined direction extends from the medial side of the sole towards the lateral side of the sole.

The increase in deformation stiffness in the second sole region may be smaller in an area where impact occurs and larger on an opposite side of the second sole region. In these embodiments, at least the second sole region tilts inwards toward the impact area due to a stronger compression of the second sole region in the impact area. At least one of a shape, size, and location of the deformation region provides the deformation region with predetermined properties.

According to some embodiments, the first sole region extends into a forefoot region and the second sole region extends into a heel region. The first sole region and the second sole region may at least partially coincide.

According to certain embodiments of the present invention, a sole comprises a midsole comprising a first sole region, wherein the first sole region comprises particle foam, a deformation region within the midsole, wherein the deformation region comprises a volume greater than that of a single expanded particle and is positioned so that it allows a sideward deformation of the particle foam of the first sole region under a pressure load on the sole, and a frame element, which at least partially surrounds the midsole and which limits the sideward deformation of the midsole under the pressure load on the sole.

In some embodiments, the frame element completely encompasses a heel region on its sides, and only partly encompasses a forefoot region on its sides. The frame element may further comprise a supporting element, wherein the supporting element is arranged on the lateral side of a heel region.

In certain embodiments, the midsole further comprises a control element that limits the sideward deformation of the particle foam of the first sole region. The control element and the frame element may at least partially coincide.

In some embodiments, the frame element comprises at least one bar that serves to secure the frame element on the midsole. The at least one bar may be at least partly surrounded by the particle foam of the midsole.

According to certain embodiments of the present invention, a sole comprises a midsole comprising particles of a particle foam, and an outsole comprising at least one deformation region comprising a volume greater than that of a single expanded particle in the particle foam, wherein the at least one deformation region is configured to allow deformation of at least a portion of the particle foam of the midsole under a pressure load on the sole, and wherein the outsole limits the deformation of the midsole under the pressure load on the sole.

BRIEF DESCRIPTION OF THE DRAWINGS

In the following detailed description, various embodiments of the present invention are described with reference to the following figures:

FIGS. 2a-2h are views of soles for shoes comprising a deformation region, according to certain embodiments of the present invention.

FIG. 3 are illustrations of the concept of a "banking midsole" to alleviate the strain on the ankle joint, according to certain embodiments of the present invention.

FIG. 15A is a top view of a midsole comprising a first sole region and a first sole part comprising a grid structure, according to certain embodiments of the present invention.

FIG. 15B is a bottom view of the midsole of FIG. 15A.

FIG. 15H is a medial view of the midsole of FIG. 15A.

FIG. 15I is a lateral view of the midsole of FIG. 15A.

FIG. 15K is an expanded perspective view of the midsole depicted in FIG. 15J.

FIG. 33 is an exploded perspective top view of a portion of an upper, a first sole region and a first sole part, according to certain embodiments of the present invention.

BRIEF DESCRIPTION

Figure 1:
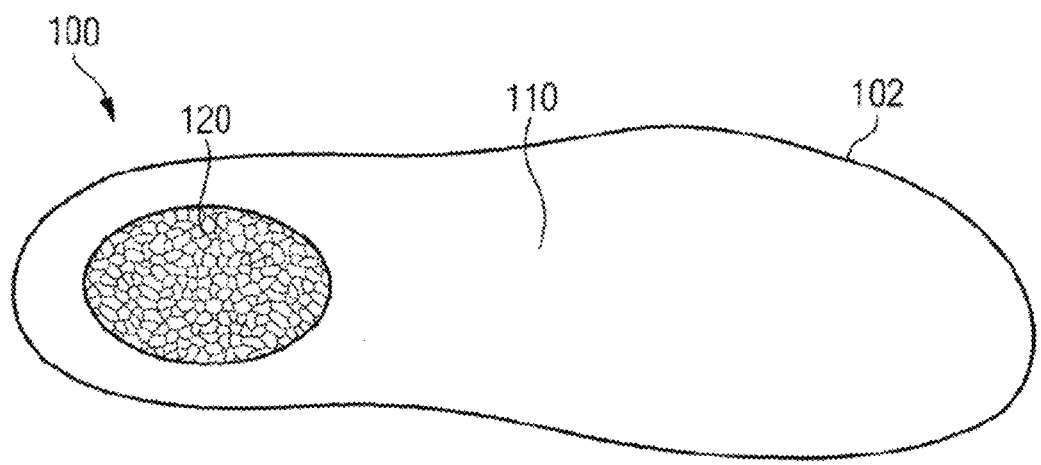
FIG. 1 is a view of a sole for a shoe without a deformation region, according to certain embodiments of the present invention.

According to an aspect of the invention, the above mentioned objectives are at least partially achieved by a sole for a shoe, in particular a sports shoe, with a midsole, wherein the midsole comprises a first sole region, which comprises particle foam, and wherein the midsole further comprises a deformation region within the midsole, wherein the deformation region comprises a volume greater than that of a single expanded particle and is positioned so that it allows a downward, sideward, or substantially sideward deformation of the material of the first sole region under a pressure load on the sole.

For example, during a tennis game, a multitude of different movement patterns may be executed by an athlete: the foot may contact the ground via a posterior heel strike, a medial heel strike, a lateral heel strike or a medial forefoot strike and such different impact patterns may result, among other things, in an ankle inversion, an ankle eversion, ankle plantarflexion, ankle dorsiflexion or MT extension. To facilitate fast execution of such movements, the sole should provide good grip on the surface and it should also relieve the musculoskeletal system from at least a part of the strain resulting from these movements, as already mentioned above. This necessitates a high degree of stability of the shoe and, in particular, its sole, so that the shoe doesn't "break out" under the impact of such strong forces. A person of ordinary skill in the relevant art will understand that the term "break out" means that the shoe fails to provide the necessary lateral support to the musculoskeletal system to prevent the ankle from hyperextending in a lateral direction.

On the other hand, it is desirable that the shoe also provides a cushioning effect for the foot, in particular in the heel region, where typically the strongest impact forces occur, and a good energy return to the wearer in order to improve his or her performance. To provide such a cushioning and energy return effect, particle foams may be employed, since such materials may have particularly good elastic and cushioning properties. Examples of particle foams may comprise expanded polypropylene ("ePP"), expanded polyamide ("ePA"), expanded polyether-block-amide ("ePEBA"), expanded thermo-plastic polyurethane ("eTPU"), and other similar materials. Furthermore, the use of particle foam may greatly facilitate manufacture of soles comprising such particles, since no special arrangement of the particles, for example, within a mold, is necessary and the particles may be blown or swept into the mold by a stream of air, steam, liquid, liquid-like powder materials, or the like. The particles may then be easily subjected to further processing steps, like a pressure and/or steaming process, or fusion by melting the particle surfaces, under which they bond together without the need for further adhesives or the like.

Expanded TPU, for example, provides excellent elastic and cushioning properties. Thus, external shocks that arise, for example, when the sole hits the ground may be cushioned such that a pleasant wearing comfort is achieved. On the other hand, expanded TPU may provide a great amount of elasticity. Therefore, the energy that is absorbed for deforming the sole is released again by the sole and is not lost. The regained energy may be used for push-off from the ground after the sole has hit the ground since the sole springs back essentially without any loss of energy. For example for a tennis player, this means that he may change direction with reduced effort and maintain a high level of agility over a longer period of time, thus improving his overall performance.

A problem arises, however, in view of the above mentioned need for high stability of the sole. In a sense, the requirement of high stability and grip on the one side, and high cushioning and energy return on the other side, are opposing each other. In particular, by "locking up" the areas comprising the particle foam intended for shock absorption with high energy return within an area surrounded by an inflexible and unyielding material intended to provide stability to the sole, as is commonly the case with sole constructions known from the prior art, the above mentioned good cushioning and elastic properties of the particle foam may be strongly compromised, since it has "nowhere to go". A person of ordinary skill in the relevant art will understand that the term "locking up" means that the areas comprising the particle foam are prevented from deforming beyond the inflexible and unyielding surrounding material.

Hence, the entire pressure load has to be absorbed by an internal compression of the particle foam. Even particle foams, however, at some stage reach a level of compression where their elastic and cushioning properties deteriorate so that a substantial amount of energy may be lost during compression and subsequent expansion of the material, for example, due to hysteresis.

This problem is at least partially alleviated by the present invention by providing a deformation region within the midsole that allows a sideward deformation of the material of the first sole region under a pressure load on the sole. Hence, the particle foam may react on the strong forces that may occur, for example, during impact with the ground, by at least partially "pressing" or "squeezing" into the deformation region. Since the deformation region has a volume larger than that of a single particle, there is enough room available without significantly compromising the integrity of the particle foam, for example, by destroying the particle-like structure of the particle foam.

As a result, an unwanted internal compression of the particle foam may be avoided or at least reduced. Thus, the cushioning and elastic properties of the particle foam may be maintained even under exceptional impact forces. Furthermore, by providing the deformation region in different locations and different sizes within the midsole, the exact elastic and cushioning properties of the particle foam in the first sole region may be selectively and locally adjusted, as required for a specific sole or shoe.

By providing the deformation regions within the midsole, the particle foam may be protected from outside influences like water, dirt, UV-radiation and so forth, and the deformation region may also not be "congested" by water or dirt, for example.

Moreover, by arranging the deformation region in such a way as to allow the particle foam to move and/or press in a sideways manner, i.e. by a sideward deformation, the overall thickness and stability of the sole may be maintained, giving the wearer the support needed, for example, for a quick change of direction. A sideward deformation herein means a deformation in a predominantly horizontal direction, or more precisely in a direction essentially parallel to the ground the wearer treads on. Thus, the deformation may predominantly occur in the medial/lateral direction or in a direction from the heel to the toes and so forth.

In some embodiments, a deformation zone is provided such that deformation occurs in vertical direction. For example, a deformation zone may be provided on and/or proximate the ground contacting surface. In these instances, deformation of the particle foam may occur into the expansion zone in a downward direction.

In some embodiments, the deformation region is at least partially provided as an empty space.

This is an option that is easy to manufacture and also may help to reduce weight of the sole or shoe, which may further help to improve the wearer's performance and endurance.

In certain embodiments, the midsole further comprises a control element which limits the sideward deformation of the material of the first sole region.

As mentioned, a basic stability of the sole is necessary in order to prevent injuries and provide the wearer with a feeling of support and "engagement" with the ground when treading down. By the use of such a control element, the exact cushioning and elastic properties of the first sole region may be further adjusted as desired to achieve an optimal balance between softness and energy return on the one side, and stability and support of the foot on the other side.

In some embodiments, the control element comprises at least a part of the deformation region.

In this manner, the number of individual parts of the sole may be reduced, thereby potentially saving weight, manufacturing expenses, and bonding agents, and improving the stability, durability, and ecological friendliness of the sole.

In certain embodiments, the control element comprises a groove. Moreover, it is also possible that the control element comprises at least one split and/or cut.

A groove may, among other things, be easily milled out of the control element. Herein, the depth, width, length, cross-sectional shape, etc. of the groove may be influenced, for example, by using different milling tools, so that the cushioning and elastic properties of the first sole region may be adjusted. Furthermore, using a groove, in particular a horizontal groove, as at least part of the deformation region, allows the first sole region and the control element to contact each other in regions adjacent to the groove, which may help to provide a good overall stability to the sole. Splits or cuts may provide further design possibilities that may share some or all of these features.

In some embodiments, the control element encircles the first sole region on its sides.

In this way, the cushioning and elastic properties of the first sole region may be balanced since the sideward deformation of the first sole region under a pressure load on the sole is controlled in every direction by the control element. Furthermore, such a construction may also help to improve the overall stability of the sole.

In certain embodiments, the control element is free from particles of the particle foam. Since the control element, among other things, serves to limit and control the sideward deformation of the first sole region under a pressure load as well as to provide stability to the sole, the material of the control element may have a greater stiffness and intrinsic stability than the first sole region. For such stabilizing parts of the sole, but also for foils or other shoe elements or textiles, materials that are free from expanded particles that may be suitable materials include but are not limited to EVA, PP, PA, PS, TPU, PEBA, and other similar materials. These materials are, among other things, rather inexpensive, easily processed, and provide material characteristics that may be beneficial for the use in shoe soles.

In certain embodiments, the control element may also comprise a material with particles of a particle foam having a greater stiffness than the material of the first sole region.

In certain embodiments, at least one protrusion extends into the empty space that secures the first sole region within the midsole. By using protrusions to secure the first sole region within the midsole, the volume of the deformation region may be enlarged while at the same time providing support to prevent displacement of the first sole region from its position during use of the shoe/sole.

In certain embodiments, the deformation region comprises a material that yields to the sideward deformation of the material of the first sole region.

As a result, empty spaces within the midsole may be avoided, for example, for stability or comfort reasons, while still providing the sole with a "freed-up" first sole region that may serve to cushion the foot while providing a high energy return to the wearer. A person of ordinary skill in the relevant art will understand that "freed-up" means that the areas comprising particle foam are not prevented from deforming beyond the inflexible and unyielding surrounding material through the provision of the deformation regions.

Also, by using a yielding material within the deformation region, as compared to simple empty spaces, the sideward deformation of the first sole region under a pressure load on the sole may be controlled and adjusted even more precisely.

In some embodiments, the yielding material, i.e. the material that yields to the deformation of the material of the first sole region, within the deformation region has a deformation stiffness that is 5%-40%, and which may further have a deformation stiffness that is 10%-25%, greater than the deformation stiffness of the first sole region. For example, the first sole region may have a deformation stiffness of approximately 40 shore C, while the yielding material has a deformation stiffness of 45-50 shore C. In certain examples, the first sole region may comprise eTPU (or another particle foam) with a deformation stiffness of approximately 40 shore C, while the deformation region comprises EVA (or another expanded or non-expanded material) with a deformation stiffness of 45-50 shore C. In certain embodiments, the differences in deformation stiffness may be provided by different materials, as in the example above. But they may be also provided with the same material and different densities.

Use of a deformation region with a yielding material that has a deformation stiffness that is about 5%-40%, and which may further have a deformation stiffness that is about 10%-25%, higher than the deformation stiffness of the first sole region, provides overall stability of the sole while also allowing enough deformation of the yielding material to "free up" the first sole region so that the desired cushioning of the foot with high energy return to the wearer may be achieved. In specific embodiments, this design provides a midsole that is comprised of the first sole region and the deformation region without any additional midsole parts, which may help to reduce weight and manufacturing expenses.

In certain embodiments, the midsole comprises a second sole region that comprises particle foam and provides an increasing deformation stiffness along at least one predetermined direction.

In many movement patterns, in particular during sporting activities, large forces are exerted onto the joints and musculoskeletal apparatus of an athlete. For example, during a tennis game, the large variety of tennis movements like ankle inversion or eversion, ankle plantarflexion or dorsiflexion, or MT extension may result in a high excursion of the ankle joint and metatarsal phalangeal joint. By providing a second sole region comprising particle foam in such places of the sole where an impact likely occurs, a part of the strain on the athlete's joints may be relieved by the superior cushioning properties of the particle foam, as already indicated above. In more detail, if the deformation stiffness of the second sole region is smaller in an area where the impact occurs (e.g. the medial heel region during a medial cut or stop in tennis) as opposed to the opposite side of the second sole region (such as in the lateral heel region), then the second sole region, or the entire sole, will tilt inwards towards the area of impact due to a stronger compression of the second sole region in the impact area. As a consequence, the angle between the lower leg and the foot may be decreased, leading to less strain on the joints of the ankle.

The increase in deformation stiffness may be at least partially due to an increase in density of the material of the second sole region along the predetermined direction.

As a result, the second sole region may be manufactured from a single base material, leading to an integrally formed second sole region with good structural integrity.

In certain embodiments, the midsole may also comprise an even larger number of sole regions. For example, the midsole may comprise 3 or 4 sole regions. A person of ordinary skill in the relevant art will understand that the midsole may comprise any suitable number of sole regions including but not limited to 20-30, or even more, sole regions.

In certain embodiments, the at least one predetermined direction extends from the medial side of the sole towards the lateral side of the sole.

As described above, in particular during lateral sports like tennis or basketball, medial cuts or stops are frequently encountered such that a "banking sole" with a predetermined direction from the medial to the lateral side may be employed to alleviate the strain on a player's joint, e.g. during a tennis game.

In some embodiments, the first sole region extends into the forefoot region and the second sole region extends into the heel region.

High energy return may be of particular importance for push-off of the foot off the ground, for example during running. Push-off predominantly occurs in the forefoot region such that a freed-up first sole region may be particularly beneficial in the forefoot region. Impact of the foot on the ground, on the other hand, often occurs in the heel region of the foot, in particular in lateral sports like tennis as discussed above, such that a second sole region with variable deformation stiffness may be beneficial in the heel region. Other arrangements are, however, also possible, depending on the typical movement patterns involved in a given activity.

In certain embodiments, the first sole region and the second sole region may at least partially coincide.

As a result, the effects of "freeing up" the particle foam for good cushioning and energy return, as well as strain relief by way of a "banking" of the sole region may be combined in a given area of the sole, if desired.

In certain embodiments, the sole further comprises a frame element that at least partially surrounds the midsole and limits a sideward deformation of the midsole under a pressure load on the sole.

Such a frame element may serve, for example, to further increase the overall stability of the midsole or sole, without substantially impairing the cushioning and elastic properties of other midsole components. Hence, a frame element adds further possibilities to influence the stability properties of the sole that are essentially independent of the further options discussed above.

In some embodiments, the frame element may completely encompass the heel region on its sides, while only partly encompassing the forefoot region on its sides.

Good stability is of importance, in particular, in the heel region, as impact on the ground often occurs in this region, as discussed above. Therefore, the foot should be stabilized in that region in order to avoid a slipping of the foot or a twisting of an ankle, or the like. In the forefoot region, on the other hand, a certain degree of freedom of movement is desirable, in order to promote agility of the wearer and a dynamical push-off of the foot from the ground.

In certain embodiments, the frame element further comprises a supporting element, wherein the supporting element is arranged on the lateral side of the heel region.

Such a supporting element arranged on the lateral side of the heel region may further stabilize the foot, in particular during medial cuts or stops, and prevent the foot from "breaking out" to the side, which might easily lead to a strained ankle, for example. In some embodiments, the supporting element may be provided as one integral piece with the frame element in order to achieve the desired stability. Moreover, the frame element and/or the supporting element may be covered on the inside by a soft overcoat to increase wearing comfort and to help preventing a chaffing on the wearer's foot.

In certain embodiments, the control element and the frame element at least partially coincide.

For example, the control element and the frame element may be provided as one integral piece. In particular, the control element may be provided as part of a midsole and the frame element as a further stability frame surrounding the midsole and/or the control element to further increase the stability of the sole. In this case, the stability may be further increased, if the control element and the frame element are provided as a single integral piece without any seams, weld joints, bonding by glue, etc.

In some embodiments, the frame element comprises at least one bar that serves to secure the frame element on the midsole. In certain embodiments, the at least one bar is at least partly surrounded by the material of the midsole.

In this manner, the frame element may be arranged and affixed to the midsole without the use of additional bonding agents such as glue or other chemical fasteners. If desirable, however, such additional bonding agents may still be added in order to further strengthen the bond between the midsole and the frame element. Additionally, the at least one bar may assume further functions, such as acting as a torsion bar.

Further embodiments of the invention are provided by a shoe with an embodiment of a sole according to the invention as discussed herein.

It shall be mentioned here that in providing a shoe with an embodiment of a sole according to the invention, the different features discussed herein are optional rather than mandatory and these features may be combined as deemed fit by a person skilled in the art to obtain a certain desired result. Should some of the features discussed herein be expendable to achieve such a desired result, they may also be omitted without departing from the scope of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain embodiments of the invention are described in the following detailed description with regard to sports shoes. For example, some embodiments described herein may be useful for sports requiring lateral movements, such as tennis, basketball, football, soccer, handball, etc. However, emphasis is made with regard to the fact that the present invention is not limited to these embodiments. Rather, the present invention may also, for example, be used in shoes for linear sports as well as lateral sports, for example, basketball shoes, golf shoes, soccer shoes, hiking shoes or dance shoes as well as other kinds of sports shoes or conventional shoes, or in apparel for fashion or life style and so on.

Moreover, a number of technical implementations and embodiments of the invention are conceivable of which several are described in more detail in the following. However, the current invention is not limited to the embodiments specifically described herein.

According to certain embodiments of the present invention, as illustrated in FIG. 1, a sole 100 without a deformation region comprises a midsole 102 with a first midsole part 110 and a first sole region 120, which may comprise particle foam including but not limited to ePP, ePA, ePEBA, eTPU, and other similar materials. The first midsole part 110 may further comprise such materials as EVA, PP, PA, PS, TPU, PEBA, and other similar materials. In certain embodiments, the material of the first midsole part 110 comprises a greater stiffness than the material of the first sole region 120, in order to provide the necessary stability to the midsole.

In the context of this application, the term "sole region" may be used to designate parts of the midsole that extend from the bottom surface of the midsole, throughout the entire thickness of the midsole, up to the top surface of the midsole. The sole region may, moreover, have any shape and be arranged in any part of the midsole, i.e. also at the edge of the sole, etc. Furthermore, a sole region may also comprise multiple disconnected regions of the midsole. A "midsole part," on the other hand, is any part of the midsole.

Whereas the term "sole region" may have the meaning described above, it is to be noted, however, that a "sole region" may also designate more general parts of a midsole or a sole in general. A sole region may therefore also be a sole insert that is arranged on one side of the sole or midsole, for example the top side of the midsole, or be part of an insole or outsole, and so on.

In certain embodiments, the sole 100 shown in FIG. 1 may comprise the first sole region 120 that is "locked in" by the surrounding material of the first midsole part 110. Therefore, even though the material of the first sole region 120, for example a particle foam, may per se have very good cushioning and energy return properties, these beneficial properties may be compromised by completely surrounding the first sole region 120 by a stiffer material 110. In response to a pressure load on the sole 100, in particular on the first sole region 120, the material of the first sole region 120 may be compressed. If the pressure load is very intense and the material cannot move and/or deform under this intense load, then the material in the first sole region 120 may be compressed to a degree that it loses its above described beneficial properties (such as elasticity), at least partially or temporarily. For example, hysteresis might set in to a noticeable degree. Also, the danger is that, when subjected to such strong deformations over extended periods of time, the material of the first sole region 120 may deteriorate and permanently lose its elasticity.

FIGS. 2a-h, on the other hand, show embodiments of soles 200a-200h according to the invention that comprise deformation regions into which the particle foam of the first sole regions may move and/or deform sideways.

Figure 2A:
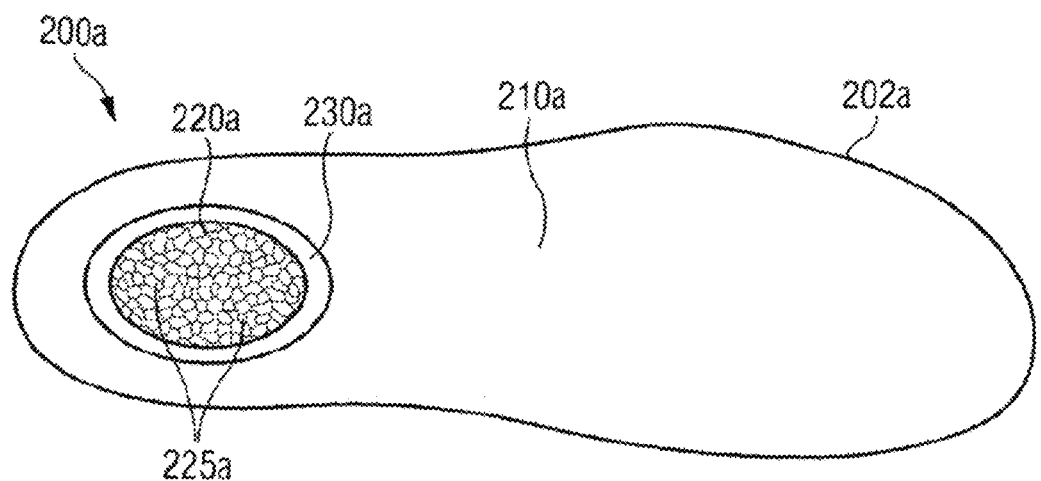

In certain embodiments, as illustrated in FIG. 2a, a sole 200a may comprise a midsole 202a with a first midsole part 210a. The midsole 202a may further comprise a first sole region 220a, which comprises particle foam 225a. The midsole 202a may also comprise a deformation region 230a within the midsole 202a. The deformation region 230a may comprise a volume greater than that of a single expanded particle of the particle foam 225a and is positioned so that it allows a sideward deformation of the material of the first sole region 220a under a pressure load on the sole 200a.

As will become apparent from the embodiments discussed in the following, the deformation region may comprise a volume that is greater than the volume of a single expanded particle within the midsole. Herein, the "volume of a single expanded particle" is to be understood as an average volume of the expanded particles within the first sole region when the sole is not put under pressure. In some cases, the volume of the deformation region is only, for example, 1.5, 2, 5 or 10 times as big as the volume of a single expanded particle. In other cases, it is much larger.

In certain embodiments, as shown in FIG. 2a, the first sole region 220a is arranged in the heel region and has an oval shape (in a top view of the midsole 202a). In these embodiments, the first sole region 220a may extend throughout the entire thickness of the midsole 202a, from its bottom side to its top side. However, the first sole region 220a may also be arranged in a different part of the midsole 202a, may have a different shape, may comprise multiple sub-regions, may only be arranged on one side of the midsole 202a, and so forth.

The deformation region 230a, which may completely encircle the first sole region 220a on its sides, may in the simplest case be at least partially provided as an empty space. If so, the first sole region 220a may, for example, be secured in its place by connecting the first sole region 220a with an insole (not shown) and/or an outsole (also not shown) that are to be attached to the midsole 202a. As further discussed below, the deformation region may also be at least partially filled with a yielding material, for example a very soft material like a gel-like material.

Figure 2B:
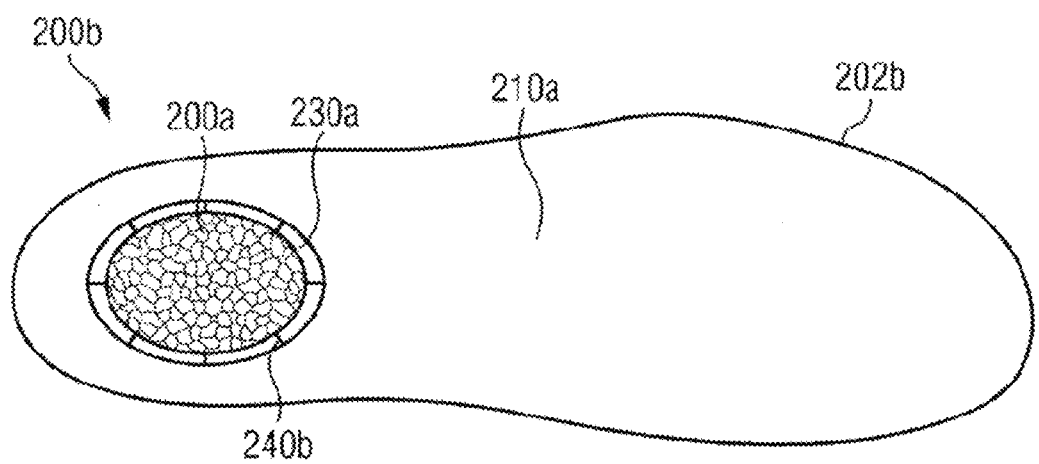

Certain embodiments, as illustrated in FIG. 2b, provide another possibility to secure the first sole region in its place. In these embodiments, a midsole 202b may additionally comprise at least one protrusion 240b extending into the deformation region 230a, which may be provided as an empty space as above discussed, to secure the first sole region 220a in its place within the midsole 202b.

In additional embodiments, however, the deformation region 230a may also comprise a material that yields to the deformation of the material of the first sole region 220a under a pressure load on the sole 200a or 200b. In certain examples, the material in the deformation region 230a may have a deformation stiffness that is 5%-40%, and may further have a deformation stiffness that is 10%-25% higher than the deformation stiffness of the first sole region 220a, in particular the particle foam of the first sole region 220a. This provides a good compromise between stability of the sole and the capacity of the material in the deformation region 230a to yield to a sideward deformation of the first sole region 220a.

It is to be noted that the deformation region 230a may also take up a much larger portion of the midsole 202a or 202b than shown in FIGS. 2a and 2b. In particular, a separate individual first midsole part 210a may be an optional feature.

For example, the first midsole part 210a may be completely or pre-dominantly comprised of the deformation region 230a, which may be made from EVA with a deformation stiffness of 45-50 shore C, with the midsole 202a or 202b further comprising a first sole region 220a, for example arranged in the heel region, with particle foam, for example eTPU with a deformation stiffness of approximately 40 shore C, and which may range from 40-80 shore C.

Figure 2C:
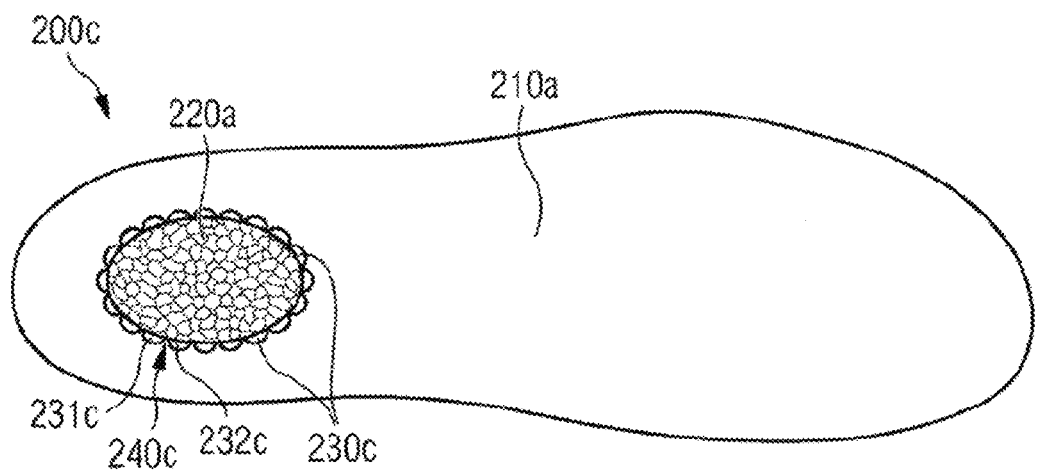

Additional embodiments of a sole 200c are illustrated in FIG. 2c. In contrast to the embodiments of sole 200a, the deformation region 230c may comprise multiple sub-regions 231c, 232c that are arranged in a "sunflower-like" manner around the first sole region 220a. Thus, even if the expansion sub-regions 231c, 232c are provided as an empty space, the first sole region 220a is secured in its place by the protrusions 240c formed between the "leaves" 231c, 232c. It is also possible, however, that the expansion sub-regions 231c, 232c are at least partially filled with a material that yields to the sideward deformation of the material of the first sole region 220a. This might be desirable, for example, to increase the overall stability of the sole 200c and/or to avoid empty spaces within the sole 200c, e.g. for comfort or aesthetic reasons or the like.

Figure 2D:
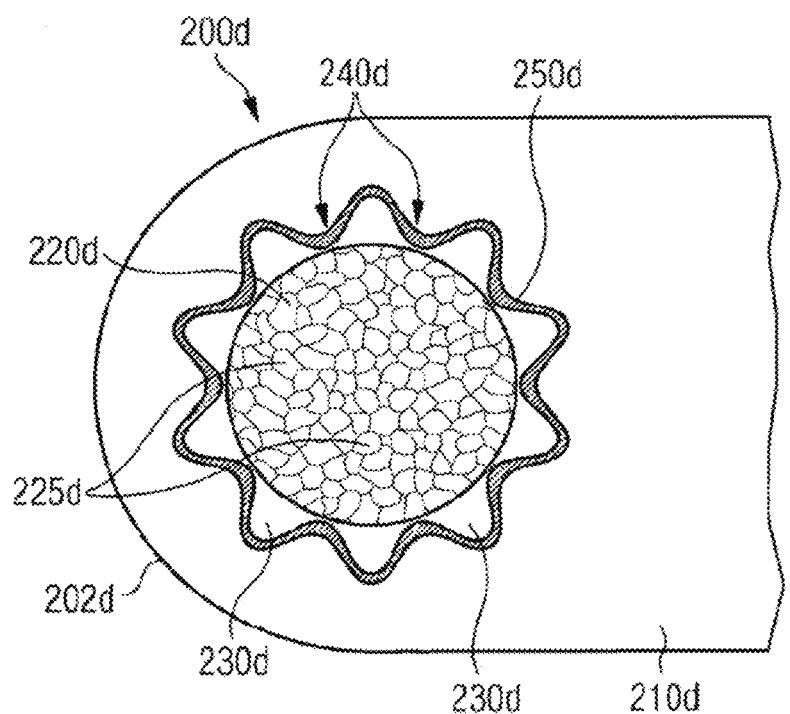

In certain embodiments, as illustrated in FIG. 2d, a sole 200d may comprise a midsole 202d with a first midsole part 210d and a first sole region 220d comprising particle foam 225d. The first midsole part 210d may, for example, be the first midsole part 210a already discussed and the first sole region 220d may be the first sole region 220a already discussed. The midsole 202d may comprise a deformation region 230d within the midsole 202d, wherein the deformation region 230d may comprise a volume greater than that of a single expanded particle of the particle foam 225d and is positioned so that it allows a sideward deformation of the material of the first sole region 220d under a pressure load on the sole 200d. Also in this case, the deformation region 230d may be arranged in a "sunflower-like" manner around the first sole region 220d and may be provided as an empty space or any other suitable configuration. Between the "leaves of the sunflower," protrusions 240d may serve to secure the first sole region 220d in its place.

In certain embodiments, as illustrated in FIG. 2d, the sole 200d may furthermore comprise an additional material layer 250d that is arranged between the first midsole part 210d and the deformation region 230d. This layer 250d may, for example, comprise an elastic material, like a soft EVA material. As a result, damage of the first sole region 220d that might otherwise occur when the first sole region 220d is compressed against the potentially sharp or pointed protrusions 240d due to its sideward deformation under a pressure load on the sole 200d may be avoided and/or minimized. Also, by providing a flexible and elastic material layer 250d as a link between the first sole region 220d and the protrusions 240d and the first midsole part 210d, the first sole region 220d may remain fixed in its place even when the sole 200d is bent or twisted, since the elastic material layer 250d may compensate for the resulting deformations to a certain degree. Thus, contact between the protrusions 240d and the first sole region 220d may be maintained, and the first sole region 220d remains secured in its place.

Figure 2E:
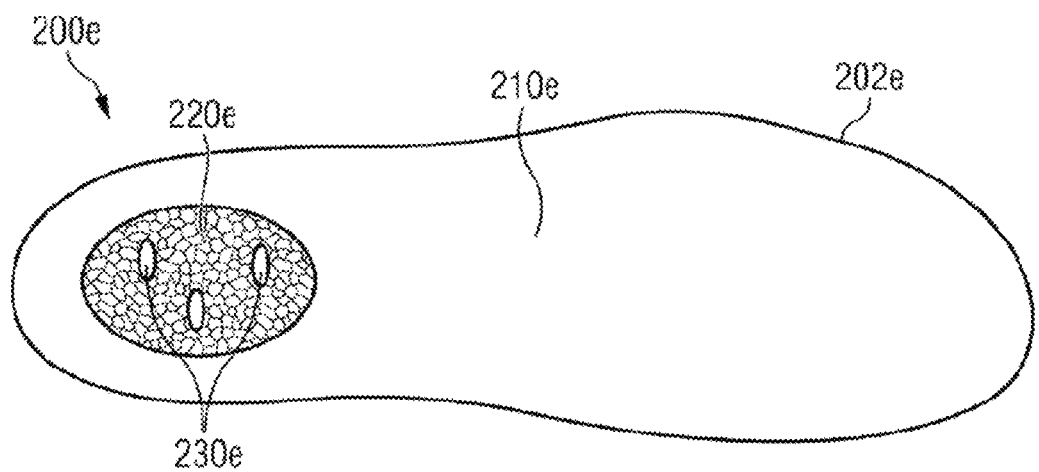

In additional embodiments, as illustrated in FIG. 2e, the deformation region 230e is provided as several sub-regions 230e within the first sole region 220e, e.g. empty spaces or filled with a yielding material, and not between the first sole region and the remaining part of the midsole 202e, e.g. the first midsole part 210e. Thus, in the present case, the first sole region 220e may expand "inwards" in response to a pressure load on the sole 200e.

Figure 2F:
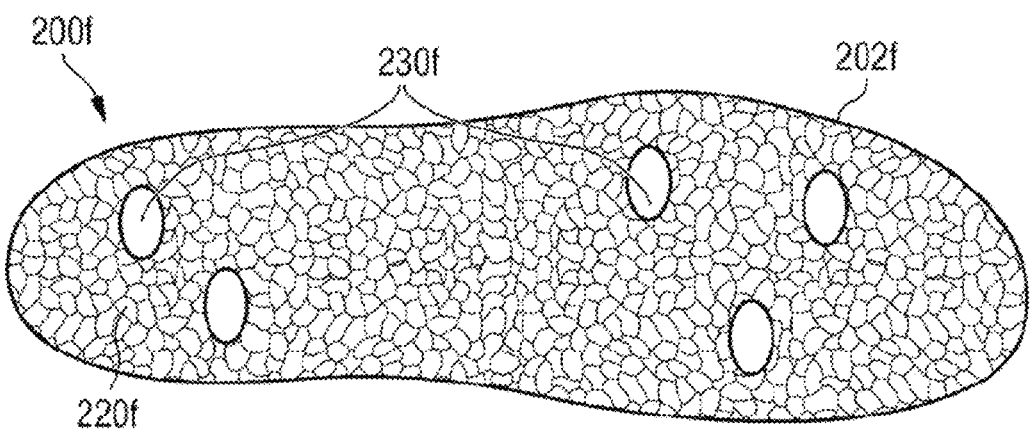

In certain embodiments, as illustrated in FIG. 2f, a midsole 202f may be entirely, or at least predominantly, comprised of a first sole region 220f, which may comprise particle foam, in contrast to the embodiments of soles 200a-200e discussed so far.

Again, it should be noted that a first midsole part, for example a first midsole part made from a harder material compared to the first sole region and/or deformation region, as described in relation with some of the embodiments above, may be an optional feature of the invention.

In certain embodiments, as illustrated in FIG. 2f, the deformation region 230f is provided as several disconnected sub-regions 230f within the first sole region 220f, similar to the embodiments of the sole 200e, as shown in FIG. 2e. Such embodiments of the sole 200*f* may be appropriate if a particularly soft sole is desirable and stability of the sole is less critical.

Figure 2G:
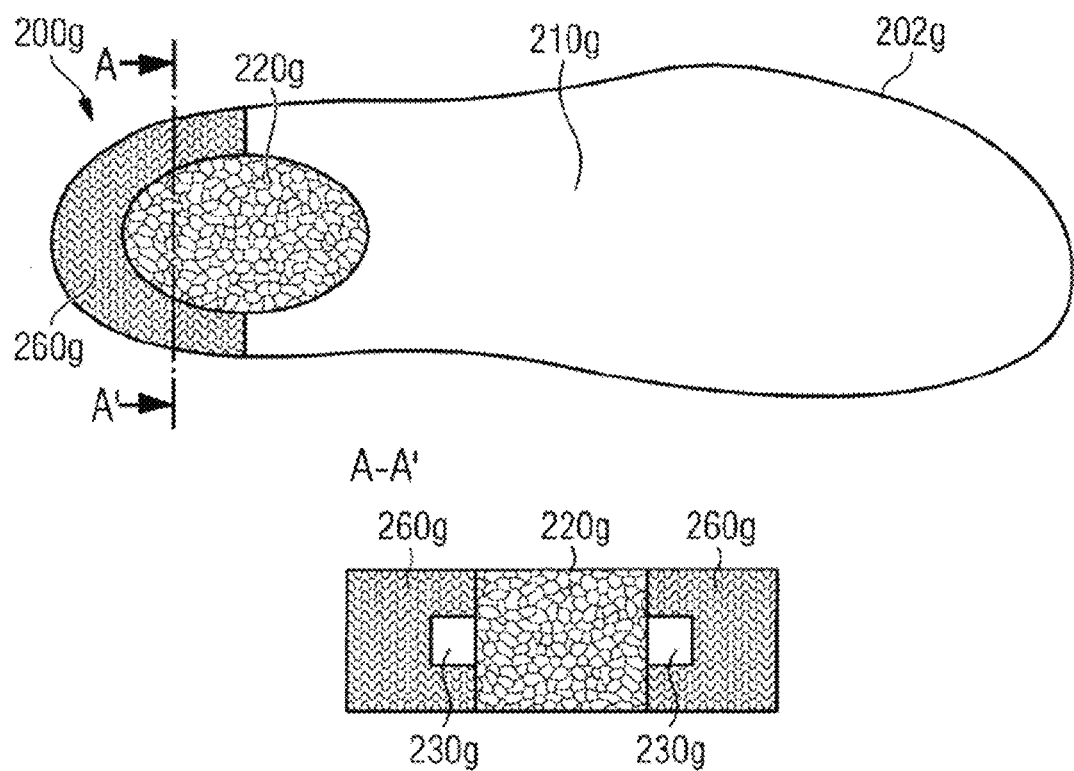

In certain embodiments, as illustrated in FIG. 2*g*, a sole 200*g* may comprise a midsole 202*g* with a first midsole part 210*g*. The midsole 202*g* may further comprise a first sole region 220*g*, which comprises particle foam. The midsole 202*g* may also comprise a deformation region 230*g* within the midsole 202*g*. The deformation region 230*g* may comprise a volume greater than that of a single expanded particle and is positioned so that it allows a sideward deformation of the material of the first sole region 220*g* under a pressure load on the sole 200*g*.

Here, however, the sole 200*g* may furthermore comprise a control element 260*g*, which limits the sideward deformation of the material of the first sole region 220*g*. To this end, the material of the control element 260*g* may comprise a greater deformation stiffness than the material of the first sole region 220*g*. In some embodiments, the material of the control element 260*g* is free from particles of the particle foam. For example, the control element 260*g* may comprise at least one material including but not limited to EVA, PP, PA, PS, TPU, PEBA, and/or the similar materials.

The control element 260*g* may comprise the deformation region 230*g*, or at least part thereof. In certain examples, as shown in FIG. 2*g*, the deformation region 230*g* may be provided as a rectangular groove 230*g* within the control element. The groove 230*g* may be left as an empty space or it may be at least partially filled with a material that yields to the sideward deformation of the material of the first sole region 220*g*. The material of the control element 260*g* itself may not yield to a sideward deformation of the material of the first sole region 220*g* to a substantial degree.

The control element 260*g* may therefore at the same time serve to improve the overall stability of the sole 200*g*, such as in the embodiments where the control element 260*g* is positioned in the heel region, and at the same time serve to "free up" the first sole region 220*g* by providing a deformation region 230*g* into which the material of the first sole region 220*g* may expand sideways.

In embodiments of the sole 200*g*, as shown in FIG. 2*g*, the control element 260*g* may at least partially bounds the first sole region 220*g* on its sides. In additional embodiments, the control element completely bounds the first sole region such that the sideward deformation of the first sole region may be controlled and adjusted in all (horizontal) directions. In some embodiments, the deformation region 230*a* of the sole 200*a*, as shown in FIG. 2*a*, may be replaced by a control element in the manner described above, that may completely encircle the first sole region 220*a* on its sides. For example, the deformation region 230*a* may be replaced by an oval plastic ring, e.g. a ring made from EVA, with a horizontal groove on its inner side into which the particle foam of the first sole region 220*a* may expand sideways under a pressure load on the sole. Such a combination of a control element and a first sole region with particle foam may provide a sole with very good stability in the heel region as well as a high degree of cushioning and energy return to the wearer.

In certain embodiments, as illustrated in FIG. 2*h*, a sole 200*h* may comprise a midsole 202*h* with a first midsole part 210*h*. The midsole 202*h* may further comprise a first sole region 220*h* provided as two disconnected components 222*h* and 225*h*. The two components 222*h* and 225*h* of the first sole region 220*h* may comprise particle foam. The material may be the same in both components 222*h* and 225*h*, or the material may differ from one component to the other (more than two components are also possible).

In some embodiments, the midsole 202*h* may further comprise deformation regions 230*h*, 231*h*, 250*h*, 251*h* within the midsole 202*h*, wherein the deformation region s 230*h*, 231*h*, 250*h*, 251*h* may comprise a volume greater than that of a single particle of the particle foam and may be positioned so that they allow a sideward deformation of the material of the first sole region 220*h* under a pressure load on the sole 200*h*. As may be seen from the cross-sectional view along the line B-B' shown in the lower half of FIG. 2*h*, the deformation regions 230*h* and 231*h* may extend throughout the entire thickness of the midsole 202*h*. The deformation regions 250*h* and 251*h*, on the other hand, may only extend halfway throughout the thickness of the midsole 202*h*. That means that the component 225*h* of the first sole region 220*h* is in direct contact with the midsole 202*h*, in the case shown here with the first midsole part 210*h*, in the bottom half of the midsole 202*h* on the entire circumference of the component 225*h*. Thus, e.g. instead of providing several expansion sub-regions 250*h*, 251*h* arranged in a "sunflower-like" manner with protrusions formed therebetween to secure the component 225*h* in its place, a simple empty space encircling the component 225*h* in its upper half may be used and still result in a very stable midsole 202*h*, since the component 225*h* is secured in its lower half within the midsole 220*h*.

It is to be appreciated that the arrangement shown in FIG. 2*h* is only exemplary and multiple modifications and rearrangements of the embodiments discussed above are possible within the scope of the invention.

FIG. 3 shows an illustration of the concept of a "banking sole" 300, as compared to a regular midsole 350. Upon impact during a lateral movement, e.g. a medial cut during tennis or the like, with a regular midsole, the midsole will essentially retain its profile, cf. the sole region 370 in FIG. 3. This results in a relatively large angle b between the heel and the lower leg of the wearer, which may lead to an overstraining of the ankle and metatarsal phalangeal joints of the wearer and thus cause fatigue or even injuries. The sole 300, which incorporates the "banking" concept, on the other side, may comprise a sole region 320 with an increasing deformation stiffness in at least one predetermined direction, which in the case shown here is from the medial side of the foot towards the lateral side of the foot. Upon impact during a lateral movement, the medial side of the sole region 320, which is softer than the lateral side, will be compressed more strongly, such that the sole region 320 tilts inwards towards the medial side of the foot. This leads to a smaller angle a between the wearer's heel and his lower leg, thus decreasing the strain on the ankle and the metatarsal phalangeal joint of the wearer. This design may lead to improved endurance of the wearer and help preventing injuries.

Figure 4:
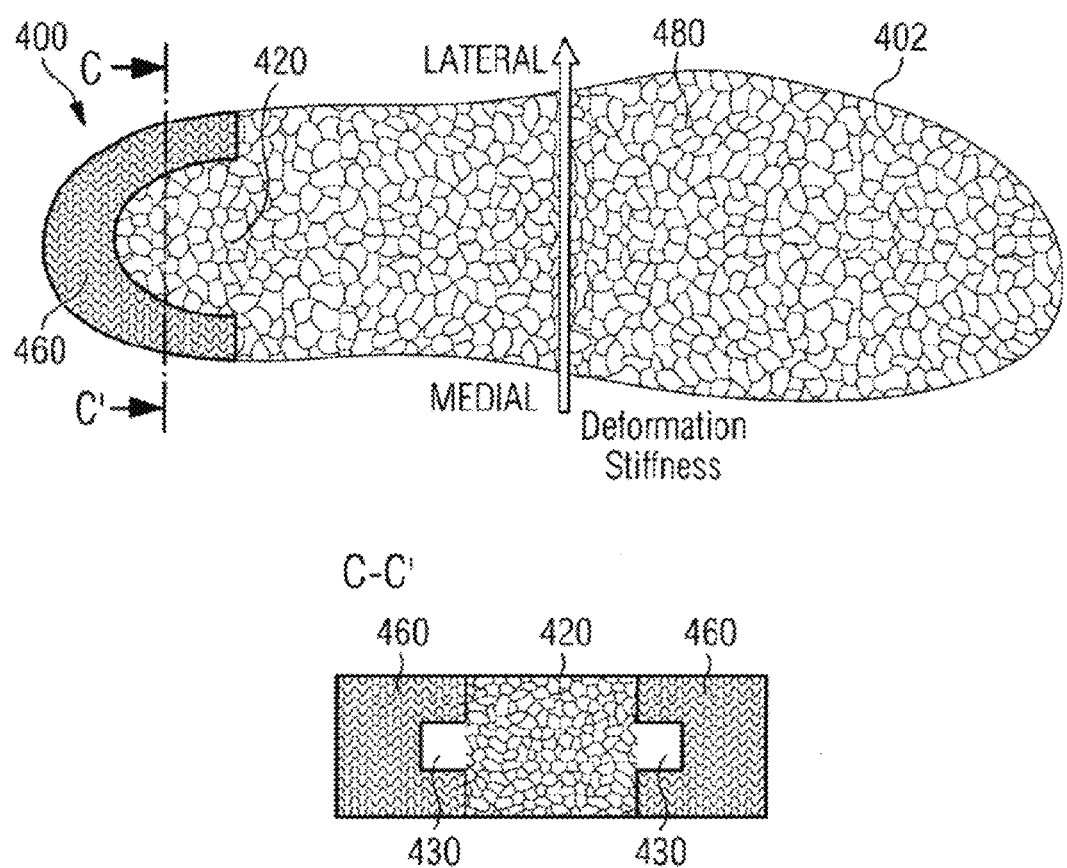
FIG. 4 are views of a sole for a shoe employing the banking principle of FIG. 3, according to certain embodiments of the present invention.

According to certain embodiments of the invention, as illustrated in FIG. 4, the sole 400 may comprise a midsole 402, wherein the midsole 402 may further comprise a first sole region 420, which may comprise particle foam. The midsole 402 may further comprise a deformation region 430 within the midsole 402, wherein the deformation region 430 may comprise a volume greater than that of a single expanded particle and may be positioned so that it allows a sideward deformation of the material of the first sole region 420 under a pressure load on the sole 400. The sole 400 may further comprise a control element 460, which limits the sideward deformation of the material of the first sole region 420. In some embodiments, the deformation region 430 is provided as a rectangular groove 430 within the control element 460. For the first sole region 420, the control element 460, and the deformation region 430, the considerations put forth above in relation with the embodiments of soles 200a-200h, in particular the embodiments of the sole 200g, also apply to the embodiments discussed here.

Moreover, the sole 400 may comprise a second sole region 480, which may comprise particle foam and may provide an increasing deformation stiffness along at least one predetermined direction. In certain embodiments, this predetermined direction extends from the medial side of the sole 400 towards the lateral side of the sole 400. The predetermined direction may be chosen, for example, for lateral sports like tennis, to take some of the strain of the ankle and metatarsal phalangeal joints of a wearer during lateral movements, in the way described above in relation to FIG. 3. For other sports with other typical movement patterns, a different predetermined direction may be chosen to adjust the sole to the specific needs for that particular sport.

It is explicitly mentioned here that the concept of a second sole region with increasing deformation stiffness may be combined with any of the above described or otherwise conceivable embodiments of a sole according to the invention and is not restricted to the specific embodiments with a control element 460 in the heel region shown here.

Moreover, the first sole region 420 may also extend into the forefoot region and the second sole region 480 may extend into the heel region, opposite to the example shown here. This inverted arrangement has the beneficial effect of providing the "banking effect" primarily in the heel region, where impact with the ground predominantly occurs, while "freeing up" the first sole region in the forefoot/toe region, where push-off from the ground often occurs and therefore a good energy return is desirable.

In exemplary embodiments of the sole 400, as shown in FIG. 4, the first sole region 420 and the second sole region 480 are provided as one integral piece. In general, the first sole region 420 and the second sole region 480 may at least partially coincide. It is, however also possible, that the first sole region 420 and the second sole region 480 may be provided as separate regions of the sole 400. For example, the component 225h of the sole 200h may be a first sole region, and the component 222h may be a second sole region with an increasing deformation stiffness in at least one predetermined direction, e.g. from the medial to the lateral side of the foot. Once again, it is clear to the skilled person that various modifications and rearrangements of the embodiments described herein are possible without departing from the scope of the invention.

The increase in deformation stiffness may be at least partially achieved by an increasing density of the material of the second sole region 480. For example, a mold may be filled with particles of a particle foam to an increasing filling height, and the mold may then be closed to achieve a uniform thickness of the compressed particles within the mold, thereby effecting an increasing density in the direction of increasing filling height. However, it is also possible to achieve the increase in density through a variation of the base material and so on.

Figure 5:
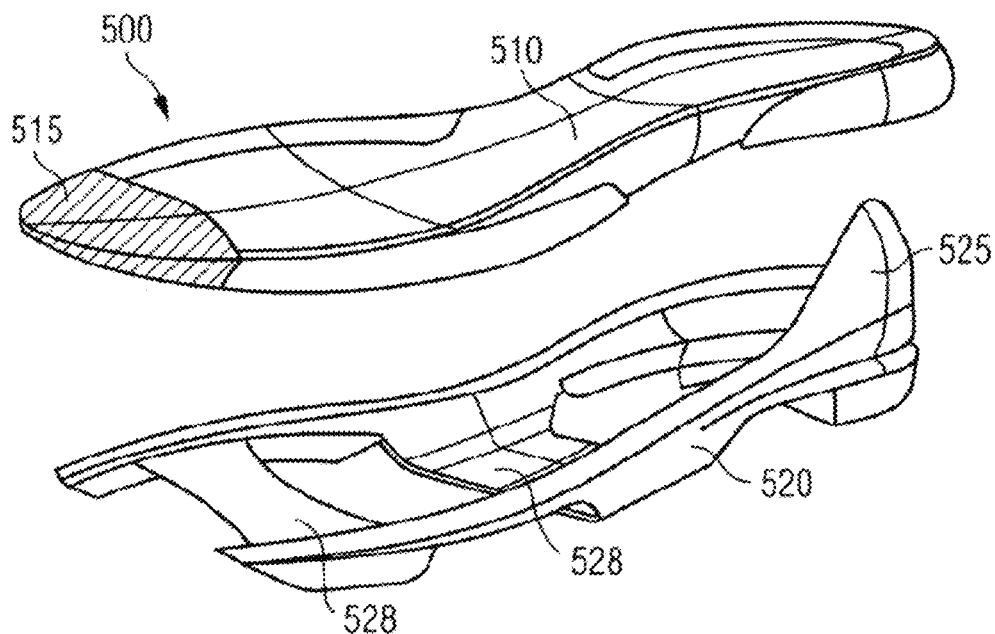
FIG. 5 is an exploded view of a sole comprising a frame element, according to certain embodiments of the present invention.

Additional embodiments of a sole 500 according to the invention, as illustrated in FIG. 5, may comprise a midsole 510. The midsole 510 may be the midsole of one of the embodiments discussed so far herein. The sole 500 may further comprise a frame element 520 that at least partially surrounds the midsole 510 and may limit a sideward deformation of the midsole 510 under a pressure load. Thus, the frame element 520 may serve, among other things, to increase the overall stability of the sole 500 in a manner independent of the other possibilities to fine-tune individual cushioning, energy return, and stability characteristics of the midsole discussed so far.

In certain embodiments of the sole 500, as shown in FIG. 5, the frame element 520 may completely encircle the midsole 510 everywhere except the toe region 515 of the midsole 510. As already mentioned above, push-off of the foot often occurs over the toes and therefore good energy return properties may be particularly important in the toe region 515. By excluding the toe region from the frame element 520, the midsole material is "freed up" in the toe region 515 as described above, increasing its potential to return energy, expended for deformation of the sole 500 during the process of a step, back to the wearer.

In additional embodiments of the sole 500, the toe region 515 may comprise a thin area of EVA which is, among other things, easy to produce and provides stability to the toe region. In yet other embodiments, the toe region 515 may comprise eTPU, which is more completely melted than, for example, the particle foam within a first sole region as discussed herein, such that the eTPU in the toe region 515 has a greater deformation stiffness and may also provide stability.

The frame element 520 may further comprise a supporting element 525. For the present sole 500, which is intended primarily for use in lateral sports like tennis, this supporting element 525 may be arranged on the lateral side of the heel region. Thus, the supporting element 525 may support the heel during lateral movements like a medial cut, and prevent a "breaking out" of the foot and the athlete from twisting his ankle. To avoid a chaffing on the foot of a wearer, the frame element 520 and, in particular, the supporting element 525, may further comprise a soft overcoat on the inside.

It is furthermore to be noted that a frame element like the frame element 520 may at least partially coincide with a control element as described above. That is, the frame element may also serve the function to limit the sideward deformation of the material of a first sole region, e.g. by comprising an expansion zone like a groove or the like. The frame element may, for example, be integrally formed with a control element within the midsole.

The frame element 520 may further comprise at least one bar 528. The bar 528 may serve to secure the frame element 520 on the midsole 510. In the example shown here, the two bars 528 form a kind of clamp or cavity with the peripheral rim of the frame element 520, into which the midsole 510 may be press-fit. Alternatively, the at least one bar 528 may also be at least partially surrounded by the material of the midsole 510 to secure the frame element 520 on the midsole 510. For example, the frame element 520 may initially be inserted into a mold into which the material of the midsole, e.g. the particles of a particle foam for the midsole, are subsequently loaded and then processed. In this manner, the bar of the frame element 520 may, for example, extend throughout the interior of the midsole, thus securing the frame element 520 on the midsole without need for adhesives like glue (which could, however, still be added if desired).

In addition to helping to secure the frame element 520 on the midsole 510, the at least one bar 528 may also assume further functionality. It may, for example, also act as a torsion bar to increase the torsional stiffness of the sole 500.

Figure 6:
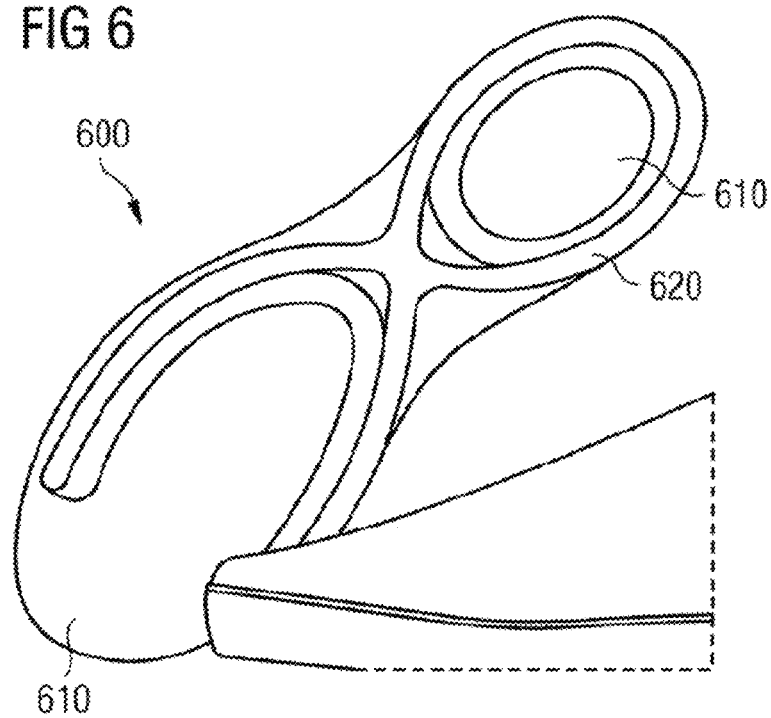
FIG. 6 is a view of a sole comprising a frame element, according to certain embodiments of the present invention.

In certain embodiments, as illustrated in FIG. 6, a sole 600 may comprise a midsole 610 and a frame element 620. The considerations put forth above with regard to the sole 500 with midsole 510 and frame element 520 may also apply here. In particular, the midsole 610 may be any embodiment of a midsole according to the invention discussed herein or otherwise conceivable. A particular feature of the frame element 620 is, however, that it may completely encompass the heel region of the midsole on its sides but only partly encompass the forefoot region on its sides. As discussed before, this design has the beneficial effect of providing good stability to the heel region, potentially in combination with a second sole region within the encompassed heel region to provide the above explained "banking effect," while also "freeing up" the toe region to promote maximal energy return to the foot during push-off.

Figure 7:
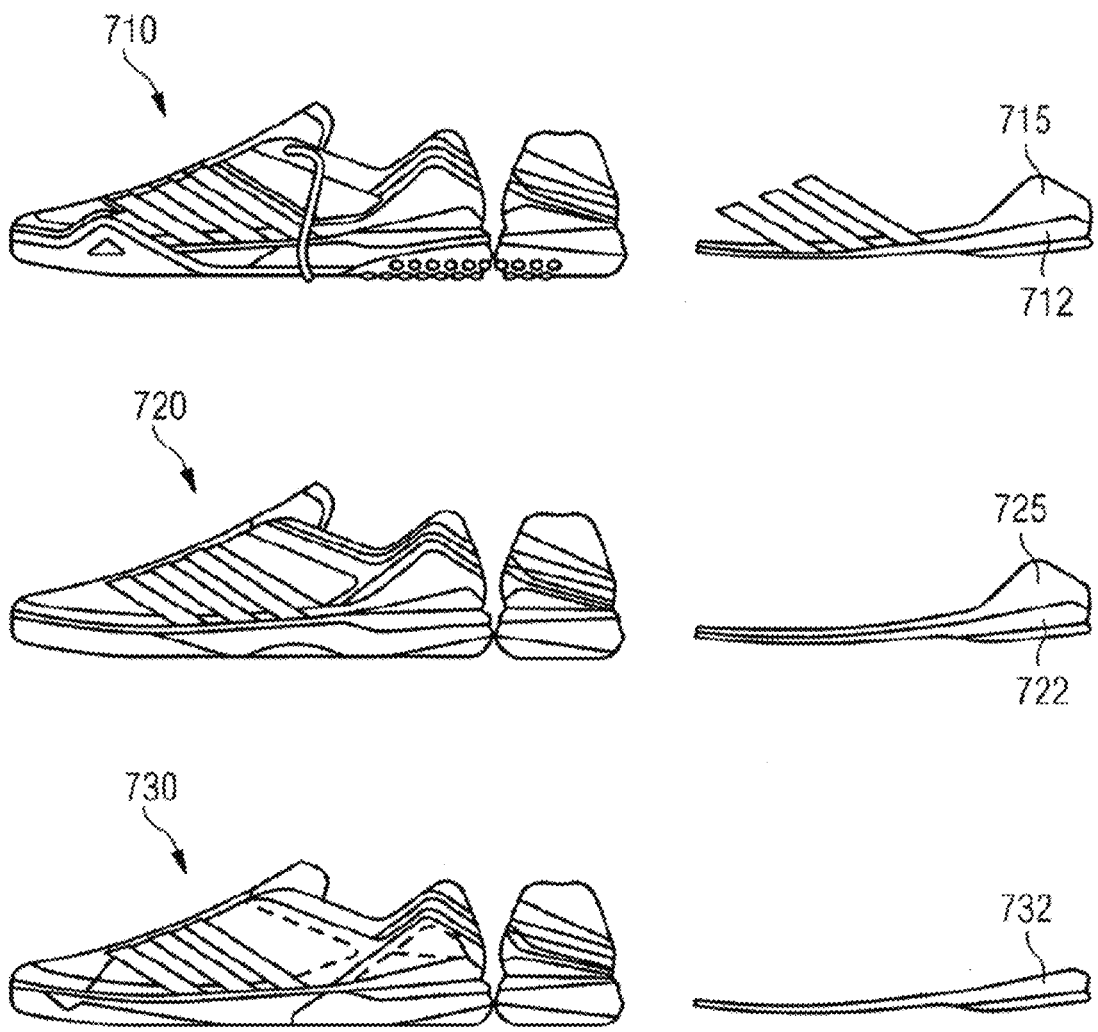
FIG. 7 are exploded views of shoes comprising soles, according to certain embodiments of the present invention.

Finally, additional embodiments of shoes 710, 720, 730 according to the invention, as illustrated in FIG. 7, comprise different frame elements 712, 722, 732, which provide different degrees of stabilization. For example, frame elements 712, 722 provide increased stabilization when compared with frame element 732 by including supporting elements 715, 725 in the lateral heel region. In addition, using different materials and material thicknesses may increase the stabilization provided by the frame elements.

FIGS. 8-15I show further embodiments of soles and shoes according to the invention. As will become apparent to a skilled artisan, some of these embodiments are merely sketches of possible design options and arrangements and the proportions shown in these sketches need not necessarily correspond to the proportions found in an actual sole or shoe. Rather, the main purpose of the following embodiments is to give the skilled artisan a better understanding of the design options and combinations of the above-discussed features that are possible within the scope of the invention.

Figure 8:
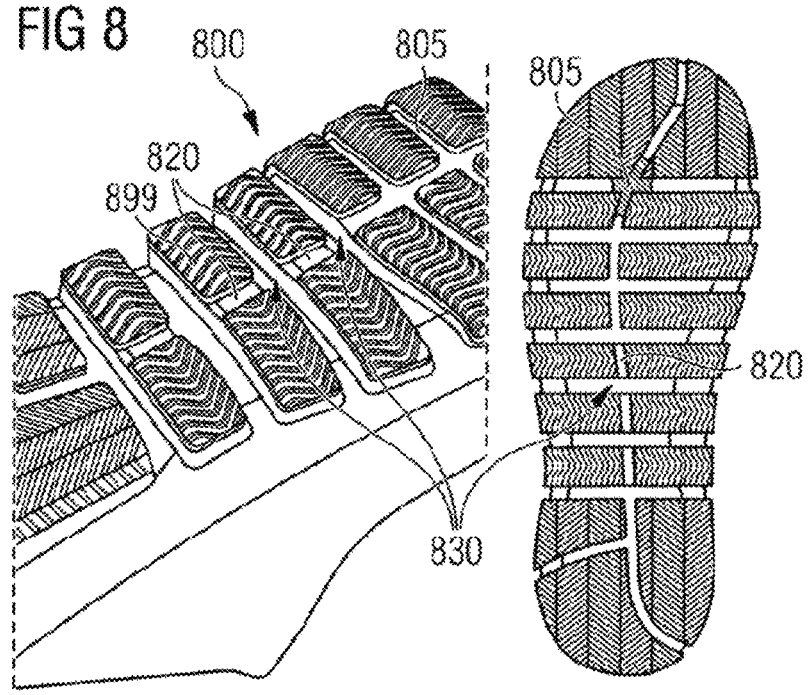
FIGS. 8-14 are views of shoes comprising soles, according to certain embodiments of the present invention.
Figure 9:
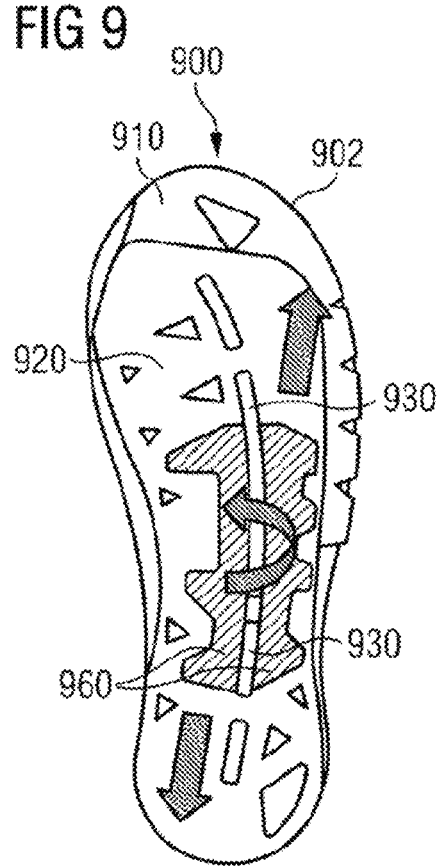

In certain embodiments, as shown in FIG. 8, a shoe 800 with a sole 805 may comprise a midsole and several outsole elements 899. The midsole may comprise a first sole region 820 comprising particles of a particle foam. The first sole region 820 may be provided as a number of separate bars 820. Between these bars 820, there may be empty spaces 830. These empty spaces 830 may comprise a volume greater than that of a single expanded particle and may act as deformation regions 830 into which the material of the first sole region 820 may expand sideways under a pressure load on the sole 805 of the shoe 800. In certain embodiments, as shown in FIG. 9, a midsole 902 may comprise a first sole part 910, e.g. comprising EVA or the like. The midsole 902 may further comprise a first sole region 920 comprising particle foam, e.g. eTPU. The first sole region 920 may further comprise a number of grooves or notches 930 acting as deformation regions within the first sole region 920 with a volume larger than that of a single expanded particle. The material of the first sole region 920 may expand sideways into these deformation regions 930 under a pressure load on the midsole 902. The deformation regions 930 may either extend throughout the whole thickness of the midsole 902, or they may be confined to one side of the midsole 902 and penetrate into the material of the first sole region 920 to a certain depth, e.g. half the thickness of the first sole region 920 or the midsole 902 or the like. A control element 960 may be embedded into the material of the first sole region 920, which may limit the sideward deformation of the material of the first sole region 920. The control element 960 may be provided as two separate pieces that are embedded in the material of the first sole region 920 parallel to each other and may be spaced apart from each other by some small distance, e.g. 2 mm or 5 mm or 1 cm or the like. In certain embodiments, the control element 960 may comprise a higher deformation stiffness than the material of the first sole region 920. In this way, the control element 960 may, in addition to limiting the sideward deformation of the first sole region 920, also act as a stabilizing element in the present case. During motion of the wearer, the two parts of the control element 960 may slide in opposite directions, as indicated by the two big arrows in FIG. 9, hence supporting the foot of the wearer and promoting a natural roll-off of the foot. At the same time, the parts of the control element 960 may serve as a torsion bar to increase torsional stiffness of the midsole 902, as indicated by the curved arrow in FIG. 9. It is noteworthy that some of the groves or notches 930 may be arranged between the two parts of the control element 960 to promote the above discussed movement of the two parts during motion of the wearer and promotion of a natural roll-off of the foot.

Figure 10:
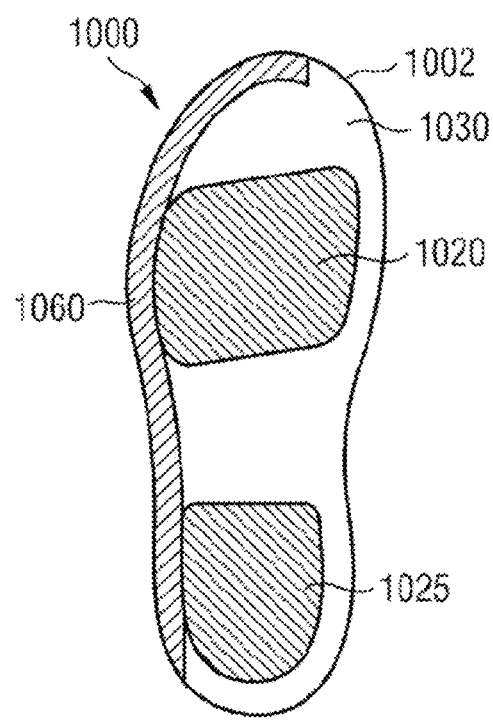

In some embodiments, as shown in FIG. 10, a midsole 1002 may comprise a first sole region comprising particle foam. In the present case, the first sole region has sub-regions 1020, 1025. The first sole sub-regions 1020, 1025 may be substantially similar in composition. However, it is also possible that first sole sub-regions 1020, 1025 differ in composition.

In general, multiple permutations, modifications and rearrangements of the different parts, in particular the first and second sole regions and control elements, of the embodiments described herein are conceivable within the scope of the invention.

In some embodiments, as illustrated in FIG. 10, the midsole 1002 may further comprise a deformation region 1030 within the midsole 1002, which may comprise a material that yields to the sideward deformation of the material of the first sole region 1020, 1025 under a pressure load on the sole 1000. For example, the first sole region 1020, 1025 may comprise eTPU, e.g. with a stiffness of approximately 40 shore C, and the deformation region 1030 may comprise a rather soft EVA, such as an EVA with a stiffness of 45-50 shore C.

Additionally, the midsole 1002 may comprise a control element 1060 that limits the sideward deformation of the material of the first sole region 1020, 1025. In some embodiments, the control element 1060 may comprise a harder EVA material and may be arranged on the lateral side of the midsole 1002.

Figure 11:
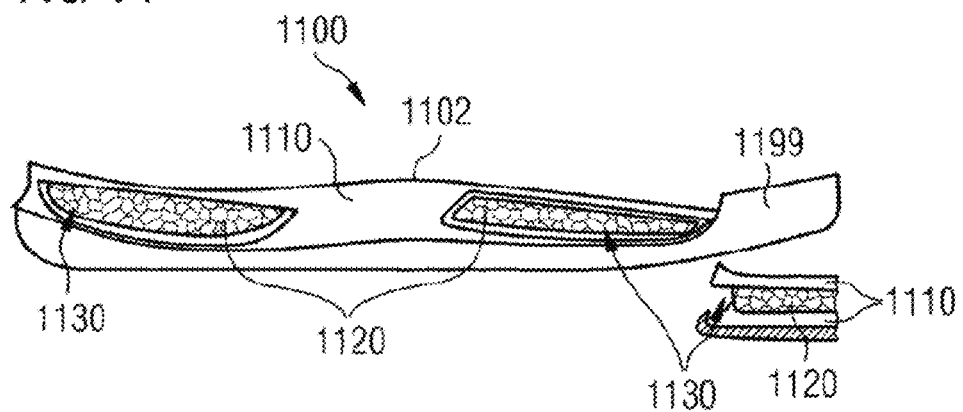

In some embodiments, as shown in FIG. 11, a sole 1100 may comprise a midsole 1102 with a first midsole part 1110. The midsole may further comprise a first sole region 1120 comprising particle foam. The first sole region 1120 may comprise two drop-ins partially embedded in the material of the first midsole part 1110. However, the first midsole part 1110 may also comprise windows within the midsole. These windows provide a deformation region 1130 with a volume larger than that of an expanded particle of the first sole region 1120, into which the material of the first sole region 1120 may expand sideways under a pressure load on the sole 1100. The sole may further comprise additional sole parts 1199, like an outsole or a frame element as discussed before.

Figure 12:
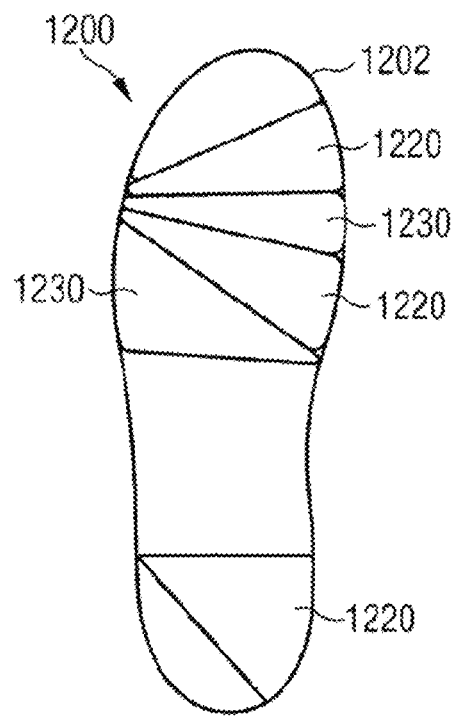

In certain embodiments, as shown in FIG. 12, a midsole 1202 may comprise a first sole region 1220 comprising particle foam. In these embodiments, the first sole region 1220 may comprise several wedge-shaped sub-regions. Adjacent or between some or all of these sub-regions 1220, the midsole 1202 may further comprise a deformation region, possibly comprising several sub-regions as shown here. The deformation region, or the several sub-regions, may comprise a material that yields to the sideward deformation of the material of the first sole (sub)-region(s) 1220 under a pressure load on the midsole 1202. It is to be understood that possibly only some of the midsole parts adjacent/between the first sole sub-regions 1220 may comprise such a yielding material while others do not.

In certain embodiments, as shown in FIG. 12, the arrangement may provide that the first sole (sub)region(s) 1220 and/or the deformation region 1230 may also promote a high flexibility of the midsole 1202, in addition to the additional features of inventive soles already discussed herein numerous times.

Figure 13:
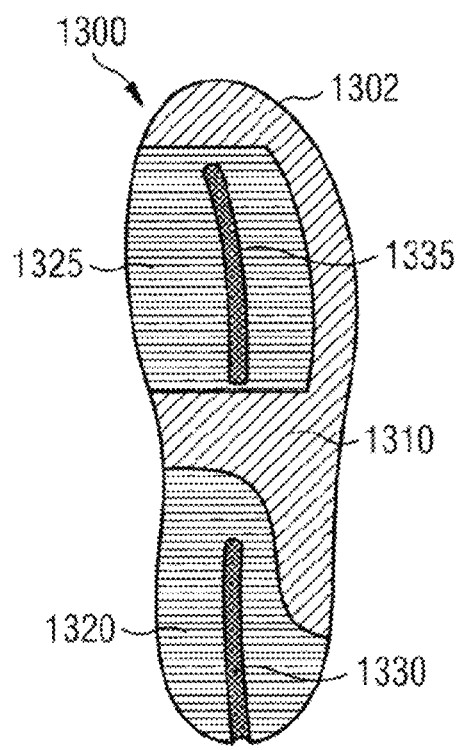

Additional embodiments of an inventive midsole 1302, as illustrated in FIG. 13, may comprise a first sole region comprising particle foam, such as eTPU. In these embodiments, the first sole region may comprise two sub-regions 1320 and 1325, one 1320 arranged predominantly in the medial half of the heel region and the other one 1325 arranged in the forefoot region, which is also predominantly in the medial half of the midsole 1302.

Alternatively or in addition, one of the sub-regions 1320 and 1325 may comprise a second sole region, which in the latter case may coincide with the respective first sole region, with variable stiffness as discussed before to provide the banking effect. For example, the sub-region 1320 in the heel area of the midsole 1302 may have an increasing stiffness in the direction from the medial to the lateral side of the midsole 1302 to provide a banking during a lateral side-cut.

As already mentioned numerous times, and as also apparent when considered in comparison to the other embodiments discussed herein, the arrangement of the first sole region, or its multiple sub-regions 1320 and 1325, throughout the midsole may be chosen and modified in a large number of different ways. The first sole region or sub-regions 1320, 1325 may be arranged in the heel region, the midfoot region, the forefoot region and predominantly on one side of the sole, as shown here, in the middle of the sole, throughout the entire width, length, thickness of the midsole and so on. The same is true for potentially present second sole regions. With regard to the just mentioned second sole regions, it is further remarked that their density may also be adjusted and influenced in a large variety of arrangements and modifications, and also locally, to fine-tune the sole to the respective demands for a certain field of application.

The midsole 1302 may further comprise a first midsole part 1310. This first midsole part 1310 may, for example, comprise EVA or other suitable materials. In this way, the first midsole part 1310 may also act as a control element 1310 that limits a sideward deformation of the material of the first sole region 1320 and/or 1325 under a pressure load on the midsole 1302. The first midsole part 1310 may further comprise a deformation region (not shown) in form of at least one horizontal grove or the like, cf. for example FIG. 2g or 4.

In additional embodiments, the first midsole part 1310 may also comprise a material that yields to a sideward deformation of the first sole region 1320, 1325 and thus may act as a deformation region.

The first sole sub-regions 1320 and 1325 may each comprise one (or possibly more) grooves 1330, 1335, respectively, into which the material of the first sole sub-regions 1320, 1325 may expand sideways under a pressure load. These grooves 1330, 1335 may, as already mentioned, extend throughout the entire thickness of the first sole sub-regions 1320, 1325, or even the entire thickness of the midsole 1302, or they may penetrate into the material only to a certain depth, e.g. a third or half of the depth of the first sole sub-regions 1320, 1325. Numerous further arrangements are also conceivable. Furthermore, the grooves 1330, 1335 may correspond to openings in an outsole to be attached to the midsole 1302 to further improve the features of the complete sole. In general, such openings in a potential outsole may be used with other embodiments of inventive soles described herein.

Figure 14:
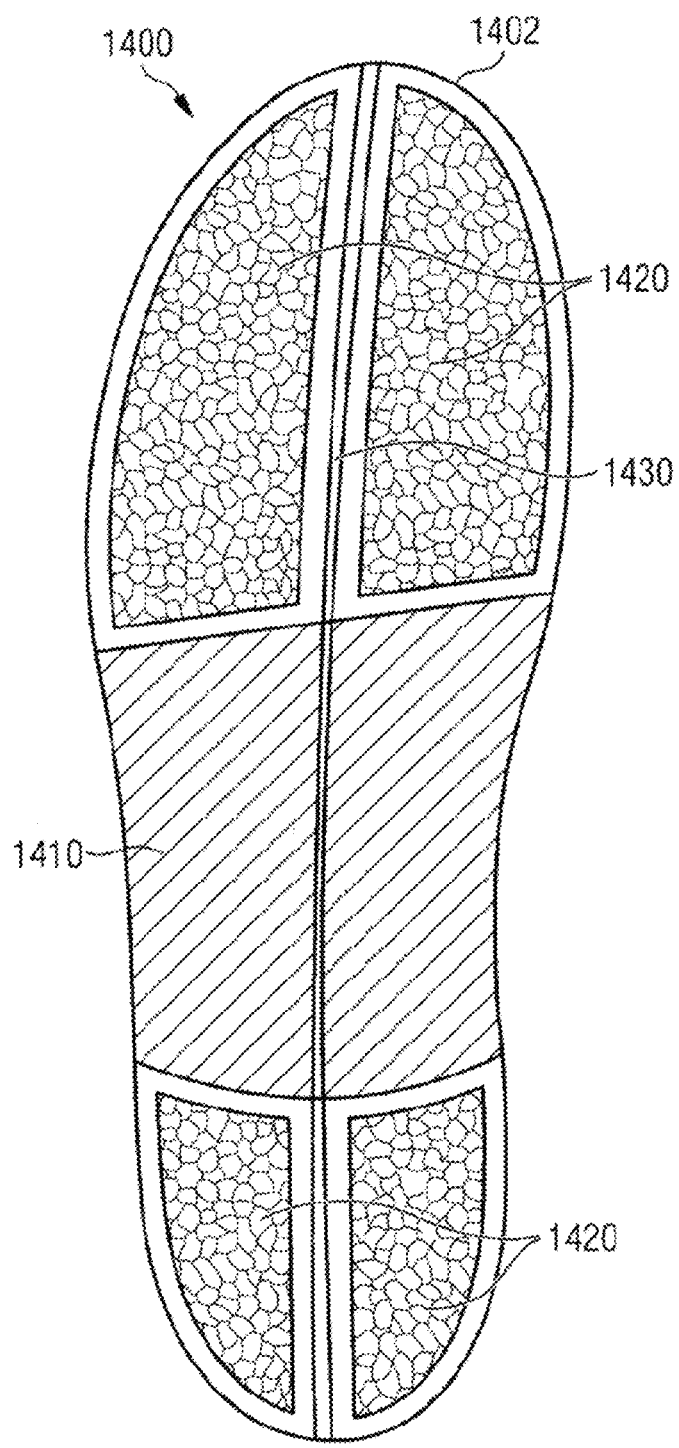

In certain embodiments, as shown in FIG. 14, a midsole 1402 may comprise a first midsole part 1410 and a first sole region 1420 comprising particle foam. The midsole 1402 may comprise a grove 1430 that acts as a deformation region 1430 and may correspond to a flexible area along the middle of an outsole to be attached to this midsole 1402. Other explanations and considerations given so far in relation to other embodiments of the invention are also true for these embodiments, if applicable.

In certain embodiments, as shown in FIGS. 15-26, a midsole 1502 may include multiple parts. For example, as shown in FIG. 15, the midsole 1502 includes a first sole part 1510 and a first sole region 1520.

The first sole part 1510 may be formed of various materials, including but not limited to EVA, rubber (e.g., blown rubber), polyurethane, or the like and/or combinations thereof. The first sole part 1510 may have a ground contacting surface having a variable profile as shown in FIG. 15. In some alternate examples, shown in FIGS. 15H-I and 19, the ground contacting surface appears to be substantially flat.

The first sole region 1520 may include particle foam. The first sole region may include particle foam such as eTPU, ePP, ePA, ePEBA, or eTPU. In some embodiments, particle foams may be arranged and/or randomly arranged. For example, as depicted in FIG. 15J, eTPU foam particles are substantially randomly arranged to form the first sole region 1520.

Figure 15D:
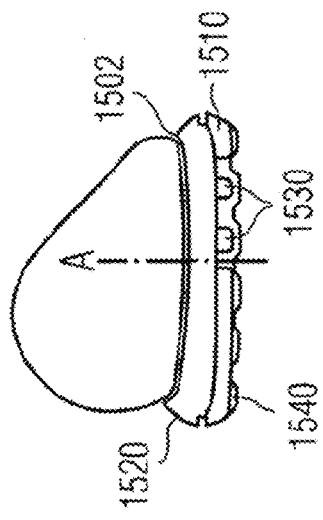
FIG. 15D is a cross-sectional view of the midsole of FIG. 15A taken along line B-B.
Figure 15E:
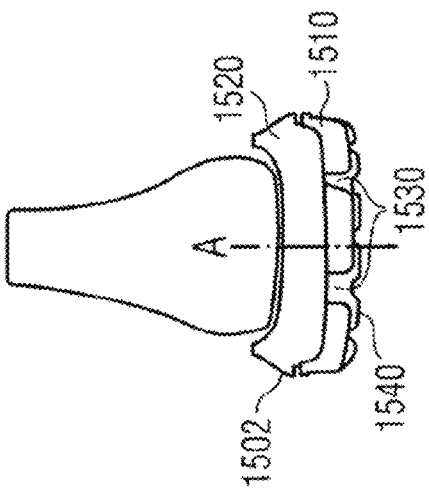
FIG. 15E is a cross-sectional view of the midsole of FIG. 15A taken along line C-C.
Figure 15F:
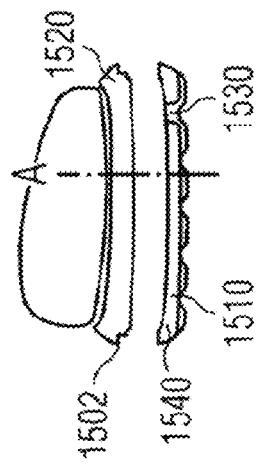
FIG. 15F is a cross-sectional view of the midsole of FIG. 15A taken along line D-D.
Figure 15G:
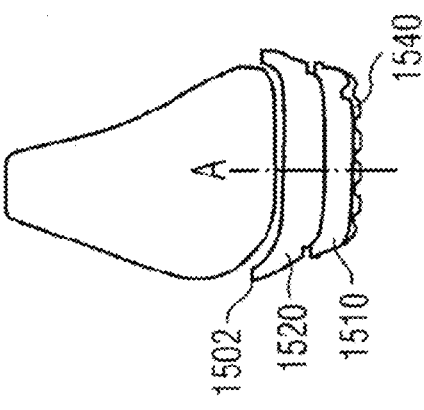
FIG. 15G is a cross-sectional view of the midsole of FIG. 15A taken along line E-E.
Figure 15C:
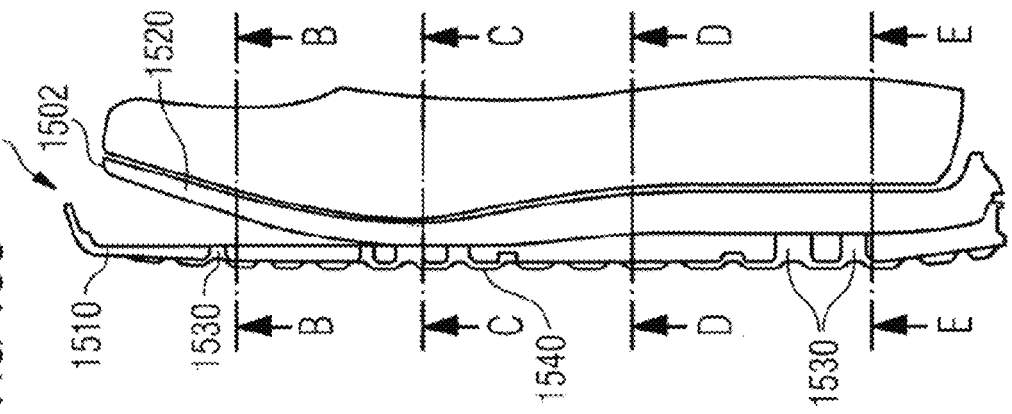
FIG. 15C is a cross-sectional view of the midsole of FIG. 15A taken along line A-A.
Figure 15J:
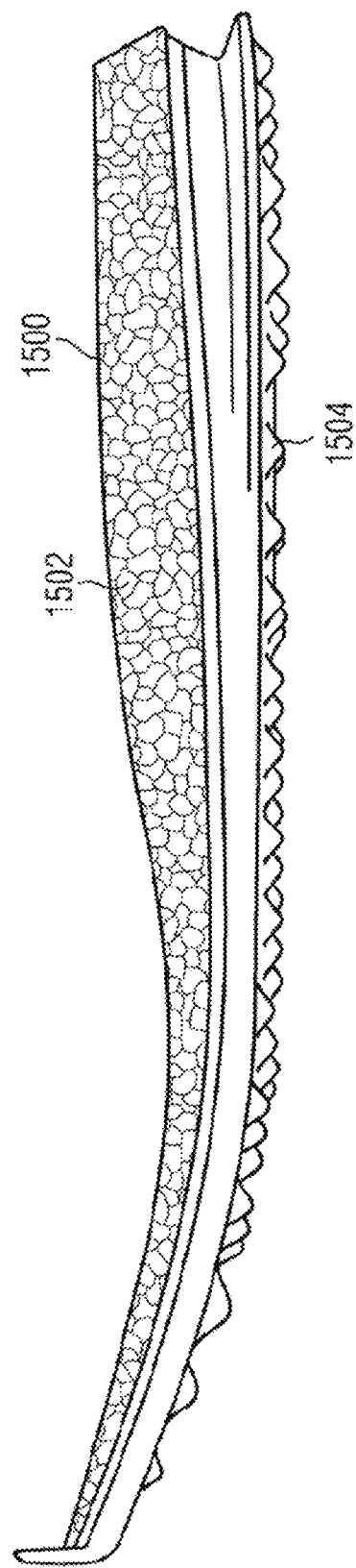
FIG. 15J is a medial view of an example of a midsole similar to that depicted in FIG. 15A.

As depicted in FIG. 15K, the first sole part 1510 may include a grid structure 1540 to be coupled to the first sole region 1520. The grid structure 1540 may include one or more open areas or deformation regions 1530. The grid structure 1540 may provide abrasion resistance. In some instances, the grid structure 1540 may be constructed in a manner (e.g., materials, thicknesses) that allows it to act as an outsole. In these instances, no additional outsole is needed. In other embodiments, an outsole made of rubber, TPU, other materials known in art and combinations thereof may be additionally added. For example, a sole may include grid structure such that no additional outsole is needed.

As depicted in FIGS. 15A and 15B, the first sole part 1510 may be coupled to first sole region 1520. The first sole part 1510 may extend beyond an edge of first sole region 1520 when the parts are coupled, as illustrated in FIG. 15A.

Figure 17:
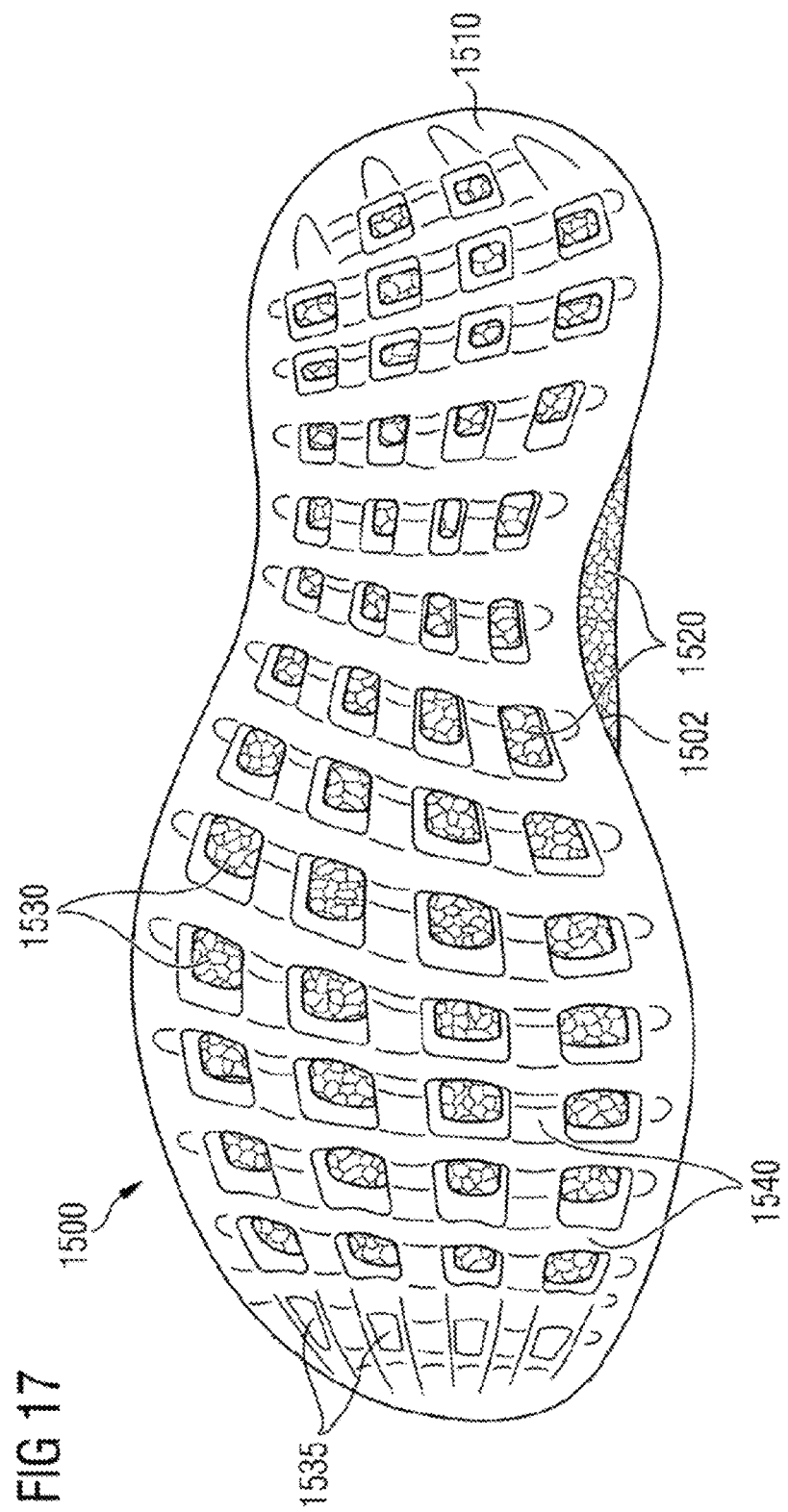
FIG. 17 is a bottom view of a sole part on a shoe, according to certain embodiments of the present invention.
Figure 18:
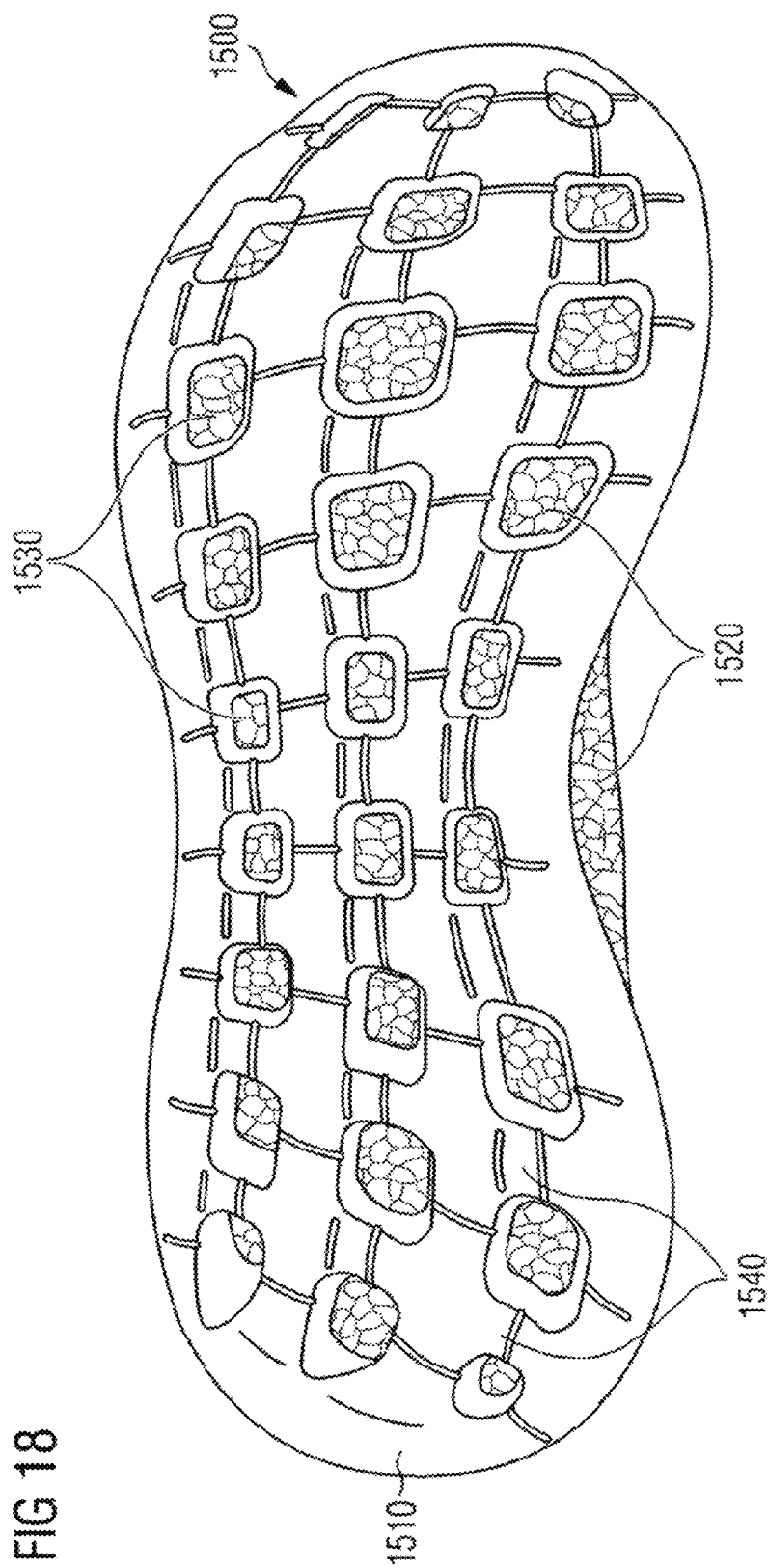
FIG. 18 is a bottom view of a sole part on a shoe, according to certain embodiments of the present invention.

The grid structure 1540 may further comprise a number of open areas indicated as deformation regions 1530, as shown in FIG. 15B. These deformations regions 1530 allow the expanded particle material to deform, since open areas have a volume larger than that of a single expanded particle. During use, for example, under a pressure load applied to the midsole 1502, the material of the first sole region 1520 may deform downward into these deformation regions 1530. The deformation regions 1530 may extend across the entire grid structure 1540. In some cases, deformation regions 1530 may be confined to certain areas of the midsole 1502. Further, as depicted in FIGS. 15B and 17, the grid structure 1540 may also include a controlled deformation zone 1535. Here, material of the grid structure 1540 may extend over the first sole region 1520 at a reduced thickness in the controlled deformation zone 1535 to control deformation of the material from the first sole region 1520.

As depicted in FIGS. 15J-K, the first sole region 1520 may extend throughout the whole thickness of the midsole 1502. Alternatively, first sole region 1520 may be confined to certain regions of the midsole, such as the forefoot and heel regions. For example, a shoe may have a first sole region which is positioned in the forefoot or near the heel. In some embodiments, multiple first sole regions may be utilized throughout the shoe. This may allow for differing characteristics of the sole in different parts of the shoe.

Figure 16:
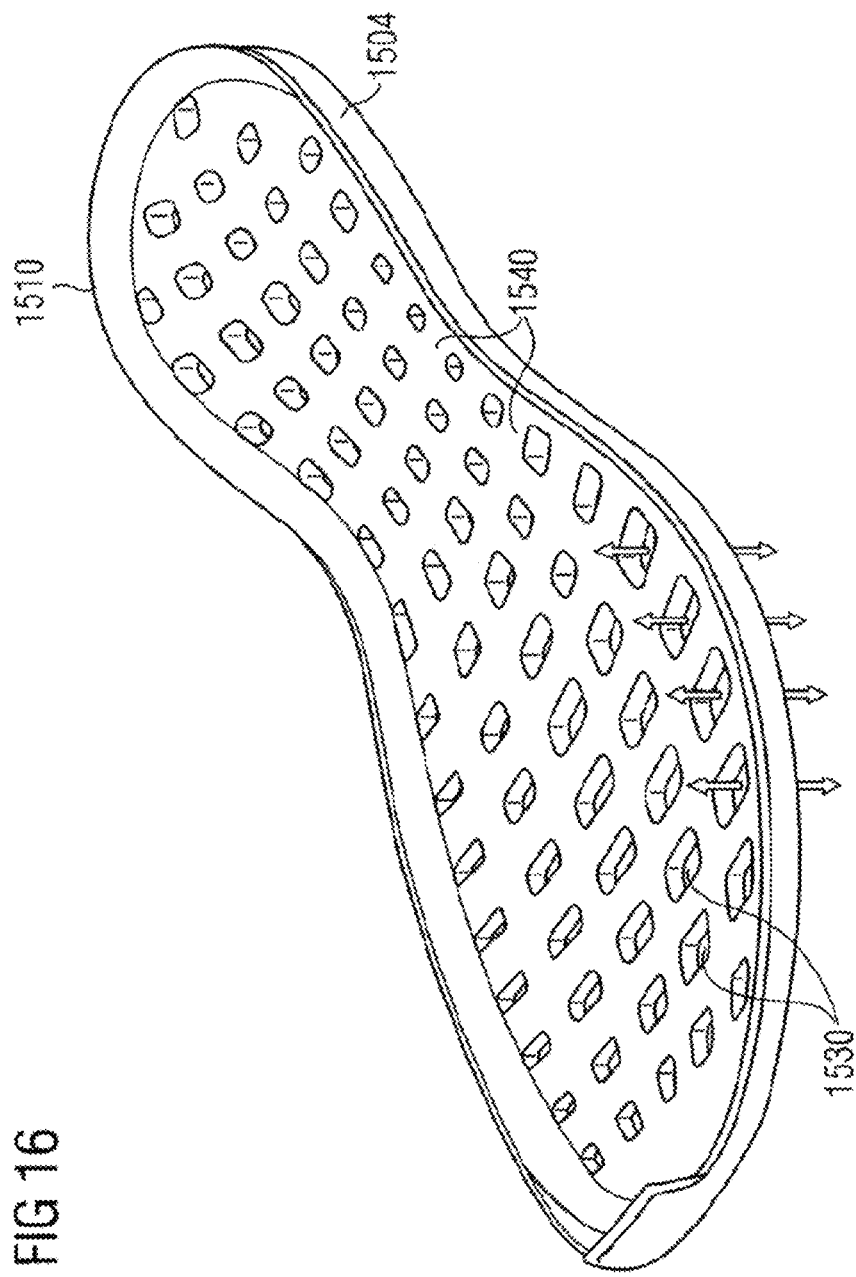
FIG. 16 is a perspective view of a sole part, according to certain embodiments of the present invention.

For example, an outsole may be made of rubber with TPU added in predetermined areas. For example, as shown in FIGS. 15J, 15K, and 16-19, a shoe sole 1500 may include the midsole portion 1502 and the outsole portion 1504. As shown in FIGS. 15K-16, outsole portion 1504 may include the grid structure 1540 having a number of deformation regions 1530, which have a volume larger than that of a single expanded particle and allow the expanded particle foam to deform proximate the deformation regions. The material of the first sole region 1520 may press or move downward into these deformation regions 1530 under a pressure load on the midsole 1502. The deformation regions 1530 may either extend throughout the entire grid structure 1540 or they may be confined to certain areas of the sole 1500. For example, FIGS. 15B, 16, 17, and 18 depict deformation regions 1530 of varying sizes and positioned at various points. Thus, portions of the first sole region 1520 may deform downward into the deformation regions during use, for example, when a wearer steps down upon a portion of the shoe.

Further, some examples may include areas having no deformation areas or deformation areas having a thin layer of the grid material, as shown in FIG. 17. This thin layer of grid material may be used to control deformation of the expanded foam and creates controlled deformation zones 1535. Thus, upon application of pressure to the shoe, deformation of the particle foam may occur throughout the whole thickness of the midsole 1502, or may be confined to certain regions of the midsole, such as the forefoot and heel regions.

Figure 19:
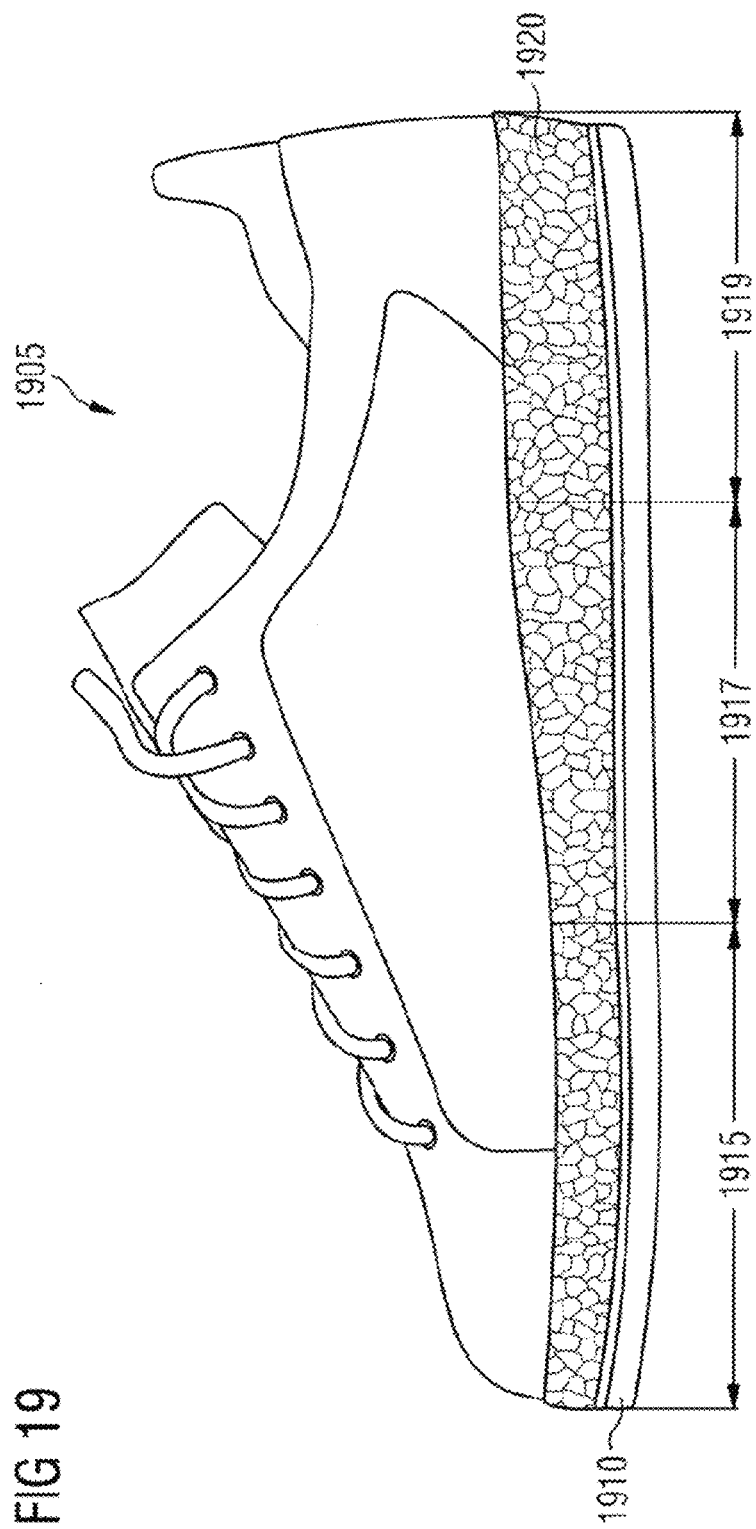
FIG. 19 is a side view of a shoe having a particle foam midsole and an outer sole part, according to certain embodiments of the present invention.

As depicted in FIGS. 19-22, configurations of the sole may vary. For example, FIG. 19 depicts a shoe 1905 having a first sole part 1910 and a first sole region 1920 with a relatively constant thickness along the length of the shoe. A forefoot region 1915 of first sole region 1920 has a substantially constant thickness, while a midfoot region 1917 of first sole region 1920 appears to become slightly thicker as one moves away from the forefoot region 1915 and toward heel region 1919. As depicted in FIG. 19, the heel region 1919 has a relatively constant thickness. By varying the thickness of the expanded particle foam material, it is possible to adjust the mechanical properties of the first sole region 1920 to meet the desired specifications of the shoe and/or shoe portions.

Figure 20:
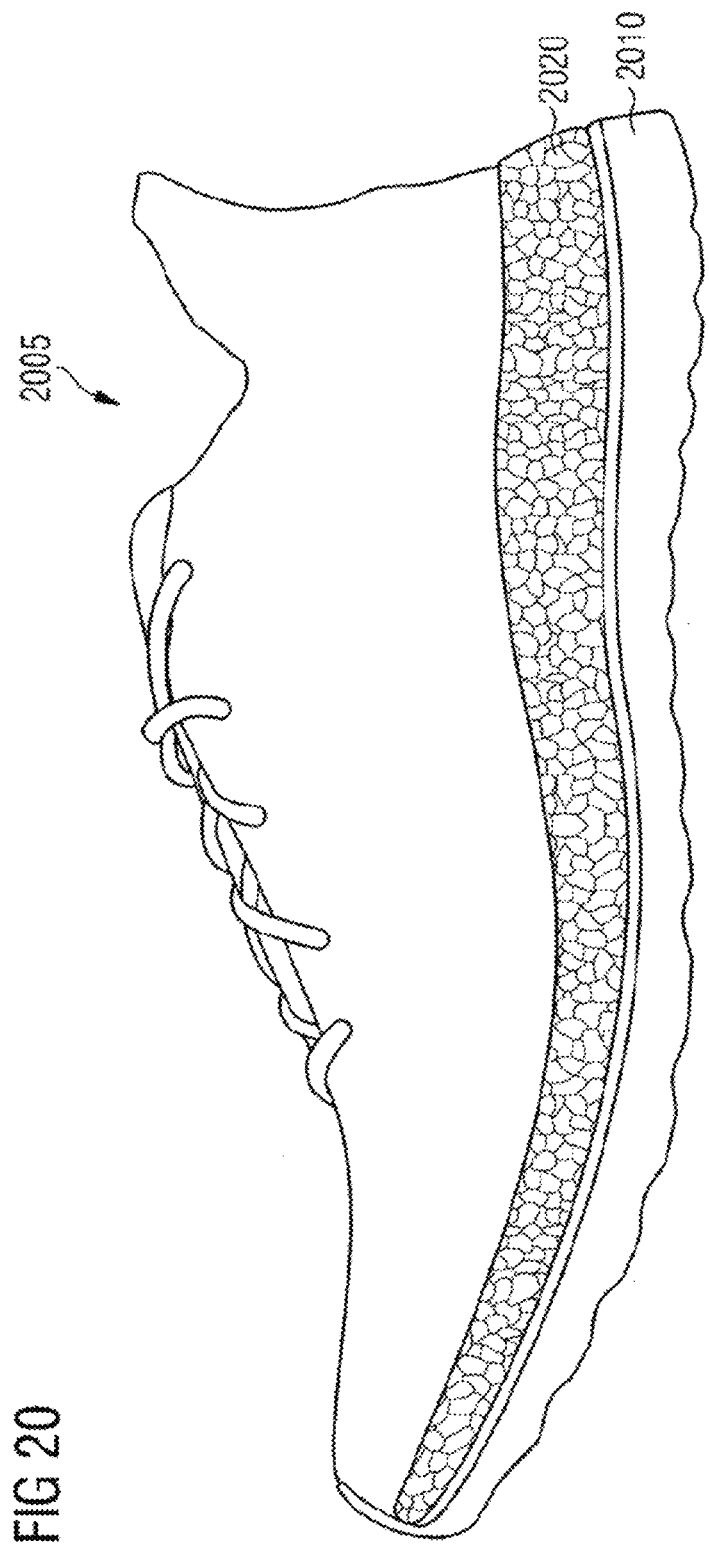
FIG. 20 is a side view of a shoe having a particle foam midsole and an outer sole part, according to certain embodiments of the present invention.
Figure 21:
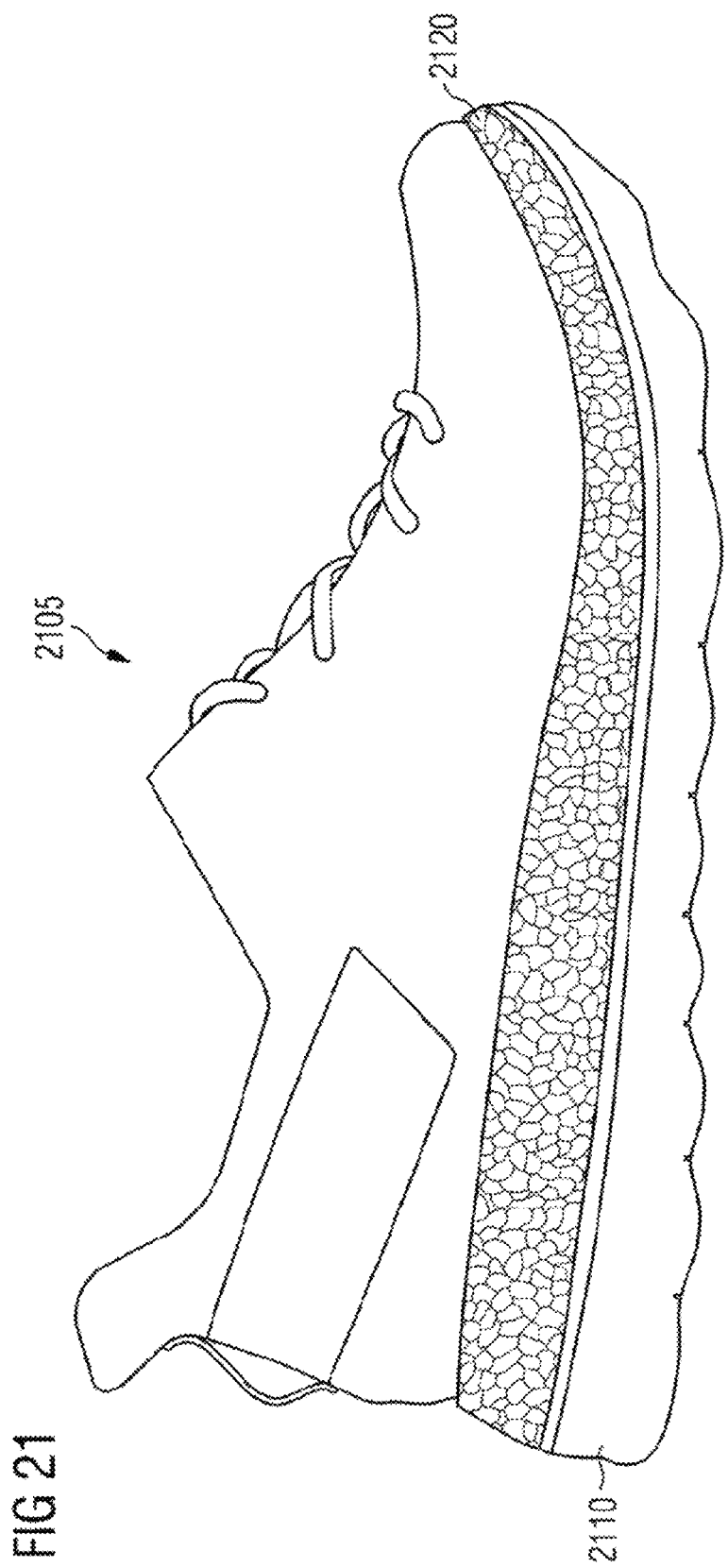
FIG. 21 is a side view of a shoe having a particle foam midsole and an outer sole part, according to certain embodiments of the present invention.
Figure 22:
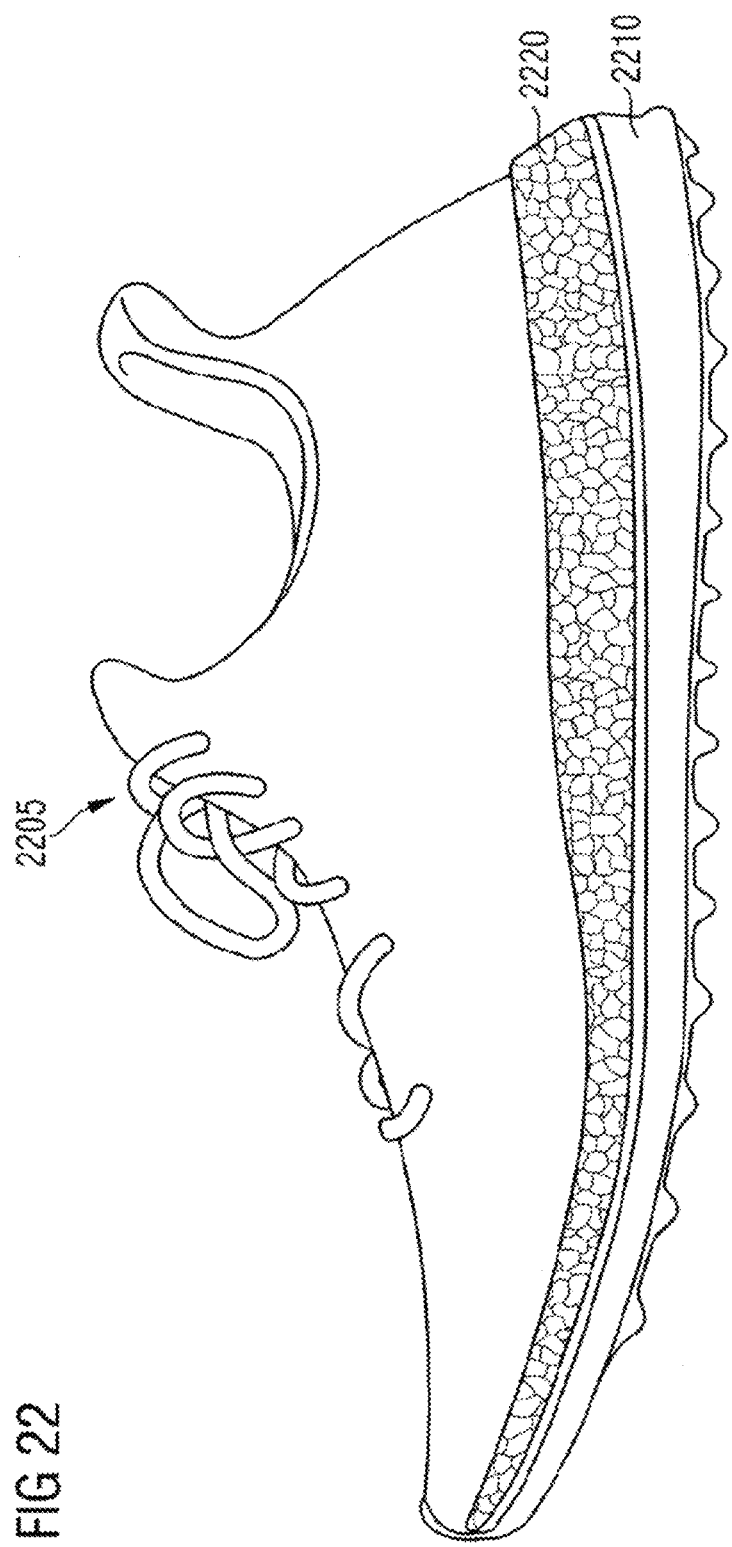
FIG. 22 is a side view of a shoe having a particle foam midsole and an outer sole part, according to certain embodiments of the present invention.

In contrast, FIGS. 20-22 depict multiple shoes 2005, 2105, 2205 with various combinations of first sole regions 2020, 2120, 2220 and first sole parts 2010, 2110, 2210 having various thicknesses in different parts of the shoe. These differences are often the result of the predetermined characteristics required for the shoe. Thus, it is possible to vary the geometries and/or thicknesses of the sole regions and/or sole parts to create shoe soles with predetermined characteristics.

Figure 23:
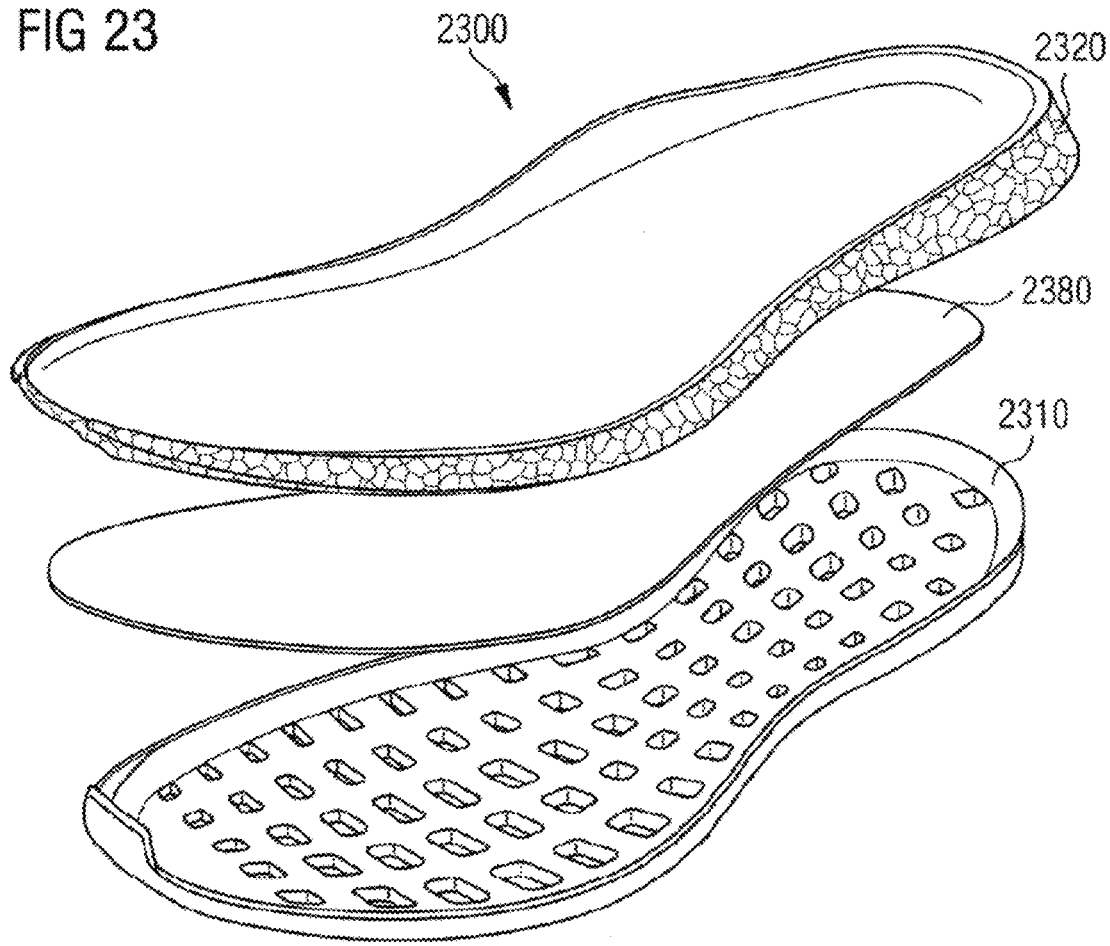
FIG. 23 is an exploded side perspective view of a shoe sole having a particle foam midsole, a reflective layer, and an outer sole part, according to certain embodiments of the present invention.
Figure 24:
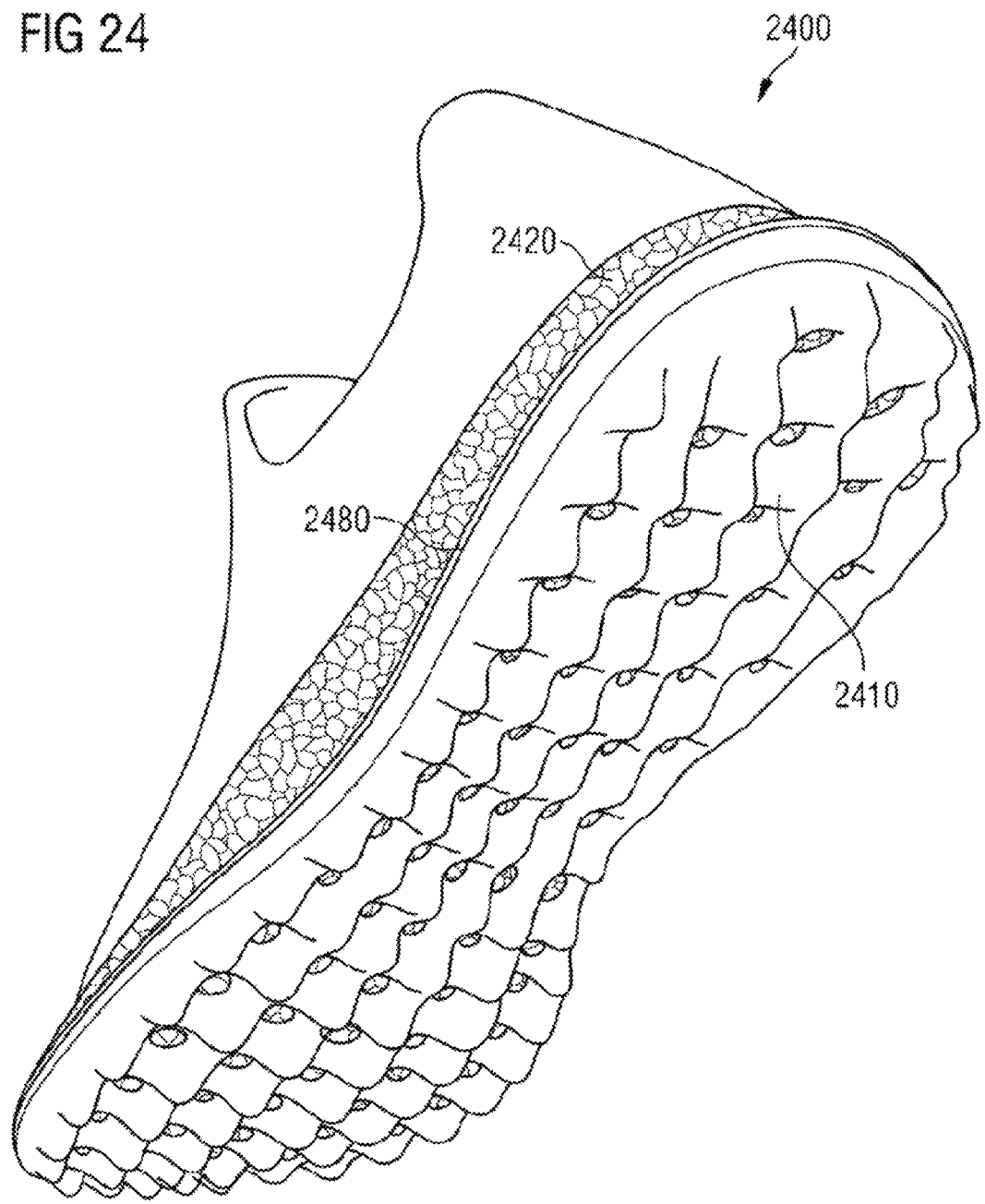
FIG. 24 is a side perspective view of a shoe sole having a particle foam midsole, a reflective layer, and an outer sole part, according to certain embodiments of the present invention.

As depicted in FIG. 23 as an expanded view, a sole 2300 includes a layer 2380 positioned between first sole region 2320 and first sole part 2310. FIG. 24 shows a sole 2400 in its assembled form including a layer 2480 positioned between a first sole region 2420 and a first sole part 2410. Layer 2380, 2480 may include, but are not limited to films, such as decorative films, reflective films, protective films, conductive films, adhesive films, textiles, fabrics, materials known in the art and combinations thereof. For example, as shown in FIGS. 23-24, layers 2380, 2480 are reflective films that extend substantially along the length of the entire sole. In some instances, films 2380, 2480 may be positioned in portions or regions of the shoe. For example, a layer may include one or more piece of materials positioned at differing locations between the first sole region and first sole part. Specifically, a protective film may be used in areas that have highest ground contact and a reflective film may be used in areas that are most clearly visible while running.

Figure 25:
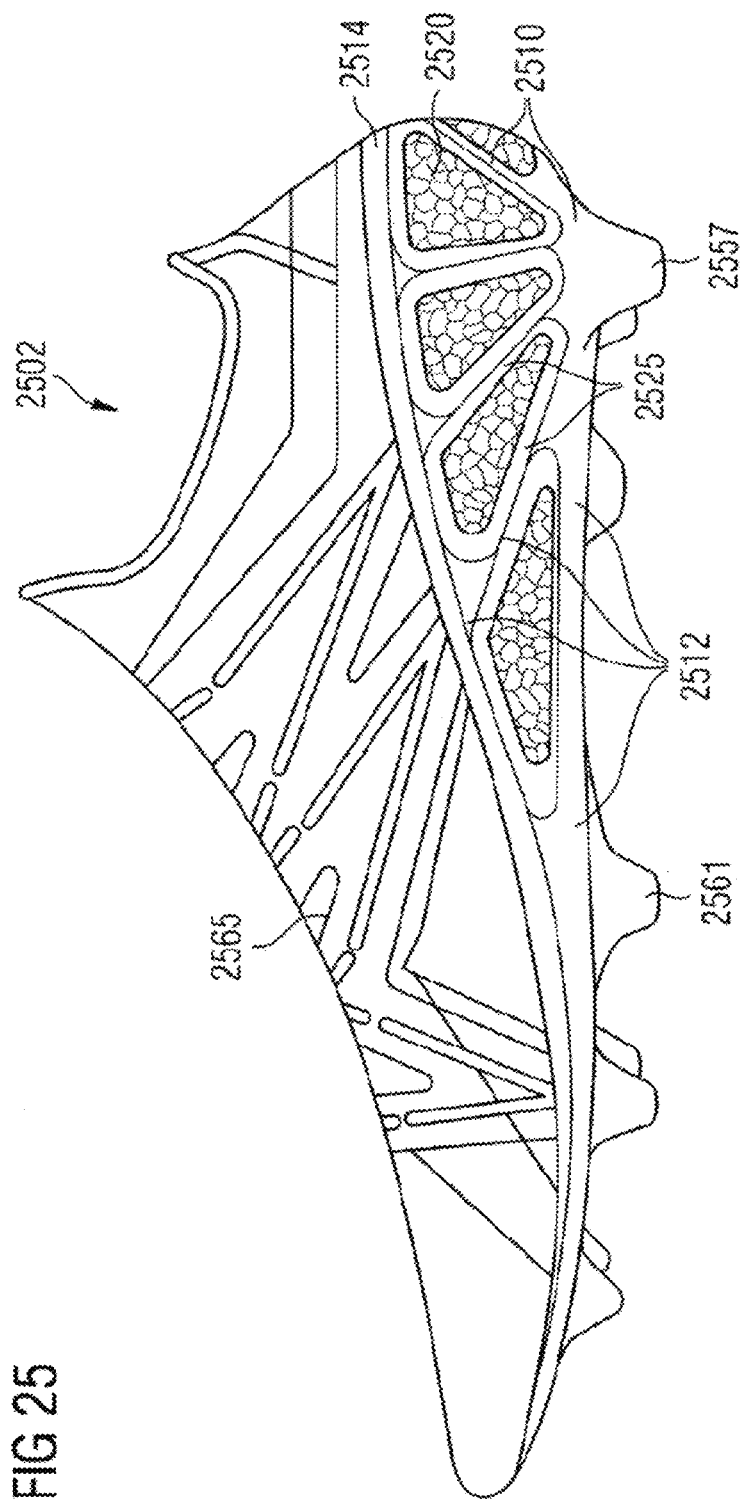
FIG. 25 is a side view of a soccer shoe having a particle foam midsole wall, according to certain embodiments of the present invention.

In some embodiments, a shoe 2502, 2602 may include a first sole region 2520, 2620 and a first sole part 2510, 2610, as depicted in FIG. 25. As shown in FIG. 25, the first sole part 2510, 2610 may include a frame element 2512, 2612. The frame element 2512, 2612 may include a ground contacting surface. Thus, at least a portion of the first sole part, that is the frame element 2512, 2612, may act as an outsole. For example, as shown in FIGS. 25-26, a ground contacting surface may include cleats 2557, 2657.

In some examples, a ground contacting surface of a shoe may be flat or substantially flat, provided with protruding elements, such as cleats, brush elements, treads, any geometry known in the art, recessed elements, and/or combinations thereof. The ground contacting surface may include textured areas, smooth areas, sticky areas, and/or combinations thereof.

In some instances it may be beneficial for portions of the ground contacting surface to have openings which communicate with the midsole and/or the first sole region. For example, as depicted in the partial cross-section of the cleats in FIG. 26, in some instances cleats may include hollow cleats 2658 which are filled with particle foam. Embodiments of some shoes may include hollow cleats which allow particle foam from the first sole region and/or the midsole to deform into openings of hollow cleats during use.

Figure 26:
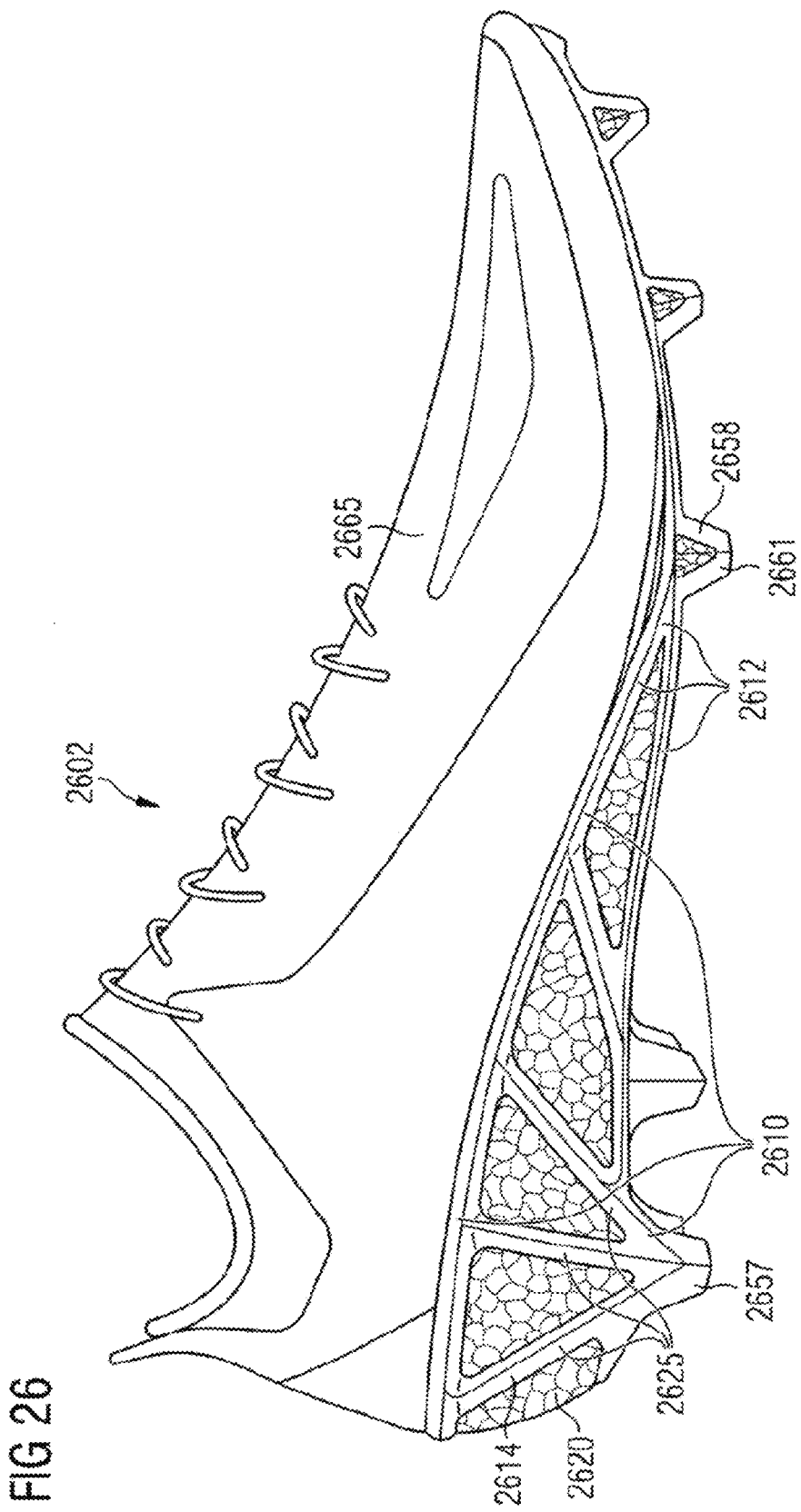
FIG. 26 is a side view of a soccer shoe having a particle foam midsole wall, according to certain embodiments of the present invention.

As depicted in FIGS. 25-26, frame element 2512, 2612 may extend from under the foot up the side of the shoe. In particular, frame element 2512, 2612 may include supporting element 2514, 2614 that extends upward around the heel. Thus, in some instances, frame elements may act as a heel counter. For example, in some instances the supporting element of the frame element, in combination with the particle foam, may provide support consistent with a conventional heel counter.

Further, examples of frame elements are depicted in FIGS. 25-31. FIGS. 25-31 depict examples of frame element 2512, 2612, 2712, 2812, 2912, 3012, 3112 and supporting elements 2514, 2614, 2714, 2814, 2914, 3014, 3114 where the supporting elements of the frame element at least partially encompass a heel region on its sides. Support members 2525, 2625, 2725, 2825, 2925, 3025, 3125 are integral parts of the supporting elements and frame elements. Positioning of the support members on a frame element and/or a supporting element may vary.

As depicted in FIGS. 25-26, the frame element 2512 may encompass a portion of the midfoot region. In the forefoot region, as depicted in FIG. 25, the frame element 2512 may be limited on the sides of the upper.

Figure 27:
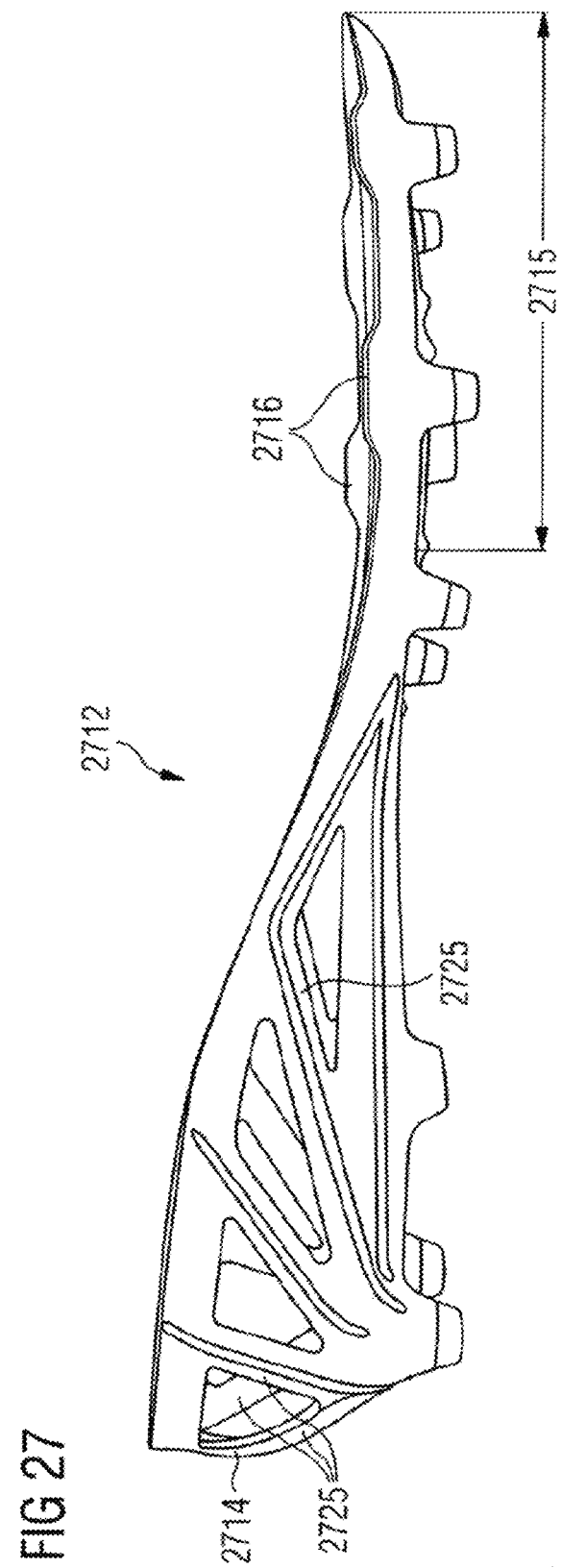
FIG. 27 is a side view of a frame element, according to certain embodiments of the present invention.

A frame element 2712 of FIG. 27 depicts supporting element 2714 that extends upward in the heel region. Further, in a forefoot region 2715, a frame element 2712 may further comprise supporting elements 2716, wherein the supporting element is arranged on the lateral side of a heel region.

Supporting elements of the frame element 2512, 2712 may include varying geometries, depending on the use of the shoe. Various constructions of supporting elements and frame elements are depicted in FIGS. 25-31. For example, FIGS. 25-27 depict various frame elements where the supporting elements extend up over the upper 2565, 2665 from the heel to the midfoot section of the shoe. Further examples shown in FIGS. 28-29 include supporting element 2814, 2914 of frame element 2812, 2912, where the supporting element 2814, 2914 is found primarily in the heel region of the frame element 2812, 2912.

Figure 28:
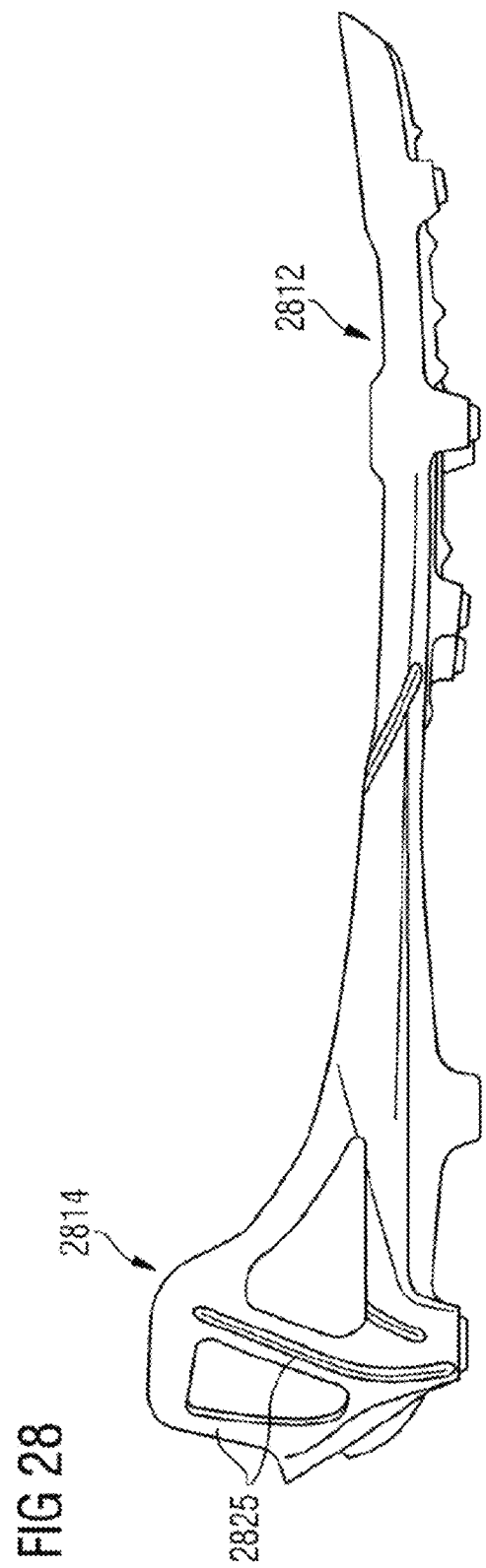
FIG. 28 is a side view of a frame element, according to certain embodiments of the present invention.

In some instances, the design of the frame element and/or supporting elements may be created based on pre-determined limitations. For example, pre-determined values for weight, bulkiness, etc., as well as a need to minimize pressure points may play a role. FIG. 28 depicts a medial side view of frame element 2812. In this instance, the geometry of the supporting element may allow for more freedom of movement. Further, it is possible depending on materials that this configuration reduces the weight of the frame element. For example, such frame elements in combination with the particle foam may act as a heel counter while having a weight less than that of a conventional heel counter in a shoe.

Figure 29:
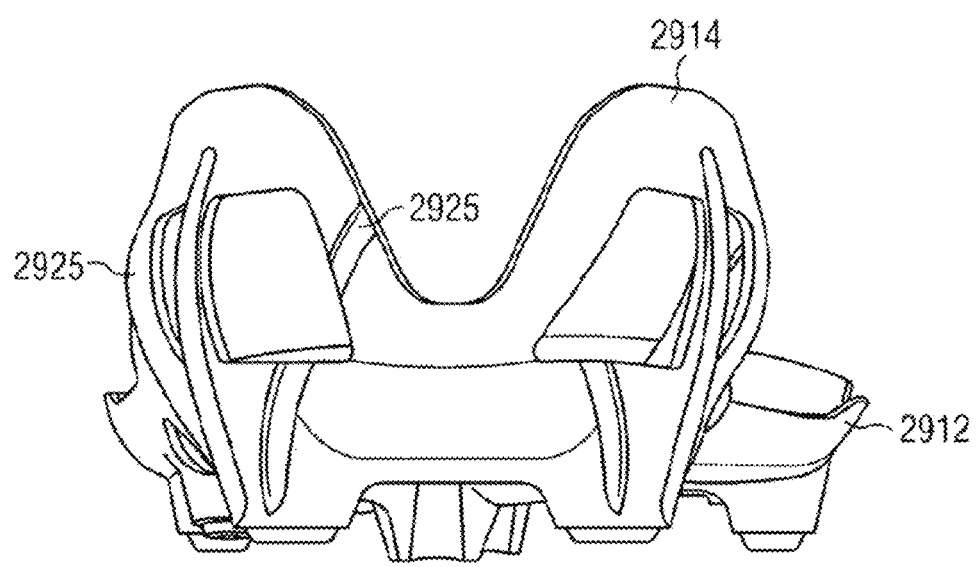
FIG. 29 is a rear view of the frame element of FIG. 28.

FIG. 29 depicts a rear perspective view of frame element 2812 of FIG. 28. Supporting element 2912 is configured to wrap around the heel. The supporting element 2914 has various support members 2925. Support members 2925 may be positioned such that they allow for freedom of movement while still providing support to the user during use. For example, FIG. 29 depicts supporting element 2914 having supporting members 2925 positioned such that there is freedom of movement for the Achilles tendon. As depicted, reducing the number of potential contact points between the support members and the Achilles tendon helps provide a comfortable fit.

Figure 30:
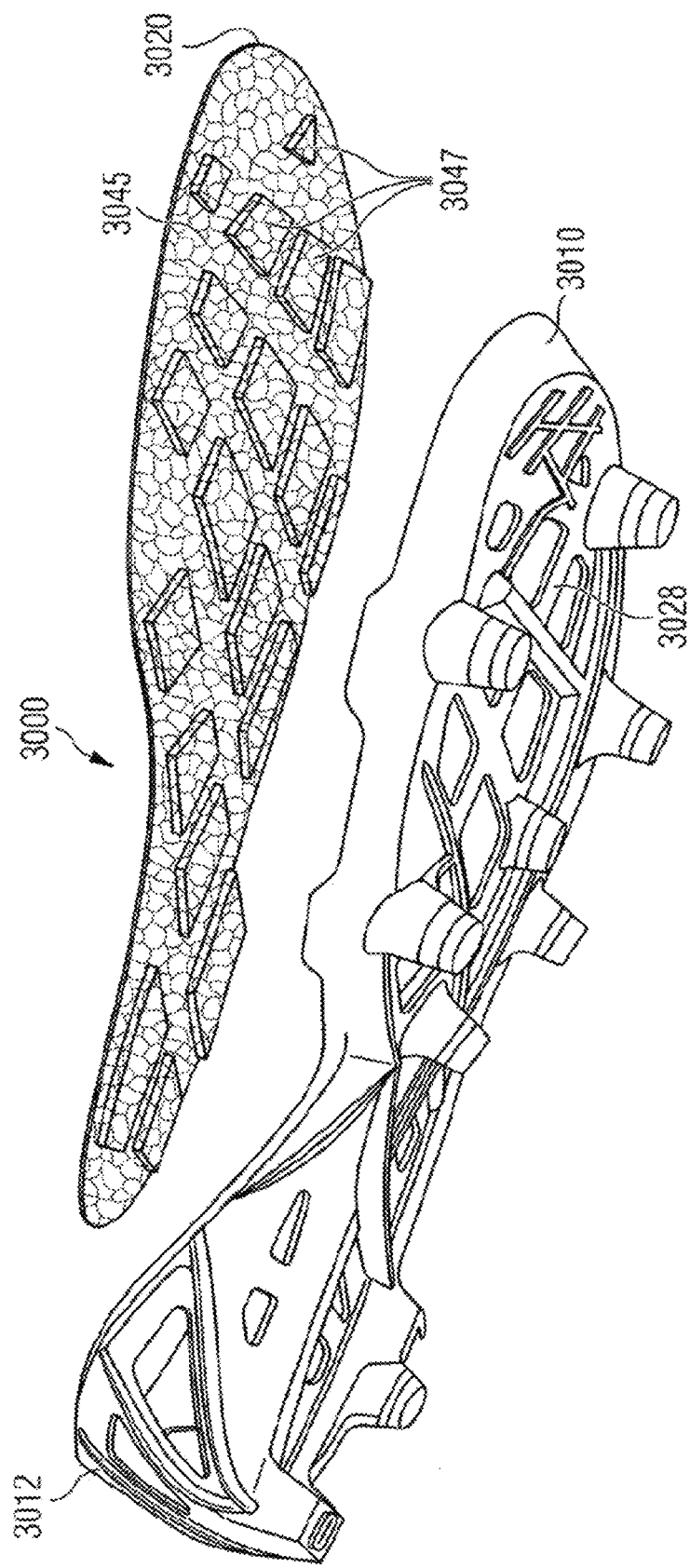
FIG. 30 is an exploded perspective side view of a first sole part and a first sole region, according to certain embodiments of the present invention.

As shown in FIG. 30, sole 3000 for a shoe may include a first sole part 3010 and a first sole region 3020. The first sole region 3020 may include particle foam. As depicted in FIG. 30, the first sole region 3020 made from particle foam may be shaped to conform with a shape of the first sole part 3010. In some embodiments, a particle foam 3045 of the first sole region 3020 may have one or more areas of predetermined thickness. As depicted in FIG. 30, the first sole region 3020 may include one or more protruding areas 3047. In some embodiments, the frame element 3012 may include at least one bar member 3028 that helps secure the frame element 3012 to the midsole.

Figure 31:
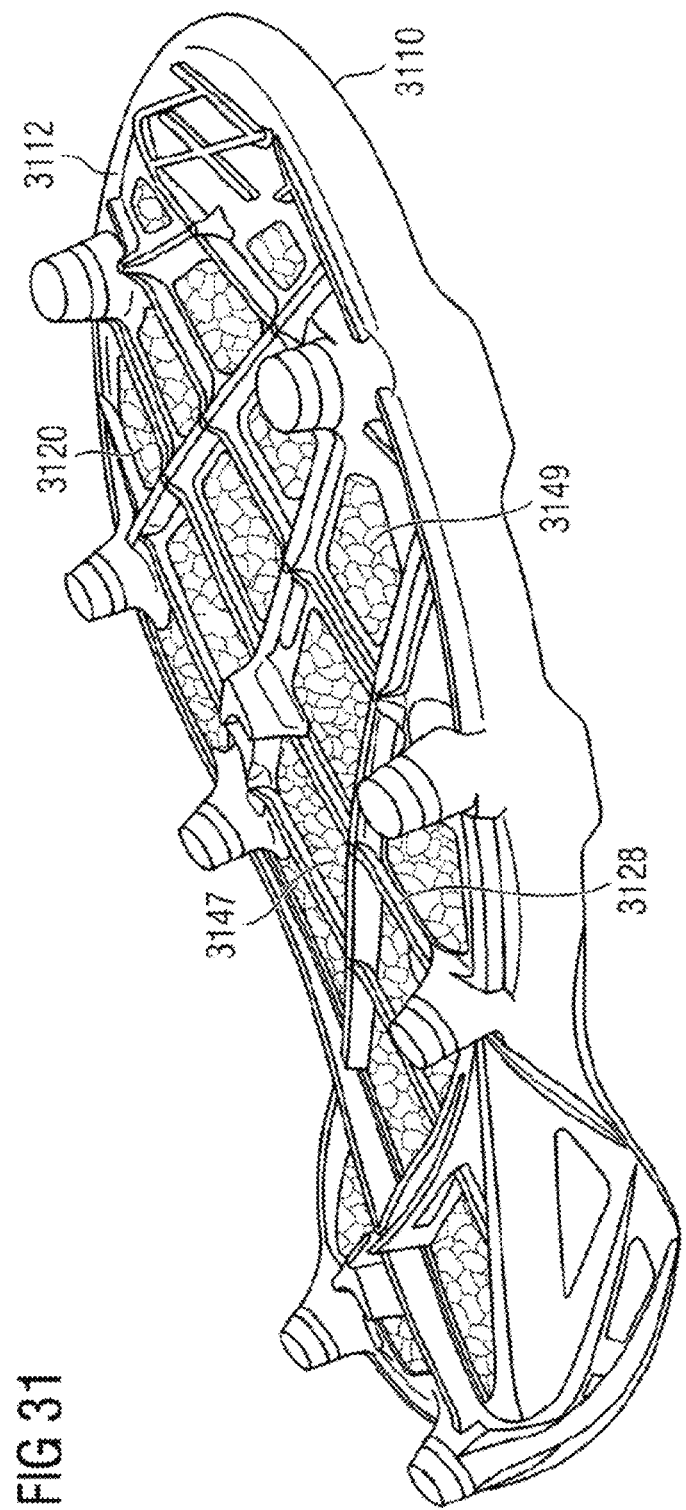
FIG. 31 is an bottom perspective view of a first sole part and a first sole region coupled together, according to certain embodiments of the present invention.

FIG. 31 shows a first sole region 3120 stockfit to a first sole part 3110, that is, frame element 3112. Protruding areas 3147 on the first sole region 3120 are constructed such that they conform to the shape of openings 3149 in the frame element 3112 formed between bar elements 3128. Thus, as shown in FIG. 31, bar elements may be at least partially surrounded by particle foam in a finished shoe. Particle foam of the first sole region 3120 may have a thickness in a range from about 0.2 mm to about 20 mm. In some embodiments, particle foam having a thickness of between 0.5 mm and 10 mm will be used. For example, some shoes may include a first sole region having a thickness in a range from about 0.7 mm to about 5 mm.

Figure 32:
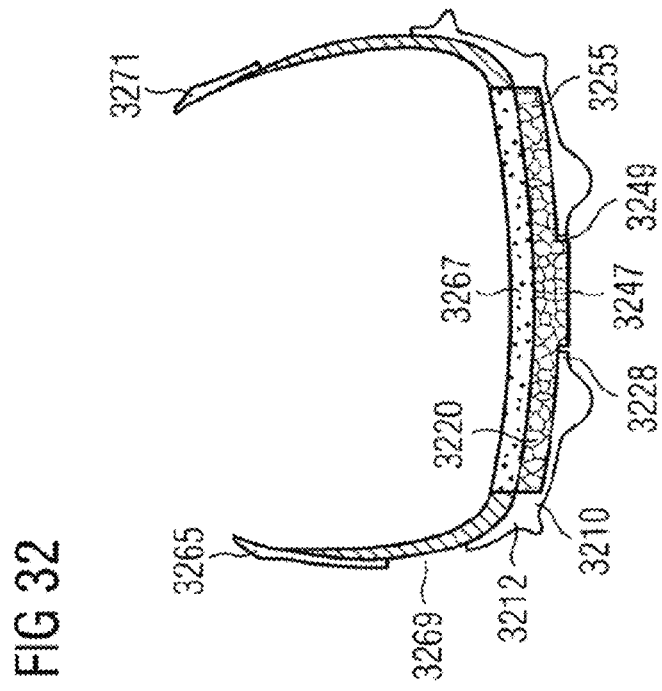
FIG. 32 is a cross-sectional view of the interior of a soccer shoe, according to certain embodiments of the present invention.

As shown in the cross-section view of a shoe depicted in FIG. 32, a protruding area 3247 of particle foam component 3255 may have a thickness that substantially corresponds to the thickness of bar elements 3228 proximate the protruding area of the particle foam. Thus, as depicted in FIG. 32, protruding areas 3247 of the first sole region 3220 fit within openings 3249 of a first sole part 3210. The fit between protruding areas 3247 and openings 3249 may be configured such that any gap between bar elements 3228 defining openings 3249 in a frame element 3212 and protruding areas 3247 of the first sole region 3220 is substantially minimized. This may reduce and/or inhibit intrusion of water and/or dirt in a shoe utilizing such a sole construction. Further, as shown in FIG. 32, an upper 3265 may be positioned proximate the first sole region 3220 and the frame element 3212. The upper 3265 as depicted includes strobel board 3267, midsole wall portions 3269, and upper part 3271.

Figure 33:
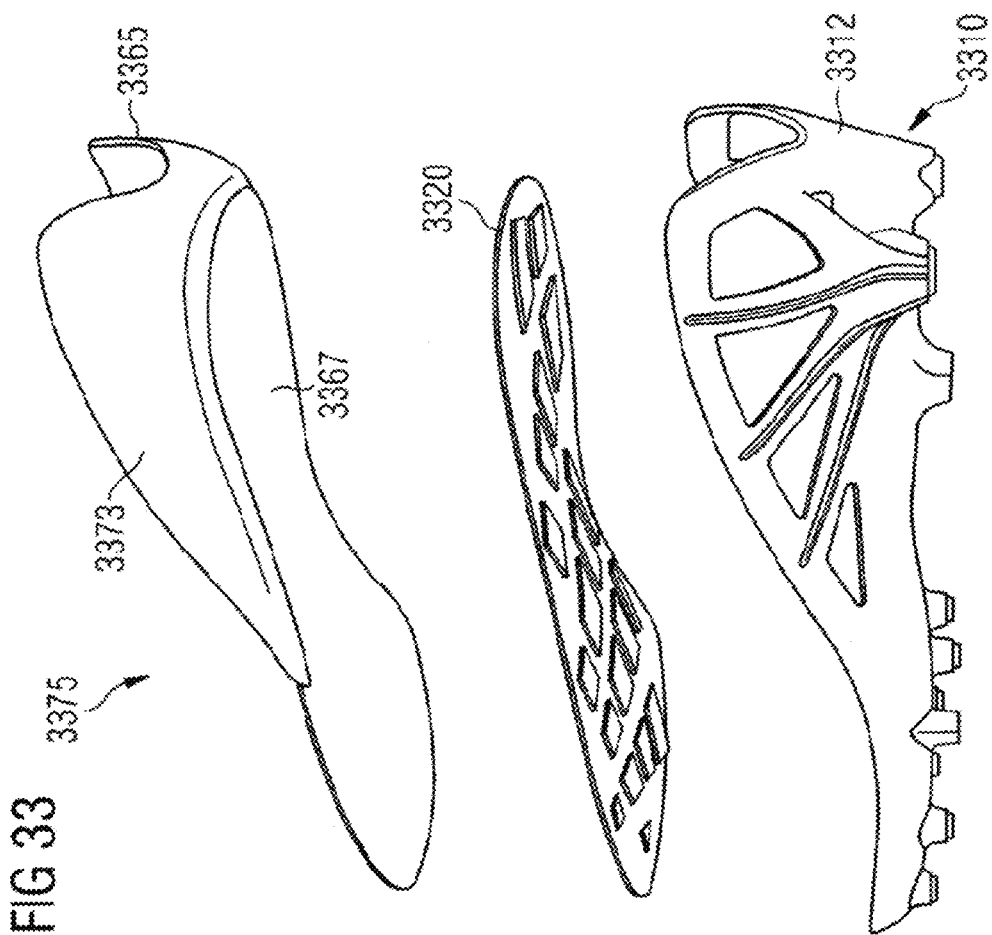
FIG. 33 is an exploded perspective side view of a portion of an upper, a first sole region and a first sole part, according to certain embodiments of the present invention.

As depicted in FIG. 33, an upper 3365 includes a strobel board 3367 and midsole wall portions 3373. Both the strobel board 3367 and the midsole wall portions 3373 are made from particle foam in FIG. 33. The particle foam components may be molded separately and joined together to form part 3375, which is incorporated into upper 3365. Upper 3265, 3365, 3465 may be positioned proximate the first sole region 3220, 3320, 3420, which is positioned proximate the frame element 3212, 3312, 3412 of the first sole part 3210, 3310, 3410, as indicated in FIGS. 32-34.

Alternately, in some instances, the upper part may include a strobel board and a midsole wall formed as one piece utilized in the described examples.

Thicknesses of the particle foam in the various components may vary based on predetermined characteristics and/or needs for the components. Particle foam used in the midsole wall portion may have a thickness in a range from about 0.2 mm to about 20 mm. Some instances may include a midsole wall portion having a thickness in a range of about 0.5 mm to about 10 mm. Midsole wall portions may have a thickness in a range from about 1 mm to about 4 mm. Particle foam used in the strobel board may have a thickness in a range from about 0.2 mm to about 20 mm. Some instances may include a strobel board having a thickness in a range of about 0.5 mm to about 10 mm. A strobel board may have a thickness in a range from about 1 mm to about 4 mm.

Figure 34:
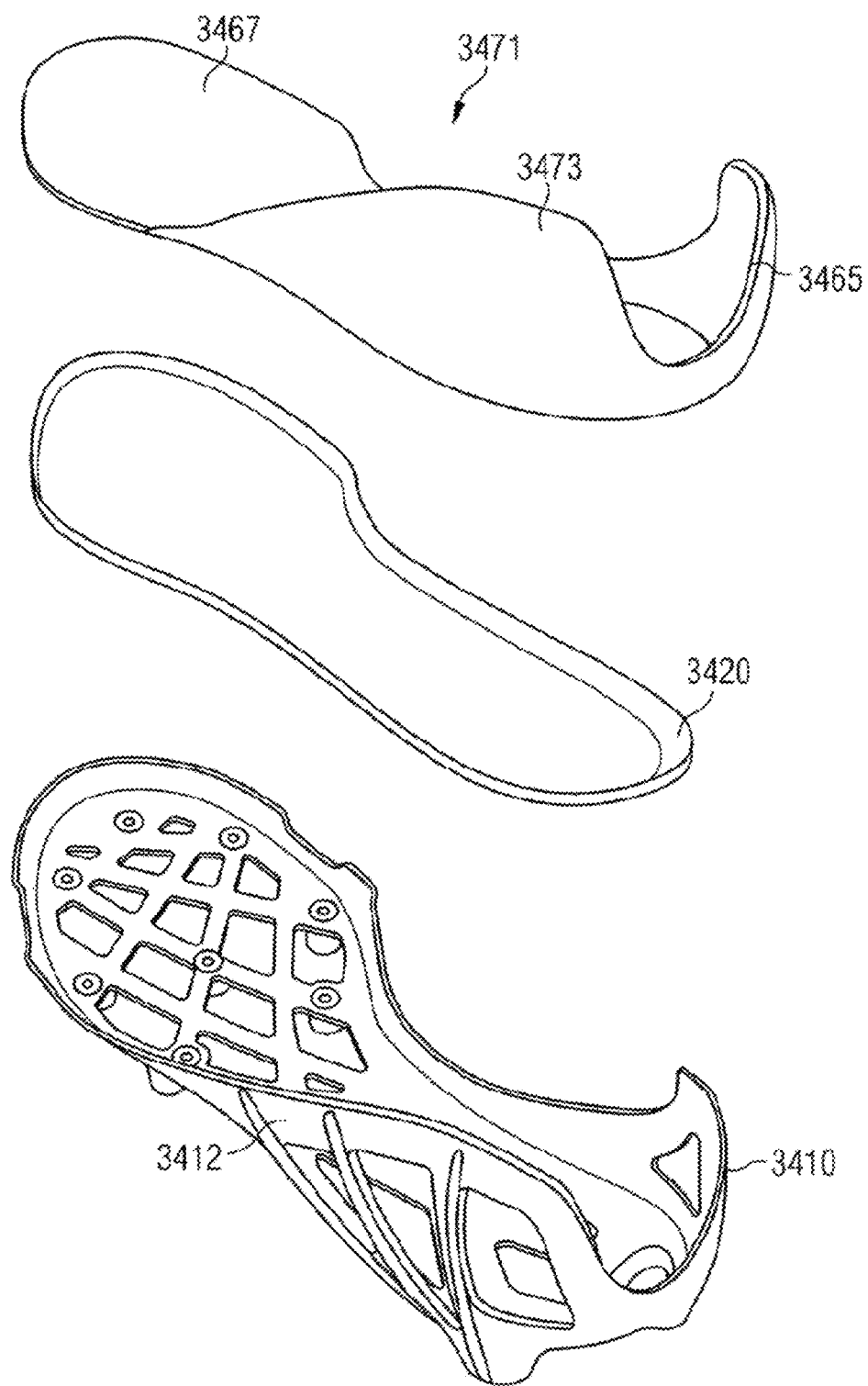
FIG. 34 is an exploded perspective side view of a portion of an upper, a first sole region and a first sole part, according to certain embodiments of the present invention.

An example of a shoe sole configuration, specifically for sports utilizing cleated shoes, such as soccer, lacrosse, field hockey, football, baseball, or the like, as shown in FIG. 34, includes an upper 3465 with midsole wall portions 3473 and strobel board 3467, a first sole region 3420, and a frame element 3412. The midsole wall portions 3473, the strobel board 3467, and the first sole region 3420 may all be made of particle foam. In addition, some embodiments may further include a particle foam sockliner. Thus, in an example of a shoe sole, the strobel board 3467, the first sole region 3420, and the particle foam sockliner (not shown) may each have thicknesses in the range of 3 mm, for a total thickness of about 9 mm of particle foam. In this example, the midsole wall portions may have a thickness of about 2 mm. Particle foams may be formed at these thicknesses and/or particle foams may be formed with a greater thickness and cut or split to the proper thickness and/or size. This is a non-limiting embodiment, however, and in other examples or embodiments, the strobel board 3467, the first sole region 3420, and the particle foam sockliner may have any suitable thickness that corresponds to any range of thicknesses described herein. In addition, a sockliner may include a textile portion on at least one side. For example, a textile layer may be positioned on the side proximate the foot of the wearer during use.

Figure 35:
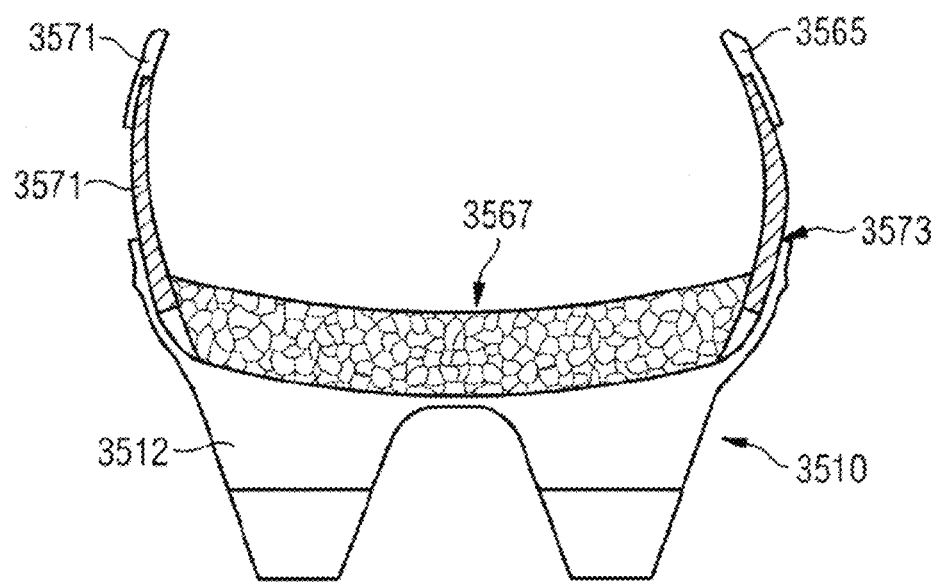
FIG. 35 is a cross-sectional view of the interior of a soccer shoe, according to certain embodiments of the present invention.

As shown in the cross-sectional view of a shoe depicted in FIG. 35, an upper 3565 is directly joined to first sole part 3510. Thus, the upper 3565, including upper part 3571 and strobel board 3567 act as a first sole region, that is, a midsole. The upper 3565 is positioned proximate the first sole part 3510, for example, a frame element 3512. As depicted in FIG. 35, a thickness of the strobel board in this configuration may be in a range from about 0.5 mm to about 20 mm. Some instances may include a strobel board 3567 having a thickness in a range of about 1.0 mm to about 15 mm. A strobel board 3567 may have a thickness in a range from about 2 mm to about 10 mm.

In alternate embodiments, components, specifically strobel boards and midsole wall portions, may be cut from sheets of particle foam and then stockfitted directly to the frame element.

Both the strobel board 3367, 3467, 3567 and the midsole wall portion 3373, 3473, 3573 are made from particle foam in FIGS. 33-35. The particle foam components may be molded separately and joined together to form the upper part 3371, 3471, 3571, which is incorporated into the upper 3565. For example, the particle foam components, specifically the strobel board 3367, 3467, 3567 and the midsole wall portion 3373, 3473, 3573 may be cut from sheets of particle foam and then stockfitted to the frame element.

Figure 36:
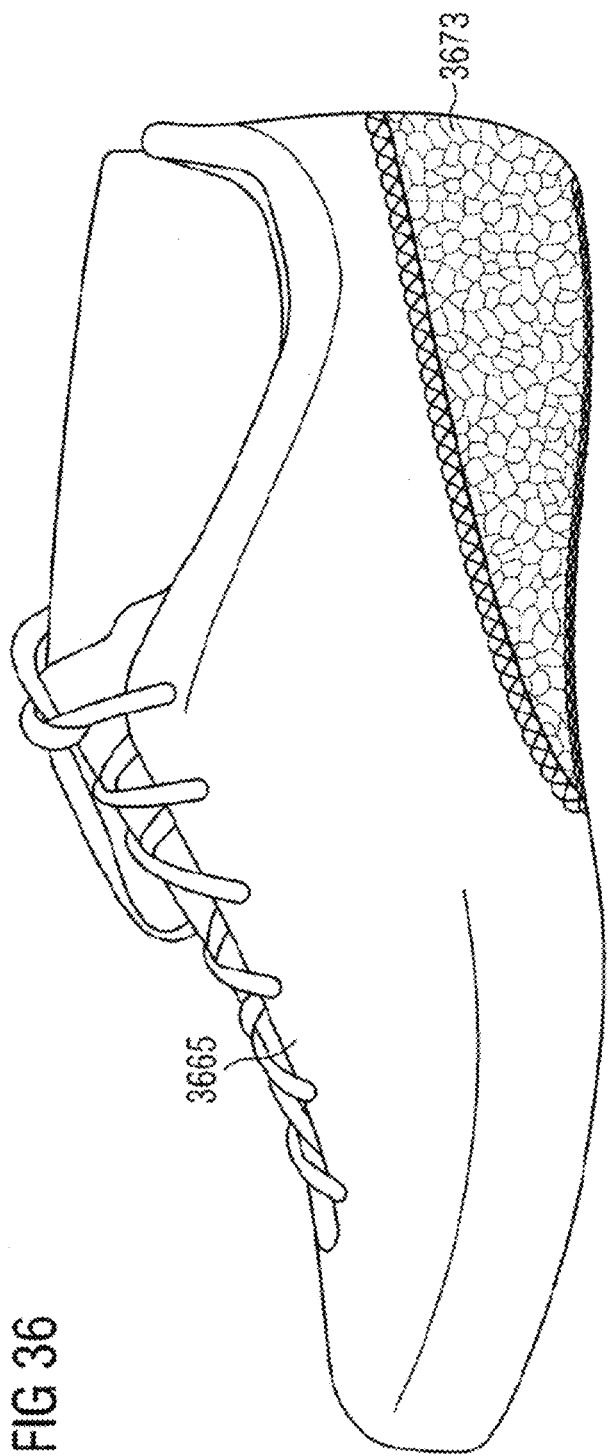
FIG. 36 is a side view of an upper for a soccer shoe, according to certain embodiments of the present invention.
Figure 37:
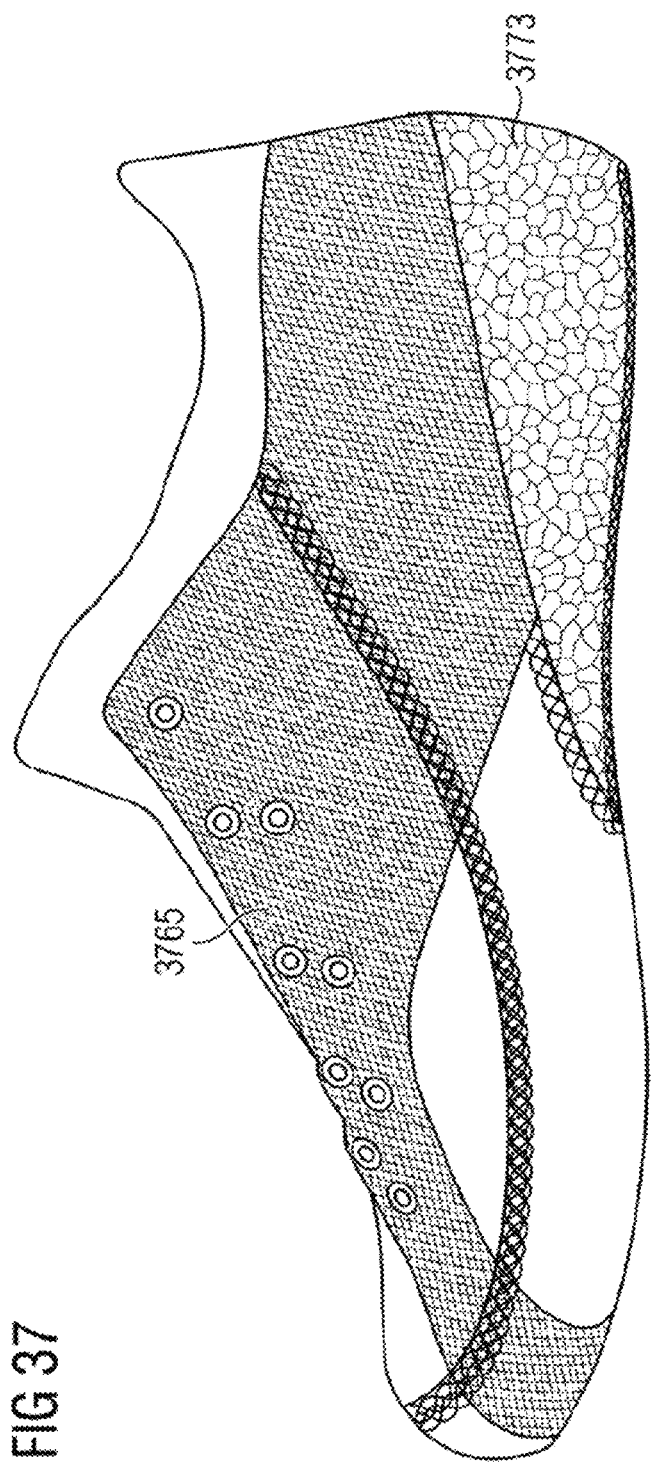
FIG. 37 is a side view of an upper for a soccer shoe, according to certain embodiments of the present invention.
Figure 38:
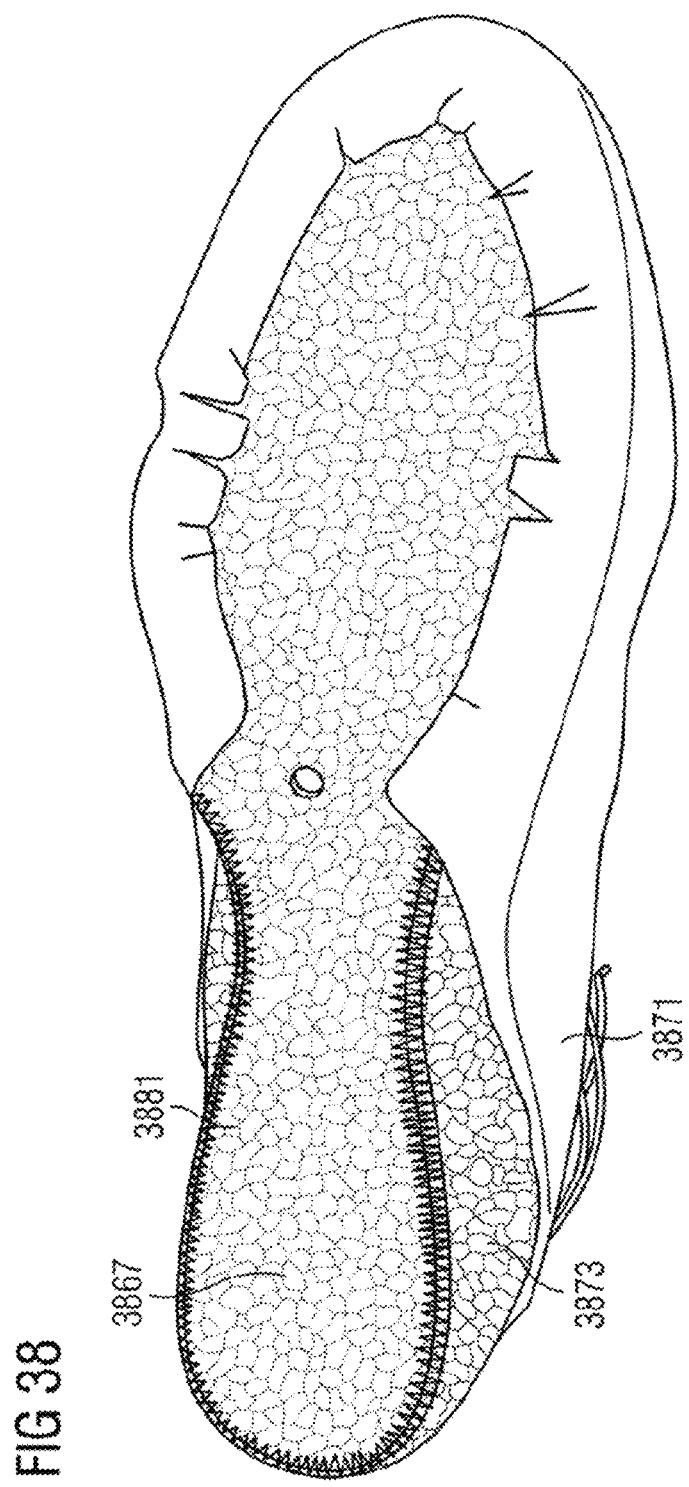
FIG. 38 is a bottom view of an upper for a soccer shoe, according to certain embodiments of the present invention.

FIGS. 36-37 illustrate upper 3665, 3765 having midsole wall portion 3673, 3773 made of particle foam components that are stitched to the upper part and particle foam board (shown in FIG. 38). As shown in FIG. 38, a strobel board 3867, as well as a midsole wall portion 3873, include a textile 3881 laminated to particle foam strobel component. The textile 3881 may be any material known in the art. Use of the textile 3881 provides additional support to the particle foam such that particle foam components can be stitched together. Use of a textile reduces the likelihood of tears in the particle foam, especially at areas having a thinner thickness of particle foam.

As depicted in FIG. 38, the textile 3881 faces the outside of the upper on the particle foam strobel component and the inside of the upper on the midsole wall portion. Textiles may be laminated on the particle foam components, such that the textile faces the outside of the upper, the inside of the upper, and/or combinations thereof. As shown, the upper part 3871 is joined to the midsole wall portion 3873 and the strobel board 3867 using a combination of stitches and/or adhesive. In some instances, any joining method known in the art for joining materials may be used to join the particle foam components to the upper, including but not limited to stitches, adhesives, bonding, welding, ultrasonic bonding, other joining methods known in the art and combinations thereof.

Figure 39:
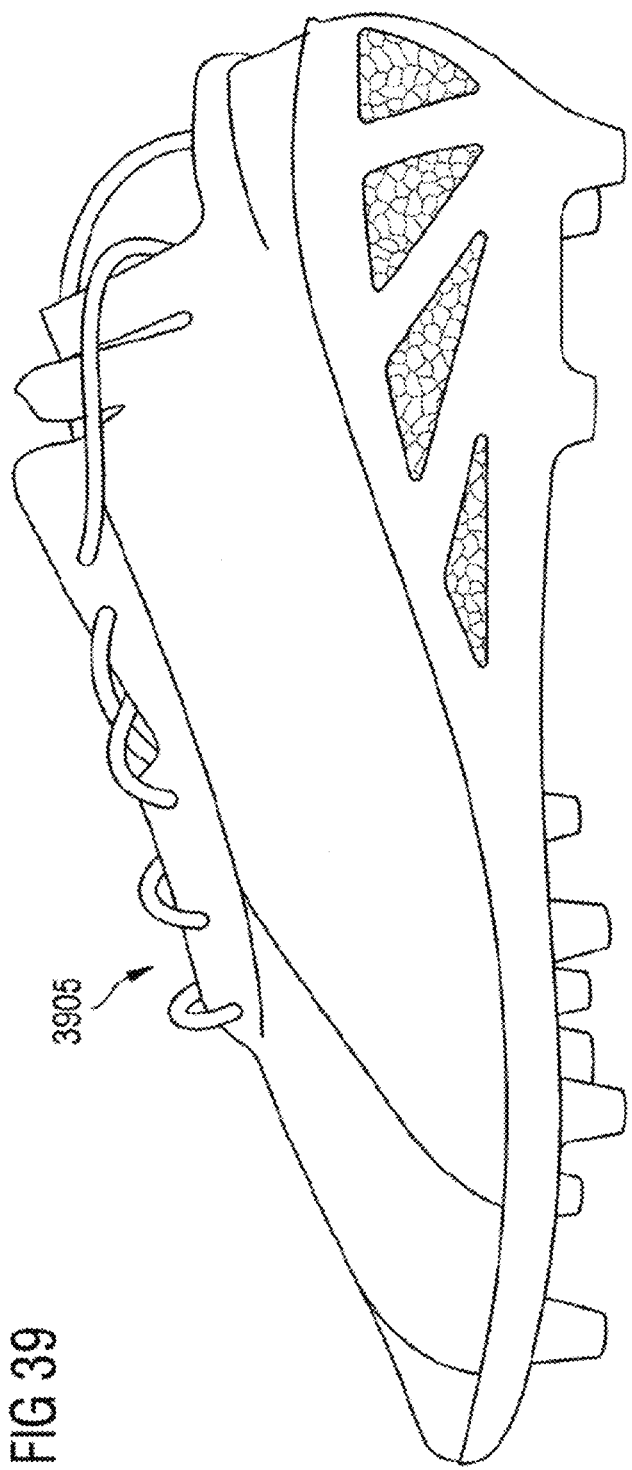
FIG. 39 is a side view of a soccer shoe, according to certain embodiments of the present invention.
Figure 40:
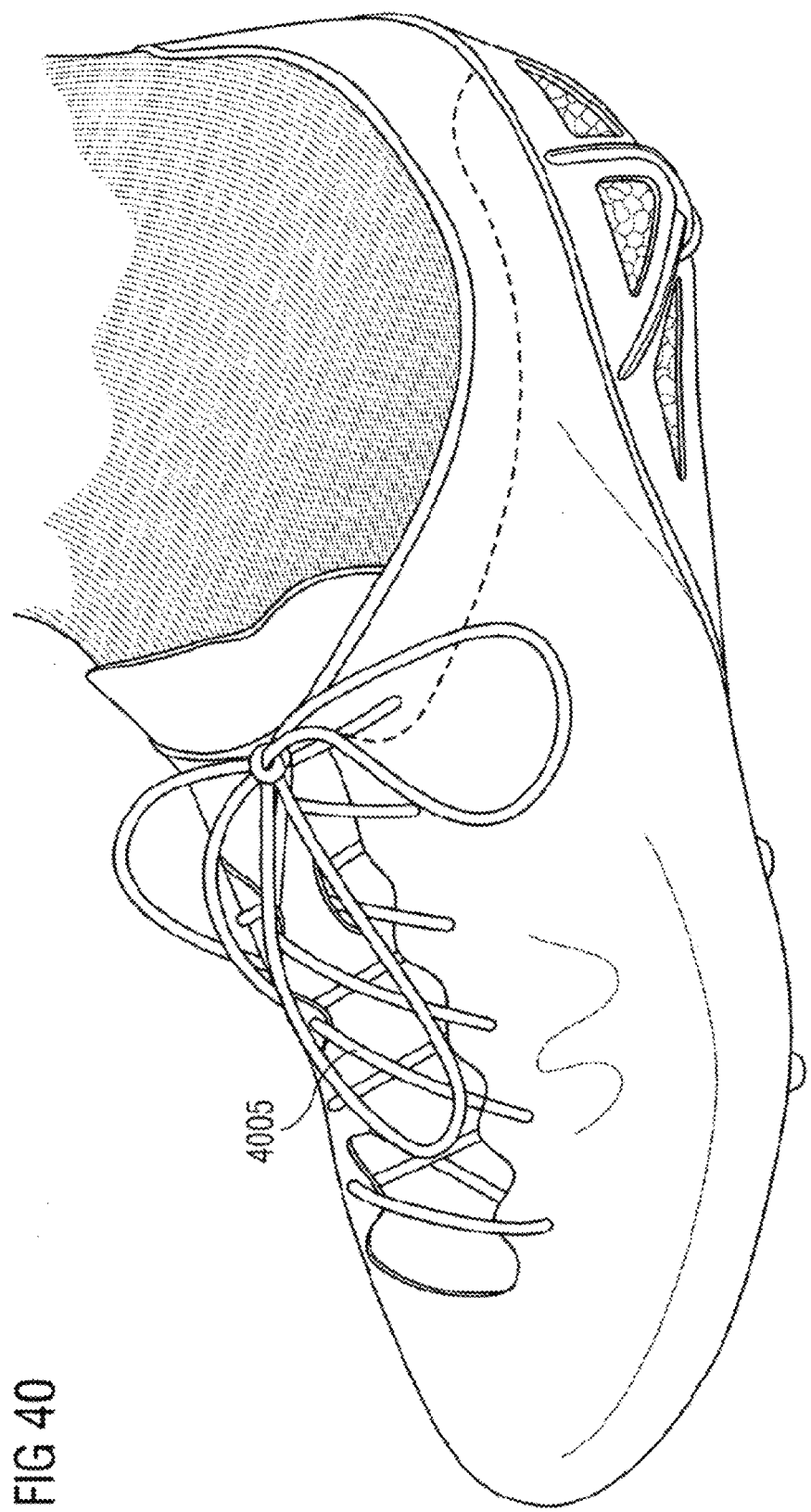
FIG. 40 is an upper perspective view of the soccer shoe of FIG. 39.

FIGS. 39-40 depict examples of shoes utilizing particle foam midsole walls, as well as a particle foam strobel board. In some instances, shoe 3905, 4005 may include an additional particle foam insole. An insole made of particle foam may have a thickness in a range from about 0.5 mm to about 20 mm. Some instances may include an insole made of particle foam having a thickness in a range of about 0.75 mm to about 10 mm. An insole made of particle foam may have a thickness in a range from about 1 mm to about 4 mm. Frame elements may be constructed from any suitable material known in the art or any combination of materials, including but not limited to polyamides, such as polyamide 12, polyamide 11, or other polyamides known in the art, and/or composites thereof, thermoplastic polyurethanes, other materials known in the art and/or combinations thereof.

In some embodiments, frame element 2512 may be constructed from multiple materials. For example, frame element 2512 may be constructed from polyamide while at least a portion of the cleats 2557 may be constructed from TPU. As depicted in FIGS. 27 and 43, an example of a frame element 2512 may be largely or completely constructed using a polyamide compound while stud tips 2561, 2661 are constructed of a TPU material.

Materials choices for the parts of the frame element and/or supporting element(s) may be obvious to someone skilled in the art and based upon the desired use. For example, materials selected for a shoe used on natural grass may differ from those selected for indoor use or for use on artificial turf.

Figure 41:
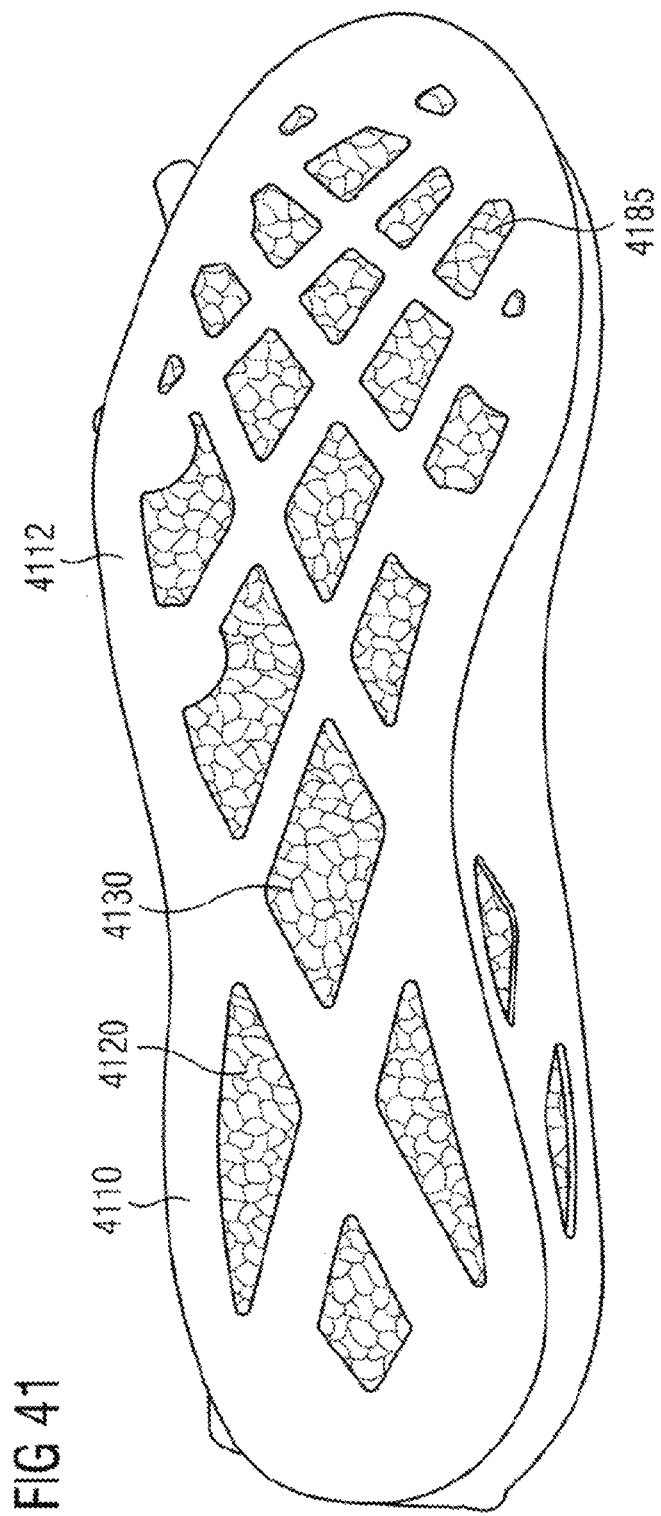
FIG. 41 is a bottom view of a frame element for a soccer shoe, according to certain embodiments of the present invention.
Figure 42:
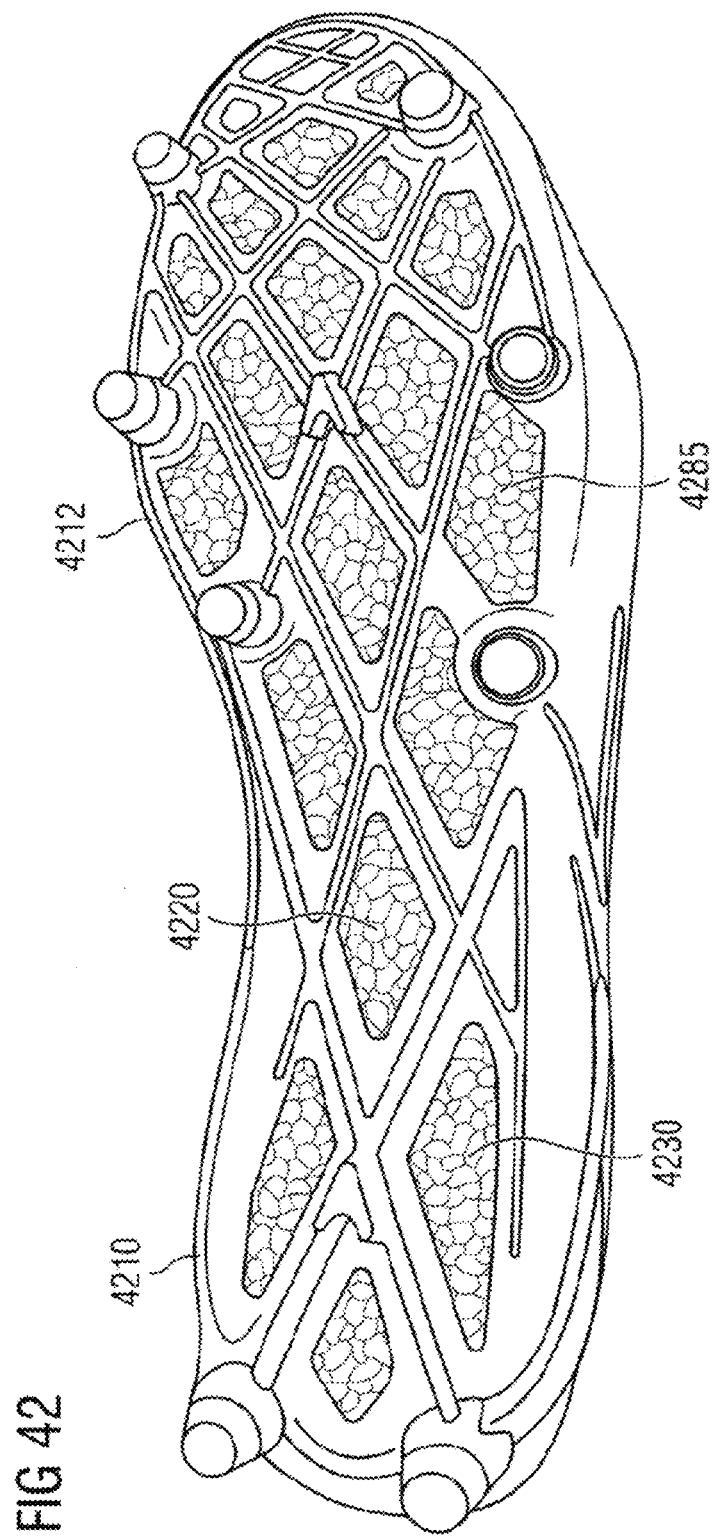
FIG. 42 is a bottom view of a frame element for a soccer shoe, according to certain embodiments of the present invention.

Geometries and/or selected materials of the frame element may vary depending on the use of the shoe. For example, a soccer, basketball, or football shoe may require additional support around the heel. Supporting elements may be positioned such that they provide support where needed given the use of the shoe. FIGS. 25-27 depict various frame elements where the supporting elements extend up over the upper from the heel to the midfoot section of the shoe. Further, some embodiments include supporting elements in the forefoot region of the shoe. As shown in FIGS. 41-42, according to certain embodiments of the present invention, a sole comprises a midsole having a first sole region 4120, 4220, which as depicted is a particle foam, and a deformation region 4130, 4230 in the first sole part 4110, 4210. Deformation regions may be defined by the boundaries of the sole part. In general, the deformation region comprises a volume greater than that of a single expanded particle of particle foam and is positioned so that it allows deformation of the particle foam under a pressure load on the sole. Sole further includes a frame element, which at least partially surrounds the midsole and which limits the deformation of the first sole region of the midsole under the pressure load on the sole.

As depicted in FIG. 41-42, outer layer 4185, 4285 of particle foam may be positioned in frame element 4112, 4212. The outer layer of the particle foam may be flat, structured, shaped, and/or have various zones incorporating combinations thereof. Some examples of outer layer of particle foam may include additional materials such as films, textiles, and the like. For example, outer layer 4285 of particle foam may include a film on the outer surface to impart a color to the particle foam as depicted in FIG. 42. Alternatively, such films may be clear. In some instances, this film may inhibit discoloration of the material and/or may impart strength and/or deformation properties to the material.

Figure 43B:
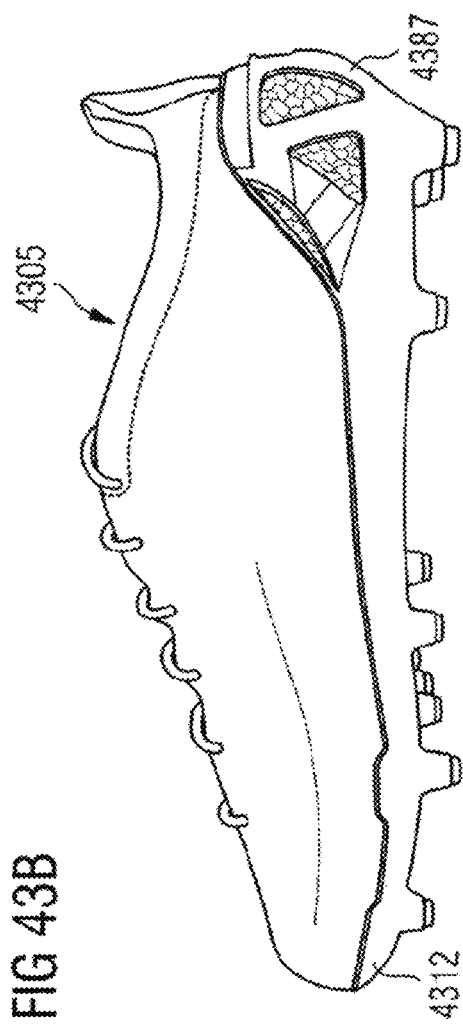
FIGS. 43A-C are various views of a soccer shoe, according to certain embodiments of the present invention.
Figure 43C:
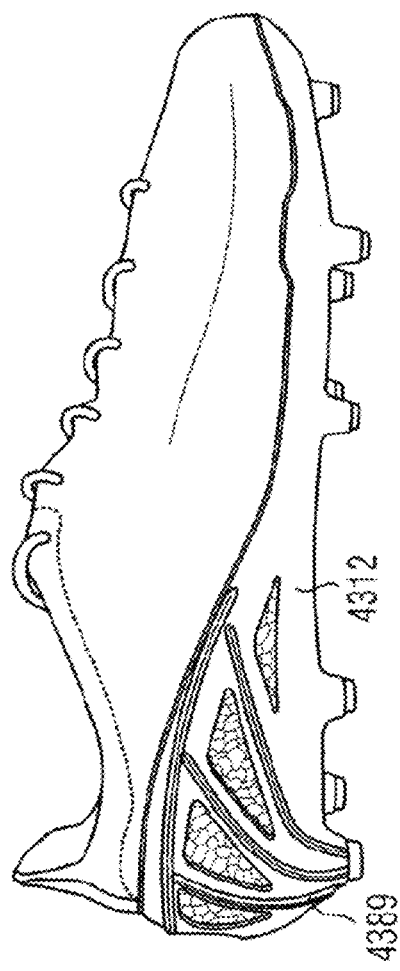
Figure 43A:
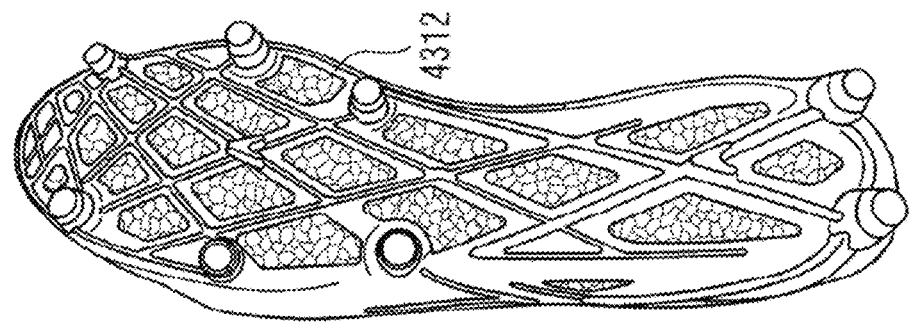

As shown in FIGS. 43A-C, shoe 4305 includes a frame element 4312 having differing constructions on the medial and lateral sides of shoe 4305. FIG. 43B depicts the medial side of shoe 4305 and frame element 4312. Medial supporting element 4387 is configured to provide support to the heel of the user during use, while not reducing and/or inhibiting mobility. Lateral supporting element 4389 depicted in FIG. 43C provides additional support to the lateral side of the foot. These configurations of supporting elements may vary depending on use.

In the following, further examples are described to facilitate the understanding of the invention:

1. A sole with a midsole, wherein the midsole comprises:
    a first sole region comprising particle foam; and
    a deformation region positioned proximate the first sole region, wherein the deformation region comprises a volume greater than that of a single expanded particle in the particle foam and is configured to allow deformation of the particle foam of the first sole region under a pressure load on the sole.
2. The sole according to example 1, wherein the deformation is sideward in direction.
3. The sole according to any preceding example, wherein the deformation region is at least partially provided as an empty space.

4. The sole according to any preceding example, wherein the midsole further comprises a control element that limits the deformation of the particle foam of the first sole region.
5. The sole according to any preceding example, wherein the control element comprises at least a part of the deformation region.
6. The sole according to any preceding example, wherein the control element comprises a groove.
7. The sole according to any preceding example, wherein the control element at least partially bounds the first sole region on its sides.
8. The sole according to any preceding example, wherein the control element is free from particles of the particle foam.
9. The sole according to any preceding example, wherein the deformation region comprises a material that yields to the deformation of the material of the first sole region.
10. The sole according to example 9, wherein the yielding material has a deformation stiffness that is 5%-40% greater than the deformation stiffness of the first sole region.
11. A shoe with a sole according to any preceding example.
12. The sole according to any preceding example, further comprising:
a second sole region comprising particle foam and providing an increasing deformation stiffness along at least one predetermined direction.
13. The sole according to example 12, wherein the increase in the deformation stiffness is at least partially due to an increase in density of the particle foam of the second sole region along the at least one predetermined direction.
14. The sole according to any of examples 12-13, wherein the at least one predetermined direction extends from a medial side of the sole towards a lateral side of the sole.
15. The sole according to any of examples 12-14, wherein the increase in deformation stiffness in the second sole region is smaller in an area where impact occurs and larger on an opposite side of the second sole region.
16. The sole according to any of examples 12-15, wherein at least the second sole region tilts inwards toward the impact area due to a stronger compression of the second sole region in the impact area.
17. The sole according to any preceding example, wherein at least one of a shape, size, and location of the deformation region provides the deformation region with predetermined properties.
18. The sole according to any of examples 12-16, wherein the first sole region extends into a forefoot region and wherein the second sole region extends into a heel region.
19. The sole according to any of examples 12-16, wherein the first sole region and the second sole region at least partially coincide.
20. A sole comprising:
a midsole comprising a first sole region, wherein the first sole region comprises particle foam;
a deformation region within the midsole, wherein the deformation region comprises a volume greater than that of a single expanded particle and is positioned so that it allows a sideward deformation of the particle foam of the first sole region under a pressure load on the sole; and
a frame element, which at least partially surrounds the midsole and which limits the sideward deformation of the midsole under the pressure load on the sole.
21. The sole according to example 20, wherein the frame element completely encompasses a heel region on its sides, and wherein the frame element only partly encompasses a forefoot region on its sides.
22. The sole according to any of examples 20-21 wherein the frame element further comprises a supporting element, wherein the supporting element is arranged on the lateral side of a heel region.
23. The sole according to any of examples 20-22, wherein the midsole further comprises a control element that limits the sideward deformation of the particle foam of the first sole region.
24. The sole according to example 23, wherein the control element and the frame element at least partially coincide.
25. The sole according to any of examples 20-24, wherein the frame element comprises at least one bar that serves to secure the frame element on the midsole.
26. The sole according to example 25, wherein the at least one bar is at least partly surrounded by the particle foam of the midsole.
27. A sole comprising:
a midsole comprising particles of a particle foam; and
an outsole comprising at least one deformation region comprising a volume greater than that of a single expanded particle in the particle foam;
wherein the at least one deformation region is configured to allow deformation of at least a portion of the particle foam of the midsole under a pressure load on the sole; and
wherein the outsole limits the deformation of the midsole under the pressure load on the sole.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A sole comprising:
a midsole;
a first sole region, wherein the first sole region comprises particle foam comprising particles of an expanded material; wherein the particles of an expanded material comprise expanded polypropylene (ePP), expanded polyamide (ePA), expanded polyether-block amine (ePEBA), expanded thermos-plastic polyurethane (eTPU), or combinations thereof;
a deformation region comprising an open space within the midsole, wherein the deformation region comprises a volume greater than that of a single expanded particle and is positioned so that it allows a sideward deformation of the particle foam into the deformation region under a pressure load on the sole; and
a frame element, which completely encircles the midsole except in a toe region and which limits the sideward deformation of at least a portion of the midsole under the pressure load on the sole.

2. The sole according to claim 1, wherein an opening within the frame element at least partially defines the deformation region.

3. The sole according to claim 1, wherein the midsole is formed from particles of an expanded material; wherein the particles of an expanded material comprise expanded polypropylene (ePP), expanded polyamide (ePA), expanded polyether-block amine (ePEBA), expanded thermos-plastic polyurethane (eTPU), or combinations thereof.

4. The sole according to claim 1, wherein the deformation region comprises a material that yields to the deformation of the material of the first sole region.

5. The sole according to claim 4, wherein the yielding material has a deformation stiffness that is 5% to 40% greater than the deformation stiffness of the first region.

6. The sole according to claim 1, wherein the frame element completely encompasses a heel region on its sides.

7. The sole according to claim 1, wherein the frame element may further comprise a supporting element.

8. The sole according to claim 7, wherein the supporting element is arranged on a lateral side of a heel region.

9. The sole according to claim 1, wherein the frame element comprises at least one bar that secures the frame element on the midsole.

10. The sole according to claim 9, wherein the at least one bar is at least partially surrounded by the particle foam of the midsole.

11. The sole according to claim 1, wherein the deformation region is provided as a rectangular groove within a control element.

12. The sole according to claim 11, wherein the control element limits the sideward deformation of the material in the first sole region.

13. The sole according to claim 1 further comprising a control element, wherein the control element is free from particle of the particle foam.

14. The sole according to claim 13, wherein the control element comprises at least one of EVA, PP, PA, PS, TPU, PEBA, and combinations thereof.

15. The sole according to claim 1, wherein the sole comprises a second sole region and wherein the second sole region has an increasing deformation stiffness along at least one predetermined direction.

16. The sole according to claim 15, wherein the at least one predetermined direction extends from a medial side of the sole toward a lateral side of the sole.

17. The sole according claim 15, wherein the increasing deformation stiffness along at least one predetermined direction is due to increasing density in the direction of increasing deformation stiffness.

18. The sole according to claim 1, wherein the frame element completely encircles the midsole except in a toe region.

19. The sole according to claim 1, wherein the first sole region is coupled to a first sole part having a grid structure.

20. The sole according to claim 19, wherein the deformation element extends across the entirety of the grid structure.

* * * * *